US012771904B2

(12) United States Patent
Ukawa et al.

(10) Patent No.: US 12,771,904 B2
(45) Date of Patent: Oct. 20, 2026

(54) INFORMATION PROCESSING APPARATUS, INFORMATION PROCESSING METHOD, AND PROGRAM

(71) Applicant: Sony Group Corporation, Tokyo (JP)

(72) Inventors: Takuto Ukawa, Kanagawa (JP); Yuya Yamashita, Kanagawa (JP); Yuta Matsui, Kanagawa (JP)

(73) Assignee: SONY GROUP CORPORATION, Tokyo (JP)

( * ) Notice: Subject to any disclaimer, the term of this patent is extended or adjusted under 35 U.S.C. 154(b) by 29 days.

(21) Appl. No.: 18/868,374

(22) PCT Filed: May 16, 2023

(86) PCT No.: PCT/JP2023/018212
§ 371 (c)(1),
(2) Date: Nov. 22, 2024

(87) PCT Pub. No.: WO2023/233998
PCT Pub. Date: Dec. 7, 2023

(65) Prior Publication Data

US 2025/0358475 A1 Nov. 20, 2025

(30) Foreign Application Priority Data

May 31, 2022 (JP) ................................ 2022-088288

(51) Int. Cl.
*H04N 21/44* (2011.01)
*G06T 3/40* (2024.01)
(Continued)

(52) U.S. Cl.
CPC ......... *H04N 21/44008* (2013.01); *G06T 3/40* (2013.01); *G06V 20/44* (2022.01);
(Continued)

(58) Field of Classification Search
CPC .. H04N 21/44008; H04N 21/84; H04N 5/147; G06T 3/40; G06V 20/44;
(Continued)

(56) References Cited

U.S. PATENT DOCUMENTS 10,701,409 B1 * 6/2020 Gupta .............. H04N 21/23424
11,457,270 B1 * 9/2022 Venugopal ....... H04N 21/44016
(Continued)

FOREIGN PATENT DOCUMENTS

JP 2006-048405 A 2/2006
JP 2011-223287 A 11/2011
(Continued)

*Primary Examiner* — Fernando Alcon
(74) *Attorney, Agent, or Firm* — Paratus Law Group, PLLC

(57) ABSTRACT

There is provided an information processing apparatus, an information processing method, and a program capable of accurately cutting a desired scene desired by a user. Setting of a recognition unit that detects detection metadata, which is metadata regarding a predetermined recognition target, by performing recognition processing on the recognition target is performed on the basis of a sample scene, which is a scene of a content designated by a user. Then, a cutting rule for cutting scenes from the content is generated on the basis of the detection metadata detected by performing the recognition processing on the content as a processing target by the set recognition unit and the sample scene. The present technology can be applied to, for example, an information processing system that cuts a desired scene from a content.

20 Claims, 67 Drawing Sheets

(51) Int. Cl.
*G06V 20/40* (2022.01)
*G06V 30/10* (2022.01)
*H04N 21/84* (2011.01)

(52) U.S. Cl.
CPC ............. *G06V 30/10* (2022.01); *H04N 21/84* (2013.01); *G06V 2201/07* (2022.01)

(58) Field of Classification Search
CPC .... G06V 30/10; G06V 2201/07; G06V 20/41; G11B 27/034; G11B 27/28
See application file for complete search history.

(56) References Cited

U.S. PATENT DOCUMENTS

| | | | | |
|---|---|---|---|---|
| 2002/0039481 | A1* | 4/2002 | Jun | G11B 27/105 375/E7.162 |
| 2002/0047936 | A1* | 4/2002 | Tojo | G06V 20/40 348/700 |
| 2002/0108112 | A1* | 8/2002 | Wallace | G11B 27/28 725/38 |
| 2006/0130119 | A1* | 6/2006 | Candelore | H04N 7/163 725/135 |
| 2006/0195859 | A1* | 8/2006 | Konig | H04N 21/44016 382/199 |
| 2008/0127244 | A1* | 5/2008 | Zhang | H04N 5/147 725/32 |
| 2009/0150199 | A1* | 6/2009 | Cohen | G11B 27/036 707/E17.031 |
| 2009/0151008 | A1* | 6/2009 | Cohen | G11B 27/34 726/30 |
| 2010/0017818 | A1* | 1/2010 | Joshi | H04N 21/235 725/32 |
| 2011/0069939 | A1* | 3/2011 | Choi | H04N 21/8456 386/E5.028 |
| 2011/0093798 | A1* | 4/2011 | Shahraray | G06F 3/0484 715/763 |
| 2012/0057850 | A1* | 3/2012 | Klappert | H04N 21/6582 386/278 |
| 2012/0077522 | A1* | 3/2012 | Mate | H04N 5/268 455/456.3 |
| 2012/0308202 | A1 | 12/2012 | Murata | |
| 2013/0183023 | A1* | 7/2013 | Sandrew | G11B 27/034 386/E5.028 |
| 2013/0283162 | A1* | 10/2013 | Aronsson | G11B 27/105 715/719 |
| 2014/0023348 | A1* | 1/2014 | O'Kelly | G11B 27/031 386/278 |
| 2014/0181633 | A1* | 6/2014 | Mo | G06F 16/958 715/234 |
| 2015/0318019 | A1* | 11/2015 | Singhal | G11B 27/28 386/282 |
| 2016/0172005 | A1* | 6/2016 | Oguchi | G11B 27/28 386/241 |
| 2017/0069349 | A1* | 3/2017 | Muyal | H04N 5/76 |
| 2017/0076177 | A1* | 3/2017 | Allie | G11B 27/034 |
| 2018/0308524 | A1* | 10/2018 | Muyal | G11B 27/34 |
| 2018/0349368 | A1* | 12/2018 | Bellingham | H04N 21/858 |
| 2019/0005982 | A1* | 1/2019 | Hazan | G06K 7/1417 |
| 2019/0130192 | A1* | 5/2019 | Kauffmann | G11B 27/031 |
| 2019/0294911 | A1* | 9/2019 | Watanabe | G06V 30/36 |
| 2020/0314488 | A1* | 10/2020 | Baughman | H04N 21/4394 |
| 2021/0044864 | A1* | 2/2021 | Begun | G06V 40/172 |
| 2023/0401852 | A1* | 12/2023 | Kumar | G06V 20/41 |

FOREIGN PATENT DOCUMENTS

| | | | |
|---|---|---|---|
| JP | 2016-015045 | A | 1/2016 |
| WO | WO 2021/241430 | A1 | 12/2021 |

* cited by examiner

FIG. 4

DICTIONARY SETTING

1. A
    1. ENG (GENERAL-PURPOSE)
    2. Original (SPECIALIZED FOR SPECIFIC FONT)
2. B (SPECIALIZED FOR NUMERAL)
3. A+B

FIG. 12

| RECOGNITION ENGINE | OUTPUT | SETTING |
|---|---|---|
| CAMERA SW RECOGNITION (NORMAL, Dissolve) | TC IN WHICH SW IS DETECTED | THRESHOLD VALUE DICTIONARY TO BE COMPARED WITH EXISTENCE PROBABILITY |
| OBJECT RECOGNITION (GENERAL-PURPOSE DICTIONARY, SPECIALIZED DICTIONARY) | TC IN WHICH SPECIFIC CLASS IS DETECTED AND BBOX INFORMATION THEREOF | THRESHOLD VALUE DICTIONARY TO BE COMPARED WITH EXISTENCE PROBABILITY |
| TEXT RECOGNITION (GENERAL-PURPOSE DICTIONARY, DICTIONARY SPECIALIZED FOR NUMERAL) | TEXT DETECTION RESULT IN DESIGNATED PORTION AND TC | THRESHOLD VALUE DICTIONARY TO BE COMPARED WITH EXISTENCE PROBABILITY, SETTING FOR RESULT CORRECTION |
| GRAPHIC RECOGNITION (TEMPLATE MATCHING) | TC IN WHICH GRAPHIC SIMILAR TO GRAPHIC REGISTERED IN DESIGNATED PORTION APPEARS | THRESHOLD VALUE TO BE COMPARED WITH EXISTENCE PROBABILITY |
| COLOR RECOGNITION (COLOR COUNT) | TC IN WHICH COLOR REGISTERED IN DESIGNATED PORTION APPEARS AND NUMBER OF TCs | GENERAL-PURPOSE DETECTION/SPECIALIZATION MODE<br>THRESHOLD VALUE TO BE COMPARED WITH EXISTENCE PROBABILITY |
| EXCITEMENT RECOGNITION | EXCITEMENT SCORE VALUE IN UNIT OF 1s, AND TC OF EXCITEMENT SECTION IN WHICH EXCITEMENT SCORE EXCEEDS THRESHOLD VALUE | THRESHOLD VALUE TO BE COMPARED WITH EXCITEMENT SCORE |
| SPECIFIC SOUND DETECTION (SHOT SOUND, CLAPPING SOUND) | TC IN WHICH SPECIFIC SOUND IS DETECTED | THRESHOLD VALUE DICTIONARY TO BE COMPARED WITH EXISTENCE PROBABILITY |
| CM DETECTION | TC OF SECTION IN WHICH CM IS DETECTED | COUNTRY MODE<br>THRESHOLD VALUE TO BE COMPARED WITH EXISTENCE PROBABILITY |
| MATCHING (SOUND, TEXT, PRE-VISUALIZATION) | TC IN WHICH TEXT OR SOUND OR PRE-VISUALIZATION MATCHES WITH OTHER DATA | THRESHOLD VALUE TO BE COMPARED WITH EXISTENCE PROBABILITY |
| EMOTION RECOGNITION | TC IN WHICH EMOTION IS RECOGNIZED (SIX TYPES OF EMOTIONS) | THRESHOLD VALUE TO BE COMPARED WITH EXISTENCE PROBABILITY |
| POSTURE RECOGNITION | SKELETON INFORMATION AND TC | THRESHOLD VALUE TO BE COMPARED WITH EXISTENCE PROBABILITY |
| SHOT COMPOSITION RECOGNITION | CAMERA COMPOSITION (ex. BUST SHOT) ESTIMATED FROM SKELETON INFORMATION AND TC | THRESHOLD VALUE TO BE COMPARED WITH EXISTENCE PROBABILITY |
| CAMERA MOTION RECOGNITION | TC IN WHICH MOVEMENT OF CAMERA IS DETECTED FROM OPTICAL FLOW | THRESHOLD VALUE TO BE COMPARED WITH EXISTENCE PROBABILITY |
| ACTION RECOGNITION | ACTION RESULT RECOGNIZED FROM THREE-DIMENSIONAL DATA OBTAINED BY MULTI-CAMERA AND TC | THRESHOLD VALUE TO BE COMPARED WITH EXISTENCE PROBABILITY |

FIG. 25

```
"Scene_Label1": [
    {
        "start": "00:10:36.636",
        "end": "00:10:55.722",
        "clock": "4th 6:49",
        "label": "TouchDown"
    }
```

FIG. 29

```
"id": 1,
"type": "find_bbox-1",
"instances": [
    {
        "confidence": "1.0,
        "text": "NFC",
        "startFrame": 0,
        "duration": 1060,
        "start": "00:00:00.000",
        "end": "00:00:35.368",
    },
    {
        "confidence": "1.0,
        "text": "NFC",
```

.
.
.

FIG. 30

```
"id": 0,
"type": "find_bbox-8",
"bbox_type": "score_text_type",
"change_flag": "false",
"instances": [
    {
        "confidence": "1.0,
        "text": "3",
        "startFrame": 0,
        "duration": 685,
        "start": "00:00:00.000",
        "end": "00:00:22.856",
    },
```

⋮

FIG. 32

```
"SportsAI_OCR": [
    {
        "id": 0,
        "type": "find_bbox-8",
        "instances": [
            {
                "confidence": "1.0,
                "text": "L",
                "startFrame": 390,
                "duration": 25,
                "start": "00:00:13.013",
                "end": "00:00:13.847",
            },
            {
                "confidence": "1.0,
                "text": "I\nI",
```

⋮

FIG. 33

```
"id": 6,
"type": "score-change",
"bbox_type": "score_text_type",
"change_flag": "true",
"instances": [
    {
        "id": 0,
        "score_difference": 58,
        "instances": [
            {
                "confidence": "1.0,
                "startFrame": 86835,
                "duration": 0,
                "start": "00:48:17.397",
                "end": "00:48:17.397",
```

⋮

FIG. 43

| RECOGNITION ENGINE | GENERATABLE CUTTING METADATA | GENERATION EXAMPLE |
|---|---|---|
| CAMERA SW RECOGNITION | Appear Type, Exist Type | SW APPEARS (Appear Type), SW IS PRESENT (Exist Type) |
| OBJECT RECOGNITION | Appear Type, Exist Type, Label Type | WHEN Person DISAPPEARS (Appear Type), Person IS PRESENT (Exist Type), POSITION OF BBOX IS (Label Type) |
| TEXT RECOGNITION | Appear Type, Exist Type, Change Type, Label Type | WHEN Clock DISAPPEARS (Appear Type), Clock IS PRESENT (Exist Type), WHEN VALUE OF Clock IS CHANGED TO X (Change Type), WHEN VALUE OF Clock IS > X (Label Type) |
| GRAPHIC RECOGNITION | Appear Type, Exist Type | WHEN Score Board DISAPPEARS (Appear Type), Score Board IS PRESENT (Exist Type), |
| COLOR RECOGNITION | Appear Type, Exist Type, Change Type, Label Type | WHEN BSO DISAPPEARS (Appear Type), BSO IS PRESENT (Exist Type), WHEN VALUE OF BSO IS CHANGED TO "XXX" (Change Type), WHEN VALUE OF BSO IS "XXX" (Label Type) |
| EXCITEMENT RECOGNITION | Appear Type, Exist Type | EXCITEMENT SECTION APPEARS (Appear Type), EXCITEMENT SECTION IS PRESENT (Exist Type) |
| SPECIFIC SOUND DETECTION | Appear Type, Exist Type | STARTING WITH SHOT SOUND (Appear Type), SHOT SOUND IS PRESENT (Exist Type) |
| CM DETECTION | Appear Type, Exist Type | WHEN CM IS ENDED (Appear Type), CM IS PRESENT (Exist Type) |
| MATCHING | Appear Type, Exist Type | WHEN MATCHING IS STARTED (Appear Type), MATCHING IS BEING PERFORMED (Exist Type) |
| EMOTION RECOGNITION | Appear Type, Exist Type, Label Type | WHEN EMOTION IS DETECTED (Appear Type), EMOTION IS BEING DETECTED (Exist Type), WHEN EMOTION OF X IS DETECTED (Label Type) |
| POSTURE RECOGNITION | Appear Type, Exist Type, Label Type | WHEN SKELETON IS DETECTED (Appear Type), SKELETON IS BEING DETECTED (Exist Type), WHEN INFORMATION OF SKELETON IS X (Label Type) |
| SHOT COMPOSITION RECOGNITION | Appear Type, Exist Type, Label Type | WHEN COMPOSITION IS ESTIMATED (Exist Type), WHEN X COMPOSITION IS BEING ESTIMATED (Label Type) |
| CAMERA MOTION RECOGNITION | Appear Type, Exist Type, Label Type | WHEN MOTION IS DETECTED (Appear Type), MOTION IS BEING DETECTED (Exist Type) |
| ACTION RECOGNITION | Appear Type, Exist Type, Label Type | WHEN ACTION IS DETECTED (Appear Type), ACTION IS BEING DETECTED (Exist Type), WHEN INFORMATION OF ACTION IS X (Label Type) |

INFORMATION PROCESSING APPARATUS, INFORMATION PROCESSING METHOD, AND PROGRAM

CROSS REFERENCE TO PRIOR APPLICATION

This application is a National Stage Patent Application of PCT International Patent Application No. PCT/JP2023/018212 (filed on May 16, 2023) under 35 U.S.C. § 371, which claims priority to Japanese Patent Application No. 2022-088288 (filed on May 31, 2022), which are all hereby incorporated by reference in their entirety.

TECHNICAL FIELD

The present technology relates to an information processing apparatus, an information processing method, and a program, and particularly relates to, for example, an information processing apparatus, an information processing method, and a program capable of accurately cutting a desired scene desired by a user.

BACKGROUND ART

For example, Patent Document 1 describes a technology in which a section from a boundary unit to a next boundary unit is cut as a desired scene desired by a user by learning an intention of a user by actual teaching, generating a detection logic (unit boundary determination reference), and determining a unit boundary from a detection target video (image) by using the detection logic in determination processing.

CITATION LIST

Patent Document

Patent Document 1: Japanese Patent Application Laid-Open No. 2006-048405

SUMMARY OF THE INVENTION

Problems to be Solved by the Invention

In cutting a desired scene from a content, various kinds of metadata (for example, information indicating that recognized character (numeral) is a score of a game, and the like) related to a recognition target, which are detected by performing recognition processing on a content as a processing target in a recognition engine (recognition unit) that performs recognition processing on a predetermined recognition target, are used.

Accordingly, in order to accurately cut the desired scene, it is necessary to detect appropriate metadata in the recognition engine. Then, in order to detect the appropriate metadata, it may be necessary to set the recognition engine for every category of the content or the like from which the desired scene is cut.

It is cumbersome for the user to perform all settings of the recognition engine. Furthermore, in a case where the setting of the recognition engine by the user is not appropriate setting for the cutting of the desired scene, it is difficult to accurately cut the desired scene.

The present technology has been made in view of such a situation, and an object thereof is to accurately cut a desired scene.

Solutions to Problems

An information processing apparatus or a program according to the present technology is an information processing apparatus including a setting unit that performs setting of a recognition unit that detects detection metadata which is metadata regarding a predetermined recognition target by performing recognition processing on the recognition target on a basis of a sample scene which is a scene of a content designated by a user, and a generation unit that generates a cutting rule for cutting scenes from the content on a basis of the detection metadata detected by performing the recognition processing on the content as a processing target by the recognition unit in which the setting is performed and the sample scene, or a program for causing a computer to function as such an information processing apparatus.

An information processing method according to the present technology is an information processing method including performing setting of a recognition unit that detects detection metadata which is metadata regarding a predetermined recognition target by performing recognition processing on the recognition target on a basis of a sample scene which is a scene of a content designated by a user, and generating a cutting rule for cutting scenes from the content on a basis of the detection metadata detected by performing the recognition processing on the content as a processing target by the recognition unit in which the setting is performed and the sample scene.

In the present technology, the setting of the recognition unit that detects the detection metadata which is the metadata regarding the predetermined recognition target by performing the recognition processing on the recognition target is performed on the basis of the sample scene which is the scene of the content designated by the user. Then, the cutting rule for cutting the scene from the content is generated on the basis of the detection metadata detected by performing the recognition processing on the content as the processing target by the set recognition unit and the sample scene.

The information processing apparatus may be an independent device or may be an internal block which forms one device.

Furthermore, the program can be provided by being recorded on a recording medium or being transmitted via a transmission medium.

BRIEF DESCRIPTION OF DRAWINGS

FIG. 4 is a diagram for describing a second example of the setting of the text recognition engine in the recognition engine 41.

FIG. 12 is a diagram illustrating an example of a plurality of recognition engines included in a recognition engine 120.

FIG. 25 is a diagram illustrating an example of a list of IN points and OUT points of a sample scene acquired by a sample scene acquisition unit 145 and tag data.

FIG. 29 is a diagram illustrating an example of a list of detection (characterizing) metadata detected in character recognition.

FIG. 30 is a diagram illustrating an example of a list of detection (characterizing) metadata detected in meaning estimation.

FIG. 32 is a diagram illustrating an example of a list of detection metadata detected in character recognition using the BBOX as the setting information in recognition processing of the text recognition engine.

FIG. 33 is a diagram illustrating an example of a list of detection metadata detected in character analysis using a character attribute of the BBOX as the setting information in the recognition processing of the text recognition engine.

FIG. 43 is a diagram illustrating an example of cutting metadata generated on the basis of detection metadata output from the plurality of recognition engines included in the recognition engine 120.

MODE FOR CARRYING OUT THE INVENTION

<One Embodiment of Information Processing System to which Present Technology is Applied>

Figure 1:
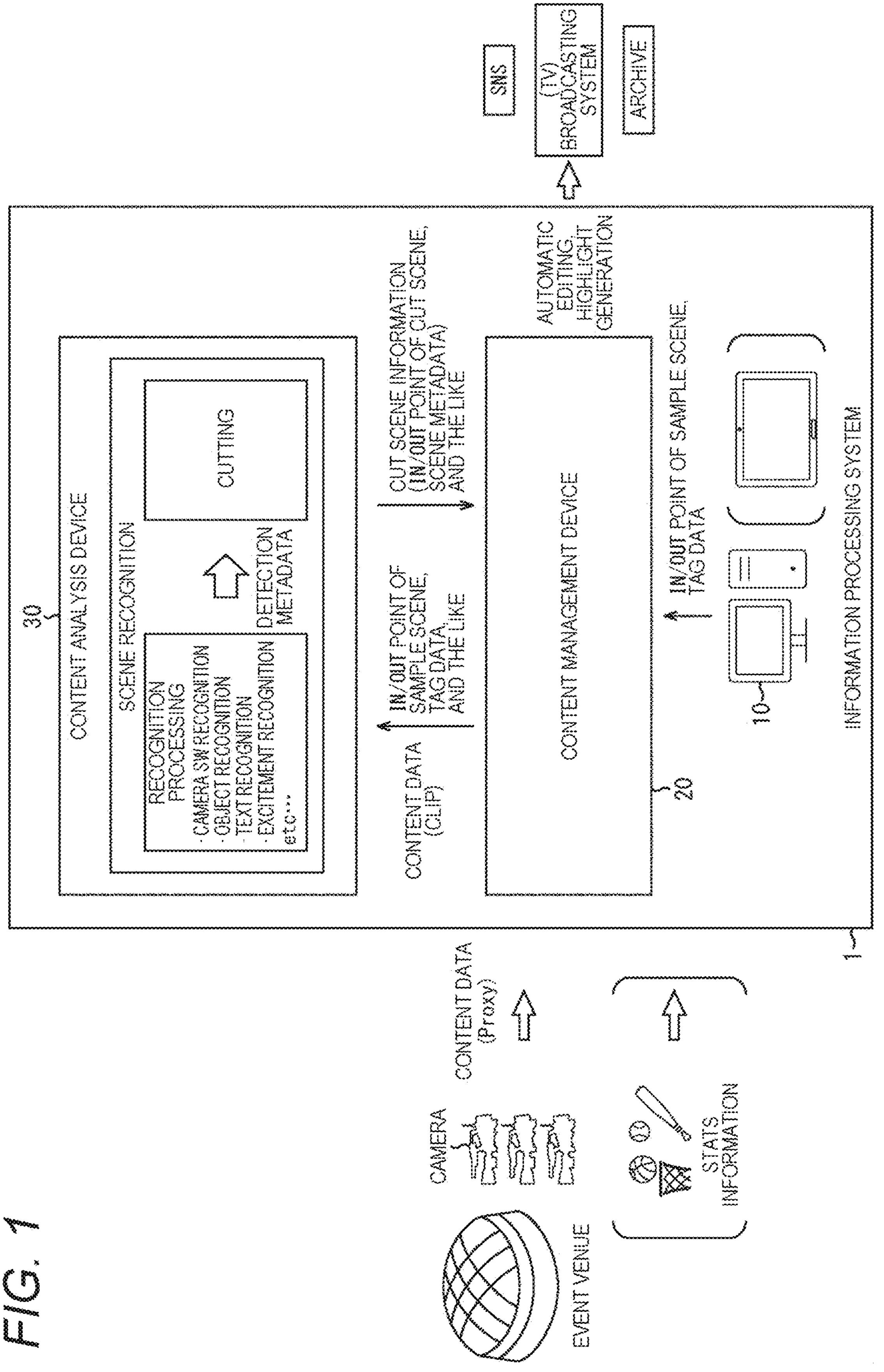
FIG. 1 is a block diagram illustrating a configuration example of an embodiment of an information processing system to which the present technology is applied.

FIG. 1 is a block diagram illustrating a configuration example of an embodiment of an information processing system to which the present technology is applied.

An information processing system 1 integrates various artificial intelligence (AI) engines, analyzes various kinds of media data such as an image and sound, and realizes a wide range of automation such as automation of a workflow in content creation, automatic cut of materials, automatic highlight editing, and automatic distribution to a social networking service (SNS).

The information processing system 1 includes a terminal 10, a content management device 20, and a content analysis device 30.

The terminal 10, the content management device 20, the content analysis device 30, and other devices (not illustrated) can communicate with each other in at least one of wired or wireless manner via a network (not illustrated) to exchange various kinds of data (information).

To the information processing system 1, content data including an image and sound obtained by a camera imaging an event being held in an event venue such as a sports venue is transmitted.

Note that, as the content data, an image obtained by imaging any target and the like can be adopted in addition to the image obtained by imaging the event or the like. As the content data, animation created by computer graphics (CG) and the like can be adopted in addition to a live-action image.

Furthermore, instead of the content data itself (main line data), proxy data (proxy) in which a data amount of the content data is reduced can be transmitted to the information processing system 1.

In a case where the event is a sports game, it is possible to transmit, to the information processing system 1, the content data and stats information summarizing results of the play. In the information processing system 1, the stats information can be used for analysis of the content data as necessary.

The terminal 10 is, for example, a personal computer (PC), a tablet terminal, and the like, and is operated by a user who creates a content.

The user can designate a desired scene desired by the user by displaying a timeline of content data on the terminal 10 and operating the terminal 10 on the timeline.

The desired scene can be designated by designating an IN point and an OUT point.

The IN point and the OUT point can be designated by directly designating positions to be the IN point and the OUT point on the timeline.

Furthermore, the IN point and the OUT point can be designated, for example, by displaying candidates for the IN point and the OUT point on the timeline on the basis of scene switching, an IN point and an OUT point designated by the user in the past, or the like and selecting, by the user, the IN point and the OUT point from the candidates.

Here, hereinafter, the desired scene designated by the user designating the IN point and the OUT point is also referred to as a sample scene.

One or more sample scenes can be designated.

The terminal 10 transmits the IN point and the OUT point of the sample scene to the content management device 20.

The user can designate (input) (the IN point and the OUT point of) the sample scene and input tag data associated with the sample scene by operating the terminal 10.

For example, the user can input, as the tag data, information and the like describing details of the sample scene.

The tag data is transmitted, together with the IN point and the OUT point of the sample scene, from the terminal 10 to the content management device 20.

The content management device 20 performs management of the content and the like.

For example, the content management device 20 retains and stores the content data transmitted to the information processing system 1 in a file. One file in which the content data is retained is called a clip.

The content management device 20 transmits, to the content analysis device 30, the content data, the IN point and the OUT point of the sample scene designated by the user for the content data, the tag data, and the like.

Furthermore, the content management device 20 performs automatic editing of the content data, generation of a highlight image (video), and the like on the basis of cut scene information and the like transmitted from the content analysis device 30.

The cut scene information is information of a cut scene that is obtained on the basis of (the IN point and the OUT point of) the sample scene in the content analysis device 30 and is cut as a desired scene from the content data. The cut scene information includes at least an IN point or an OUT point of the cut scene, and can include scene metadata which is metadata such as details of the cut scene.

The content management device 20 can distribute an automatic editing result or a highlight image obtained by automatic editing or generation of a highlight image to an SNS, can transmit the automatic editing result or the highlight image to a television (TV) broadcasting system, or save the automatic editing result or the highlight image in an archive.

The content analysis device 30 functions as an information processing apparatus that performs scene recognition by similarly analyzing the content data from the content management device 20 on the basis of (the sample scene specified by) the IN point and the OUT point of the sample scene from the content management device 20, the tag data, and the like.

In the scene recognition, recognition processing and cutting are performed.

In the recognition processing, the content data (image, sound, and the like) is analyzed as a processing target of the recognition processing, and various kinds of metadata regarding a recognition target are detected from the content data.

In the recognition processing or the like, various kinds of metadata regarding the recognition target and the like detected from the content data by analyzing the content data are also referred to as detection metadata.

The recognition processing can be performed on various recognition targets. For example, the recognition processing can be performed on camera switching (SW), an object, a text (character (string)), excitement, and the like as the recognition target.

The camera SW means switching of an image (screen) such as switching of a camera that switches an image from an image imaged by a certain camera to an image imaged by another camera.

In the cutting, a scene similar to the sample scene is cut as the cut scene from the content data on the basis of the detection metadata. That is, the scene similar to the sample scene is cut as the cut scene from the content data.

The sample scene is the desired scene desired by the user, and ideally, since the cut scene is the scene similar to the sample scene, the sample scene becomes the desired scene.

Here, in the cutting, the IN point and the OUT point of the cut scene are detected. The cutting of the cut scene can be easily performed as long as the IN point and the OUT point of the cut scene are detected.

Accordingly, the cutting of the cut scene and the detection of the IN point and the OUT point of the cut scene are (substantially) equivalent.

The content analysis device 30 generates the cut scene information including the IN point and the OUT point of the cut scene obtained by the recognition processing and cutting, and necessary scene metadata, and transmits the cut scene information to the content management device 20.

In the information processing system 1 having the above-described configuration, the content analysis device 30 processes the content data on the basis of the IN point and the OUT point of the sample scene designated by the user, and generates the cut scene information.

Then, in the content management device 20, the automatic editing of the content data, the generation of the highlight image, and the like are performed on the basis of the cut scene information.

Note that, each of the content management device 20 and the content analysis device 30 can be disposed in any of a cloud and on-premises. Furthermore, a part of each of the content management device 20 and the content analysis device 30 can be disposed in the cloud, and the rest part can be disposed on-premises.

<Outline of Configuration of Content Analysis Device 30>

Figure 2:
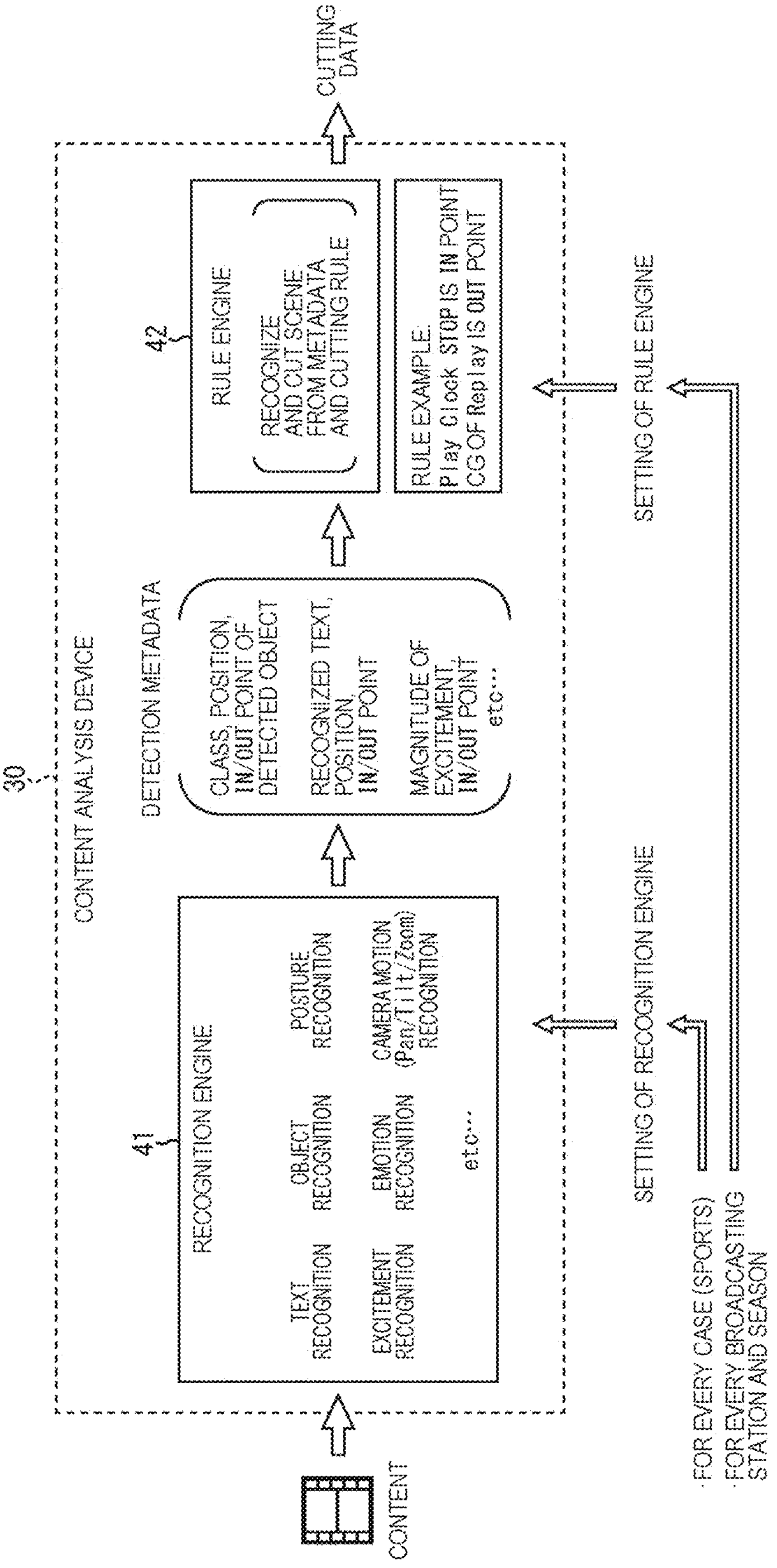
FIG. 2 is a diagram for describing an outline of a configuration of a content analysis device 30.

FIG. 2 is a diagram for describing an outline of a configuration of the content analysis device 30 in FIG. 1.

The content analysis device 30 includes a recognition engine 41 and a rule engine 42.

The recognition engine 41 detects (generates) various kinds of detection metadata regarding the recognition target and outputs the detection metadata as a result of the recognition processing by performing recognition processing on various recognition targets with content data (hereinafter, also simply referred to as a content) as a processing target.

For example, the recognition engine 41 includes a plurality of recognition engines (recognition units) that perform the recognition processing on the various recognition targets on the content as the processing target. The recognition engine included in the recognition engine 41 may be an AI recognition engine using AI or a recognition engine using a technology other than AI.

In FIG. 2, the recognition engine 41 includes a text recognition engine, an object recognition engine, a posture recognition engine, an excitement recognition engine, an emotion recognition engine, a camera motion recognition engine, and the like.

The text recognition engine performs the recognition processing on a text as the recognition target, and the object recognition engine performs the recognition processing on an object as the recognition target. The posture recognition engine performs the recognition processing on a posture as the recognition target, and the excitement recognition engine performs the recognition processing on excitement as the recognition target. The emotion recognition engine performs the recognition processing on emotion as the recognition target, and the camera motion recognition engine performs the recognition processing on panning, tilting, zooming, and other camera motion (movement) of the camera as the recognition target.

For example, in the recognition processing of the object recognition engine, analysis is performed with the image of the content as the processing target, and a class (category) of an object appearing in the image, a position (position in the image) where the object appears, an IN point and an OUT point of the object, and the like are detected as the detection metadata. The IN point and the OUT point of the object mean a position where the object starts to appear (frame (time)) and a position where the object ends to appear.

For example, in the text recognition engine, analysis is performed on the image of the content as the processing target, and text (character (string) (including a numeral and a symbol)) (character) appearing in the image, a position where the text appears, an IN point and an OUT point of the text, and the like are detected as the detection metadata. Moreover, a character attribute or the like of the text is also detected as the detection metadata.

The IN point and the OUT point of the text mean a position where the text starts to appear (frame number and time) and a position where the text ends to appear.

The character attribute of the text (character) indicates the meaning of the text, for example, a numeral as the text indicating a score (of a game) or a clock (period of time).

For example, in the recognition processing of the excitement recognition engine, analysis is performed on sound (cheer and the like), an image, and the like of the content as the processing target, and an excitement score indicating a degree of excitement of audience, (an IN point and an OUT point of) a section of excitement (excitement section) determined on the basis of the excitement score, and the like is detected as the detection metadata.

Here, in order to simplify the description, it is assumed that the detection metadata is associated with a position (frame) of the content in which the detection metadata is detected (frame described by the detection metadata). The same applies to cutting metadata as described later.

The rule engine 42 recognizes a scene of the content on the basis of the detection metadata output from the recognition engine 41, and cuts the cut scene from the content according to a cutting rule for cutting the scene from the content (detects the IN point and the OUT point of the cut scene).

The cutting rule is a description of detection metadata indicating a rule of a scene to be cut as the cut scene (cutting metadata generated on the basis of the detection metadata).

For example, in the rule engine 42, it is assumed that the stop of a play clock (Play Clock STOP) is set as (a candidate for) the IN point as the cutting rule for a content of an American football game. Moreover, it is assumed that setting such that the CG display start for replay becomes (a candidate for) the OUT point is performed as the cutting rule for the content of the American football game.

Furthermore, the recognition engine 41 performs the recognition processing on the content of the American football game as the processing target, and the detection metadata is output to the rule engine 42.

In this case, according to the cutting rule, the rule engine 42 detects, as the IN point of the cut scene, a position (frame) where (the cutting metadata generated on the basis of) the detection metadata indicates the stop of the play clock. Moreover, the position (frame) where the detection metadata indicates the stop of the play clock and a position where the detection metadata indicates the CG display start for replay are detected as the OUT point of the cut scene.

Then, in the rule engine 42, a section of the content specified by the IN point and the OUT point detected according to the cutting rule is cut as the cut scene.

Among a plurality of recognition engines included in the recognition engine 41, there is a recognition engine that needs to be set. Furthermore, the rule engine 42 needs to set the cutting rule.

In order to accurately cut the desired scene as the cut scene, it is necessary to appropriately set (the recognition engine included in) the recognition engine 41 and (the cutting rule of) the rule engine 42 for the content for which the cut scene is to be cut.

For example, it is necessary to appropriately set the recognition engine 41 and the rule engine 42 for every category of the content for which the cut scene is to be cut and for every broadcasting station that broadcasts the content as a TV program.

For example, in a case where a score of a sport is recognized in the text recognition engine, it is necessary to set a position in an image in which a score is displayed, a font of a numeral indicating the score, and the like in the text recognition engine.

The position in the image in which the score is displayed, the font of the numeral indicating the score, and the like are different depending on the category (for example, in a case where the content is content of a sports game, types of games such as American football, baseball, and rugby) of the content and the broadcasting station. Therefore, it is necessary to set the text recognition engine for every category of the content or every broadcasting station.

Furthermore, even for content of a certain category, for example, the content of the American football game, the position in the image in which the score is displayed, the font of the numeral indicating the score, and the like may be changed depending on the season in which the game is played. Accordingly, the setting of the text recognition engine may be required for every season.

The setting of the recognition engine 41 and the rule engine 42 requires expertise, and it is difficult for the user of the terminal 10 to perform unless the user has considerable knowledge.

An engineer who handles the recognition engine 41, the rule engine 42, and the like can appropriately set the recognition engine 41 and the rule engine 42.

However, even an engineer complicates appropriate setting of the recognition engine 41 and the rule engine 42.

Accordingly, in the content analysis device 30, the recognition engine 41 and the rule engine 42 are appropriately set on the basis of the sample scene designated by the user.

The recognition engine 41 and the rule engine 42 are appropriately set, and thus, it is possible to accurately cut a desired scene as intended by the user as the cut scene.

<Outline of Setting of Recognition Engine 41>

Figure 3:
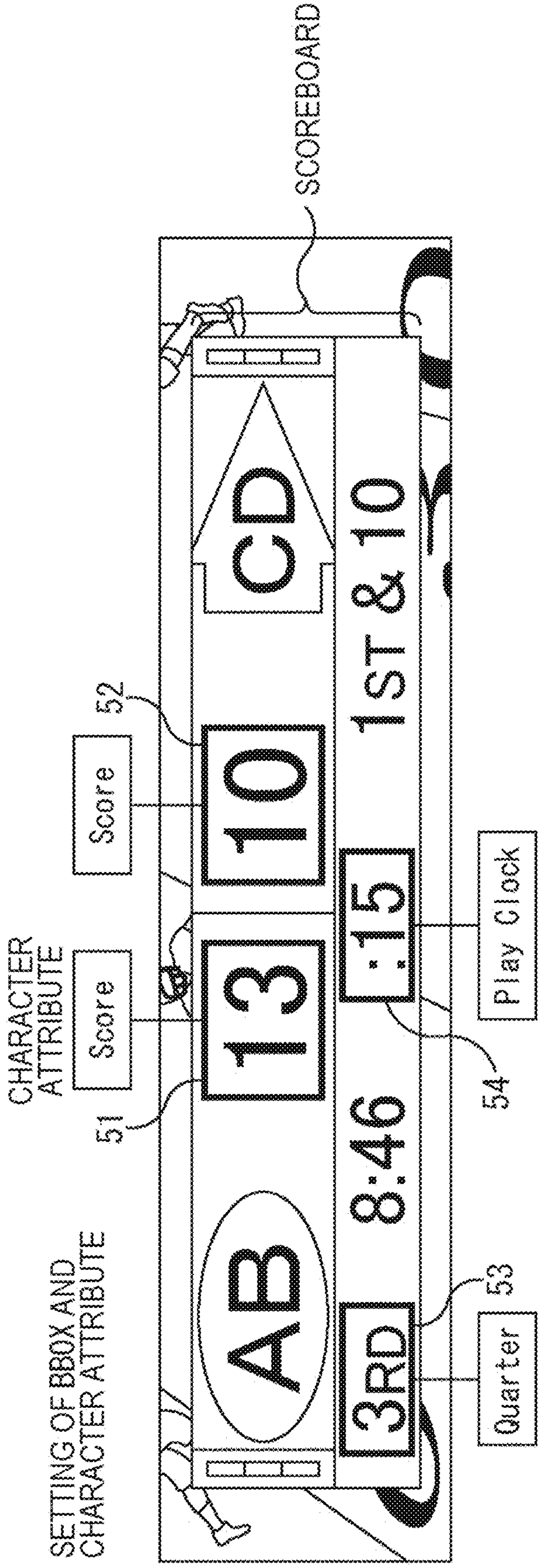
FIG. 3 is a diagram for describing a first example of setting of a text recognition engine in a recognition engine 41.

FIG. 3 is a diagram for describing a first example of the setting of the text recognition engine in the recognition engine 41.

FIG. 3 illustrates a display example of a scoreboard in the content of the American football game.

In FIG. 3, scores of two teams AB and CD, a quarter (ordinal number indicating the quarter), the play clock, and the like are displayed on the scoreboard.

In the text recognition engine, in a case where the scores of the two teams AB and CD, the quarter, and the play clock are recognized as texts, it is necessary to set a bounding box (BBOX) that designates a region in which each text is displayed (is present) and character attributes of the BBOX (texts surrounded by the BBOX).

In FIG. 3, a BBOX 51 designating a region in which the score of the team AB is displayed, a BBOX 52 designating a region in which the score of the team CD is displayed, a BBOX 53 designating a region in which the quarter is displayed, and a BBOX 54 designating a region in which the play clock is displayed are set.

Moreover, character attributes Score indicating that the texts (characters) in the BBOXs 51 and 52 are scores are set in the BBOXs 51 and 52. A character attribute Quarter indicating that the text in the BBOX 53 is the quarter is set in the BBOX 53, and a character attribute Play Clock indicating that the text in the BBOX 54 is the play clock is set in the BBOX 54.

The character attribute of the BBOX is appropriately used for processing (internal processing such as character analysis in the content analysis device 30) using the text in the BBOX as a target.

Moreover, the character attribute of the BBOX is used for correction in a case where the text in the BBOX is erroneously recognized, selection of a dictionary to be used to perform the recognition processing on the text in the BBOX, high-context interpretation of the text in the BBOX, and the like.

For example, in a case where the character attribute of the BBOX is (indicates) the score, when a lower case letter “l” is obtained as a result of recognition of the text in the BBOX, it can be determined that the text is erroneously recognized. In this case, since the character attribute is the score, it is possible to correct the lower case letter “l”, which is a result of erroneous recognition, to a numeral “1”.

For example, in a case where the character attribute of the BBOX is the score, a dictionary specialized for numerals can be selected as a dictionary (learning model and the like) to be used for the recognition processing on the text in the BBOX.

For example, in a case where the character attribute of the BBOX is the play clock, when a change in result of the recognition of the text in the BBOX is stopped, it is possible to perform the high-context interpretation that the play clock is stopped.

FIG. 4 is a diagram for describing a second example of setting of the text recognition engine in the recognition engine 41.

FIG. 4 illustrates an example of the dictionary prepared in the recognition processing of the text recognition engine.

In FIG. 4, a text recognition engine A, a text recognition engine B, and a text recognition engine A+text recognition engine B are prepared as three types of text recognition engines.

The text recognition engine A corresponds to, for example, a dictionary ENG appropriate for alphabetic characters of a general-purpose font and a dictionary Original specialized for a specific font.

The text recognition engine B corresponds to a dictionary specialized for numerals.

The text recognition engine A+text recognition engine B is an engine that simultaneously uses the text recognition engine A and the text recognition engine B.

The text recognition engine A+text recognition engine B can use a dictionary corresponding to the text recognition engine A and a dictionary corresponding to the text recognition engine B.

The dictionary to be used for the recognition processing is appropriately set (selected) on the basis of the category of the content, the character attribute of the BBOX, and the like, and thus, it is possible to improve recognition accuracy and reduce a load of the recognition processing.

Figure 5:
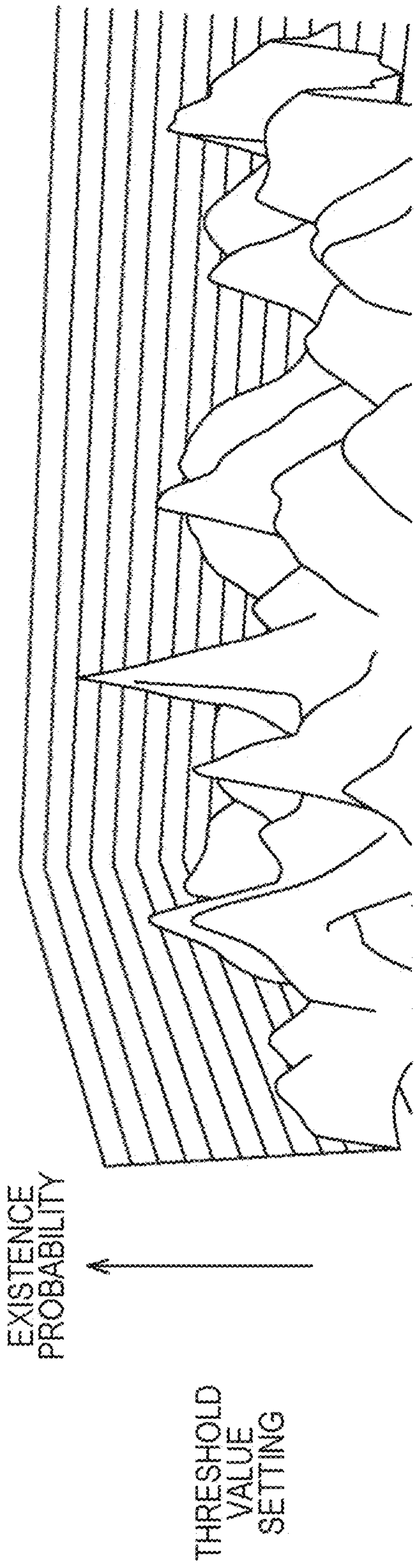
FIG. 5 is a diagram for describing a third example of the setting of the text recognition engine in the recognition engine 41.

FIG. 5 is a diagram for describing a third example of the setting of the text recognition engine in the recognition engine 41.

FIG. 5 illustrates a probability (existence probability) that the text in the BBOX is each character (each character registered in the dictionary) of the dictionary.

In the text recognition engine, for example, a character as a result of recognition of the text in the BBOX is selected from among characters whose existence probability is more than or equal to a threshold value.

Accordingly, the recognition accuracy can be improved by appropriately setting the threshold value.

<Outline of Setting of Rule Engine 42>

Figure 6:
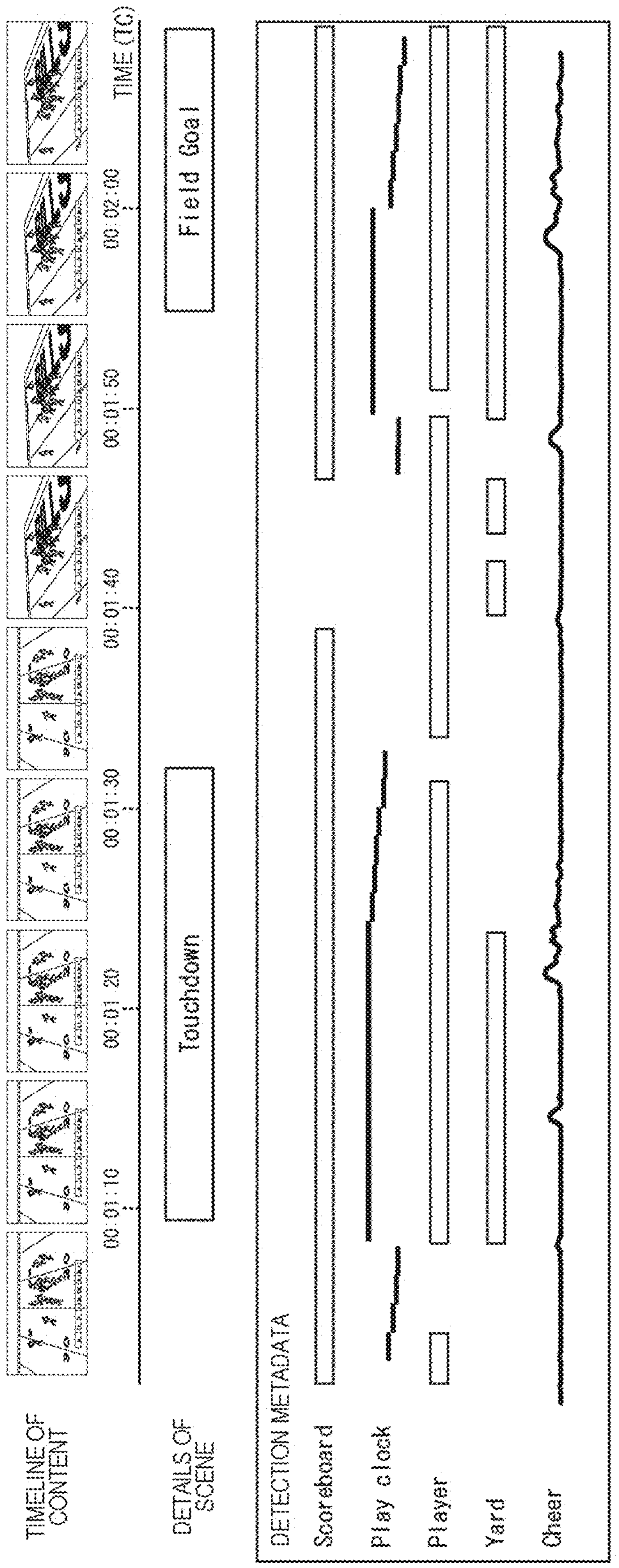
FIG. 6 is a diagram for describing an example of setting of a rule engine 42.

FIG. 6 is a diagram for describing an example of the setting of the rule engine 42.

FIG. 6 illustrates a timeline of the content of the American football game and a time series of the detection metadata detected (generated) by performing the recognition processing on the content as the processing target in the recognition engine 41.

In FIG. 6, the content includes a touchdown scene and a field goal scene.

Furthermore, in FIG. 6, Scoreboard, Play clock, Player, Yard, and Cheer are illustrated as the detection metadata.

The detection metadata Scoreboard indicates that a scoreboard appears (is detected) on the image of the content, and the detection metadata Play clock indicates a value of the play clock. The detection metadata Player indicates that players appear (are detected) on the image of the content, and the detection metadata Yard indicates that display of a yard drawn in a field appears (is detected). The detection metadata Cheer indicates an excitement score.

The cutting rule set to the rule engine 42 is generated by combining (the cutting metadata generated on the basis of) the detection metadata.

For example, in a case where the touchdown scene is the desired scene, the touchdown scene which is the desired scene can be cut as the cut scene by generating the cutting rule for cutting from the start of detection of the display of the yard indicated by the detection metadata Yard in the vicinity where the play clock indicated by the detection metadata Play clock is greatly changed to the end of detection of the player indicated by the detection metadata Player.

<Outline of Cutting of Cut Scene by Rule Engine 42>

Figure 7:
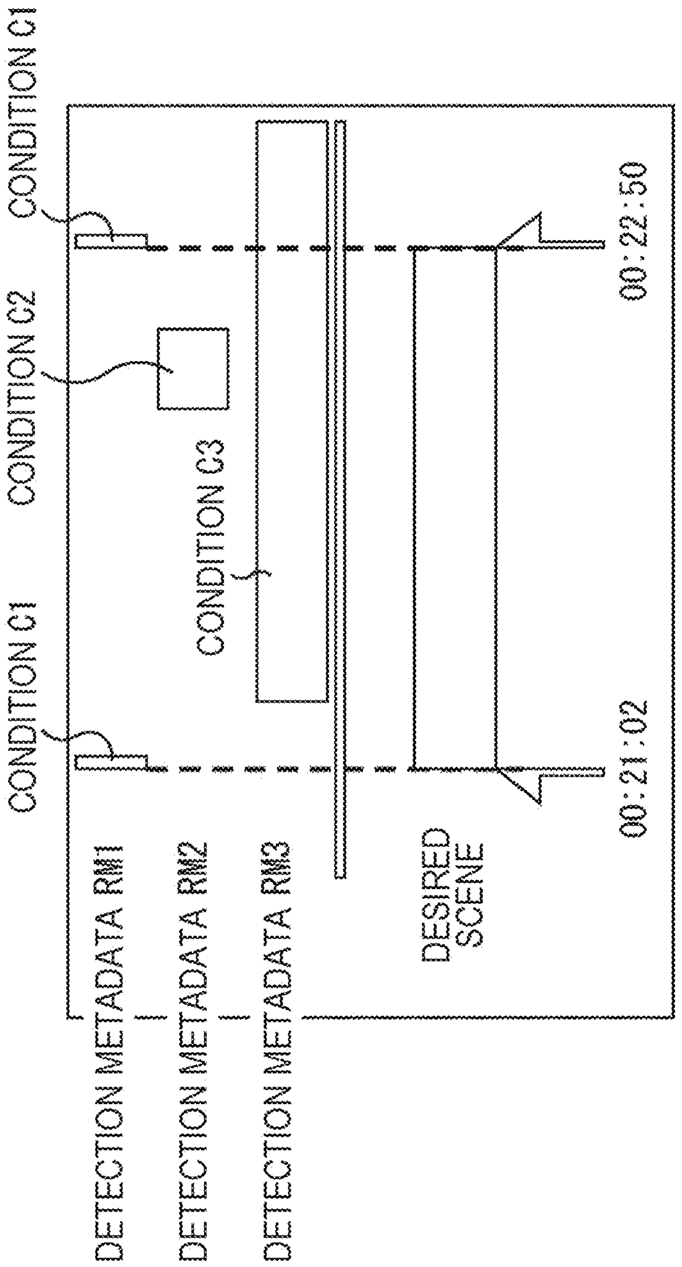
FIG. 7 is a diagram illustrating an example of cutting a cut scene by the rule engine 42.

FIG. 7 is a diagram illustrating an example of the cutting of the cut scene by the rule engine 42.

In FIG. 7, the cutting rule is that a position (frame) where (the cutting metadata generated on the basis of) detection metadata RM1 detected from a content satisfies a condition C1 is set as an IN point and an OUT point and that detection metadata RM2 satisfies a condition C2 and detection metadata RM3 satisfies a condition C3 in a section from the IN point to the OUT point. Then, the cut scene is cut from the content according to such a cutting rule.

<Outline of Processing of Content Analysis Device 30>

Figure 8:
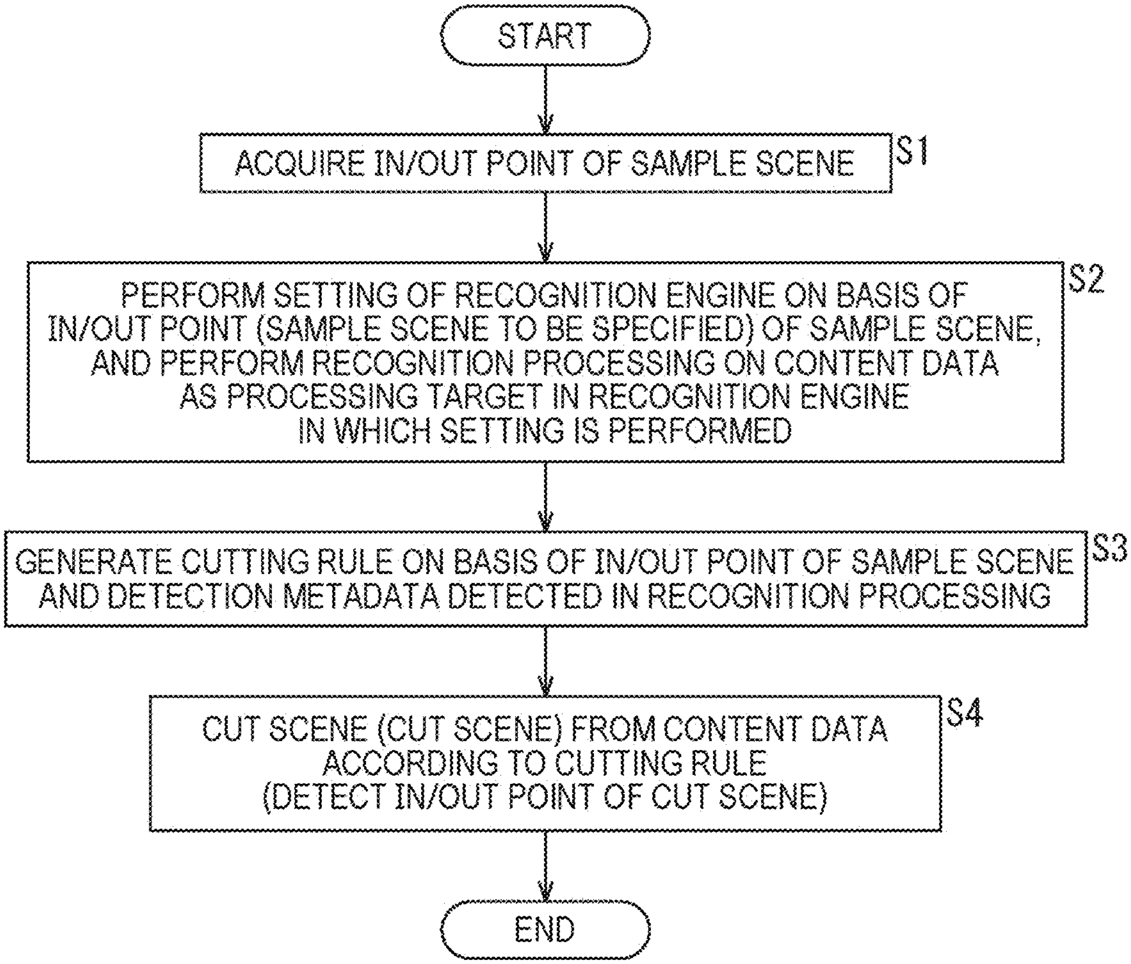
FIG. 8 is a flowchart for describing an outline of processing of the content analysis device 30.

FIG. 8 is a flowchart for describing an outline of processing of the content analysis device 30.

In step S1, the content analysis device 30 acquires the IN point and the OUT point of the sample scene designated by the user for the content, and the processing proceeds to step S2.

In step S2, the content analysis device 30 performs setting of the recognition engine 41 on the basis of (the sample scene specified by) the IN point and the OUT point of the sample scene.

That is, the content analysis device 30 selects, as a selection engine, a recognition engine that performs the recognition processing on the content as the processing target from among the plurality of recognition engines included in the recognition engine 41.

In the selection of the selection engine, for example, a recognition engine determined in advance for every category of the content can be selected as the selection engine, or a recognition engine corresponding to an operation of the user (operation of the terminal 10 by the user) can be selected as the selection engine. Furthermore, as described later, a recognition engine to be a selection engine can be selected on the basis of a state of the operation of the user.

The content analysis device 30 performs setting of the selection engine on the basis of the IN point and the OUT point of the sample scene. In the setting of the selection engine, the dictionary, the BBOX, the threshold value, and the like to be used for the recognition processing are set.

In addition, for example, in a case where the selection engine is a recognition engine that performs template matching, a template is set. Furthermore, for example, setting based on the high-context interpretation of the text in the BBOX and the like, for example, setting of correction in a case where the text in the BBOX described in FIG. 3 is erroneously recognized, and the like are performed.

After the setting of the selection engine, the content analysis device 30 performs the recognition processing on the content as the processing target by the set selection engine, and detects (generates) various kinds of detection metadata, and the processing proceeds from step S2 to step S3.

In step S3, the content analysis device 30 generates the cutting rule in which (the cutting metadata generated on the basis of) the detection metadata is combined on the basis of the IN point and the OUT point of the sample scene and the detection metadata detected in the recognition processing of the selection engine.

The content analysis device 30 sets the cutting rule in the rule engine 42, and the processing proceeds from step S3 to step S4.

In step S4, the content analysis device 30 cuts the cut scene from the content on the basis of (the cutting metadata generated on the basis of) the detection metadata detected from the content according to the cutting rule by the rule engine 42. That is, the content analysis device 30 detects the IN point and the OUT point of the cut scene.

Then, the content analysis device 30 transmits the cut scene information including the IN point and the OUT point of the cut scene to the content management device 20, and the processing is ended.

As described above, in the content analysis device 30, the recognition engine 41 (selection engine) and the rule engine 42 are set on the basis of (the IN point and the OUT point of) the sample scene designated by the user. Accordingly, the user can easily set up the recognition engine 41 and the rule engine 42 only by designating the sample scene.

Note that, in the present embodiment, the content analysis device 30 will be mainly described by using the content of the sports game as an example, but the content analysis device 30 can be used for processing various contents including various scenes other than the sports game.

<Hardware Configuration Example of Content Analysis Device 30>

Figure 9:
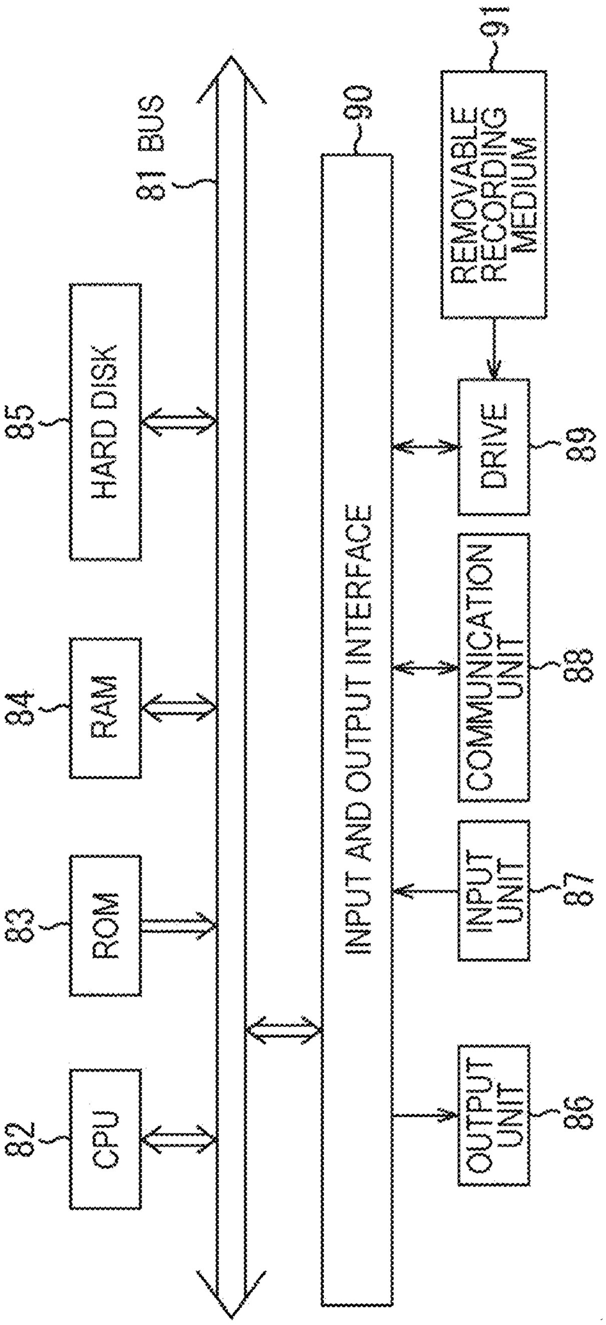
FIG. 9 is a diagram illustrating a hardware configuration example of the content analysis device 30.

FIG. 9 is a diagram illustrating a hardware configuration example of the content analysis device 30.

The content analysis device 30 includes, for example, a computer.

A program executed by the computer can be recorded in advance in a hard disk 85 or a ROM 83 as a recording medium incorporated in the computer.

Alternatively or furthermore, the program can also be retained (recorded) in a removable recording medium 91 driven by a drive 89. Such a removable recording medium 91 can be provided as so-called packaged software. Here, examples of the removable recording medium 91 include, for example, a flexible disk, a compact disc read only memory (CD-ROM), a magneto optical (MO) disk, a digital versatile disc (DVD), a magnetic disk, a semiconductor memory, and the like.

Note that, in addition to installing the program on the computer from the removable recording medium 91 described above, the program can be downloaded to the computer via a communication network or a broadcasting network and can be installed on the hard disk 85 to be incorporated. In other words, for example, the program can be wirelessly transferred from a download site to the computer through an artificial satellite for digital satellite broadcasting, or can be transferred by a wire to the computer through a network such as a local area network (LAN) and the Internet.

The computer has an incorporated central processing unit (CPU) 82, and an input and output interface 90 is connected to the CPU 82 through a bus 81.

Upon receiving a command input by an operator, for example, by operating an input unit 87 through the input and output interface 90, the CPU 82 executes a program retained in the read only memory (ROM) 83 accordingly. Alternatively, the CPU 82 loads a program retained in the hard disk 85 into a random access memory (RAM) 84 to execute the program.

Therefore, the CPU 82 performs various kinds of processing described in the present specification. Then, as necessary, the CPU 82 outputs a processing result from an output unit 86, or transmits the processing result from a communication unit 88, and further causes the hard disk 85 to record the processing result, and the like, through the input and output interface 90, for example.

Note that, the input unit 87 includes a keyboard, a mouse, a microphone, and the like, and receives an input from an operator of the information processing system 1. Furthermore, the output unit 86 includes a liquid crystal display (LCD), a speaker, and the like, and displays (outputs) an image, outputs sound, and the like.

Similarly to content analysis device 30, the terminal 10 and the content management device 20 can also be constructed with a computer. Performance (capacity, processing speed, and the like) of each block constituting the computer may be different depending on the terminal 10, the content management device 20, and the content analysis device 30.

<Functional Configuration Example of Content Analysis Device 30>

Figure 10:
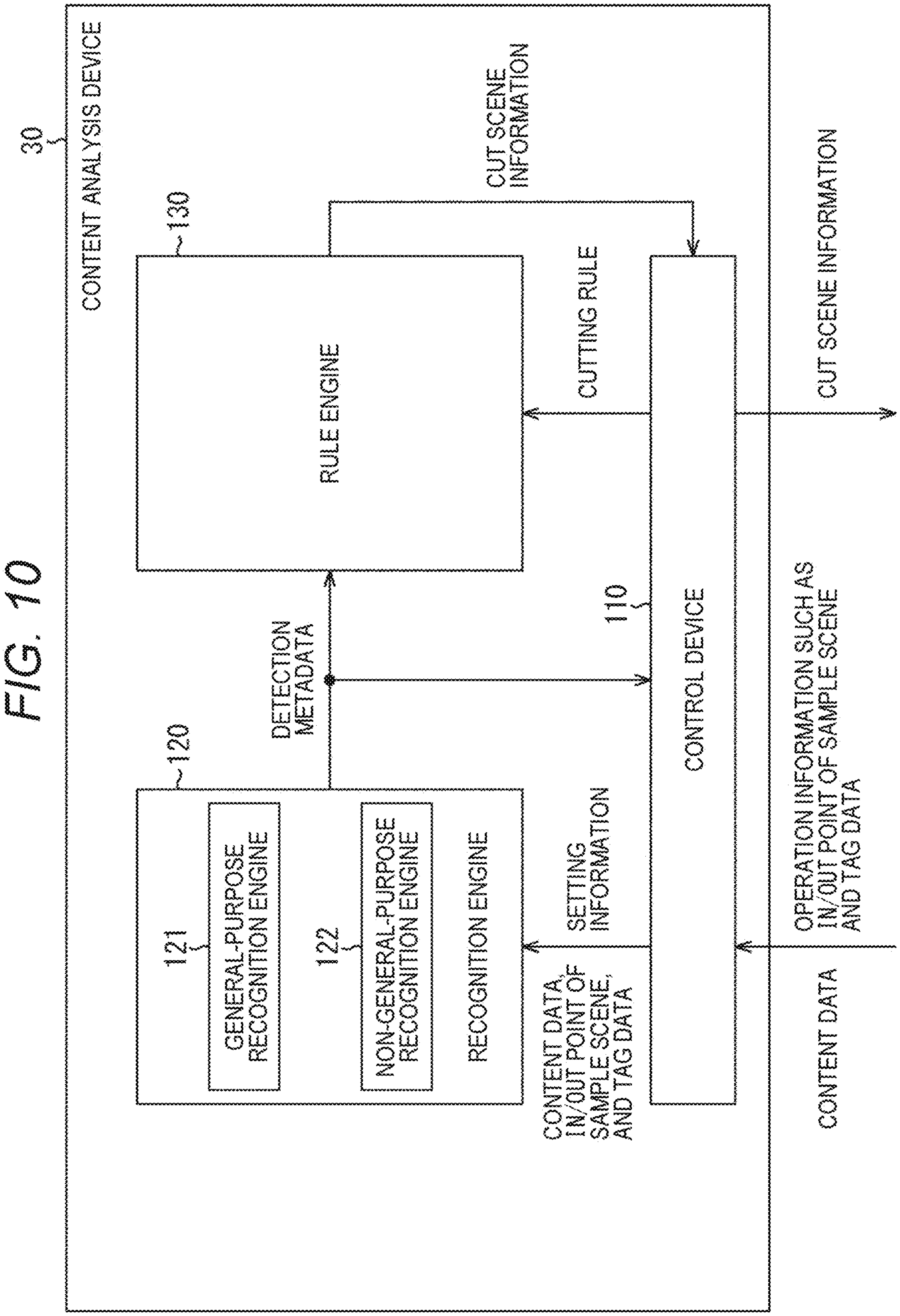
FIG. 10 is a block diagram illustrating a functional configuration example of the content analysis device 30.

FIG. 10 is a block diagram illustrating a functional configuration example of the content analysis device 30.

The functional configuration example of FIG. 10 is realized by a CPU 102 (FIG. 9) executing a program.

In FIG. 10, the content analysis device 30 includes a control device 110, a recognition engine 120, and a rule engine 130.

Content (data) is supplied (transmitted) from the content management device 20 to the control device 110. Furthermore, to the control device 110, detection metadata is supplied from the recognition engine 120, and is supplied with cut scene information and the like are supplied from the rule engine 130.

Moreover, to the control device 110, operation information regarding an operation of the terminal 10 by the user, such as an IN point and an OUT point of the sample scene designated by the user, tag data, and the like, is supplied from the terminal 10 (via the content management device 20).

In addition, the operation information includes a point position of a pointing device such as a mouse operated by the user.

The control device 110 supplies the content, the IN point and the OUT point of the sample scene, and the tag data to the recognition engine 120, and causes the recognition engine 120 to perform the recognition processing on the entire content as the processing target and the recognition processing based on (the IN point and the OUT point of) the sample scene.

The control device 110 performs setting of the recognition engine 120 by generating necessary setting information to be set in the recognition engine 120 on the basis of (the sample scene specified by) the IN point and the OUT point of the sample scene and supplying the setting information to the recognition engine 120.

The control device 110 generates the cutting rule on the basis of (the cutting metadata generated on the basis of) the detection metadata output from recognition engine 120 and (the sample scene specified by) the IN point and the OUT point of the sample scene. The control device 110 supplies (sets) the cutting rule to the rule engine 130.

The control device 110 supplies (transmits) the cut scene information and the like output from the rule engine 130 to the terminal 10 (via the content management device 20).

The recognition engine 120 and the rule engine 130 are the recognition engine 41 and the rule engine 42 of FIG. 2, respectively.

The recognition engine 120 includes a plurality of recognition engines (recognition units) that perform the recognition processing on various recognition targets, performs the recognition processing using content as a processing target, and outputs detection metadata obtained by the recognition processing to the control device 110 and the rule engine 130.

In the present embodiment, the plurality of recognition engines included in the recognition engine 120 are classified into one or both of a general-purpose recognition engine 121 and a non-general-purpose recognition engine 122.

Whether each of the plurality of recognition engines included in the recognition engine 120 is the general-purpose recognition engine 121 or the non-general-purpose recognition engine 122 can be determined in advance.

For example, a recognition engine that can be used without setting (including a recognition engine having a setting unnecessary mode), a recognition engine that can obtain a recognition result with a predetermined accuracy or more with preset default setting, or a recognition engine that is such a recognition engine and has a light load can be determined as the general-purpose recognition engine.

A recognition engine other than the recognition engine determined to be the general-purpose recognition engine 121 may be determined to be the non-general-purpose recognition engine 122.

The general-purpose recognition engine 121 may also be used as the non-general-purpose recognition engine 122.

The recognition engine serving as the general-purpose recognition engine 121 and the recognition engine serving as the non-general-purpose recognition engine 122 can be appropriately changed, for example, according to the category of the content processed by the content analysis device 30.

The rule engine 130 cuts the cut scene from the content according to the cutting rule from control device 110 on the basis of (the cutting metadata generated on the basis of) the detection metadata output from recognition engine 120 (detects the IN point and the OUT point of the cut scene). The rule engine 130 generates the cut scene information including the IN point and the OUT point of the cut scene, and supplies (outputs) the cut scene information to the control device 110.

<Configuration Example of Control Device 110>

Figure 11:
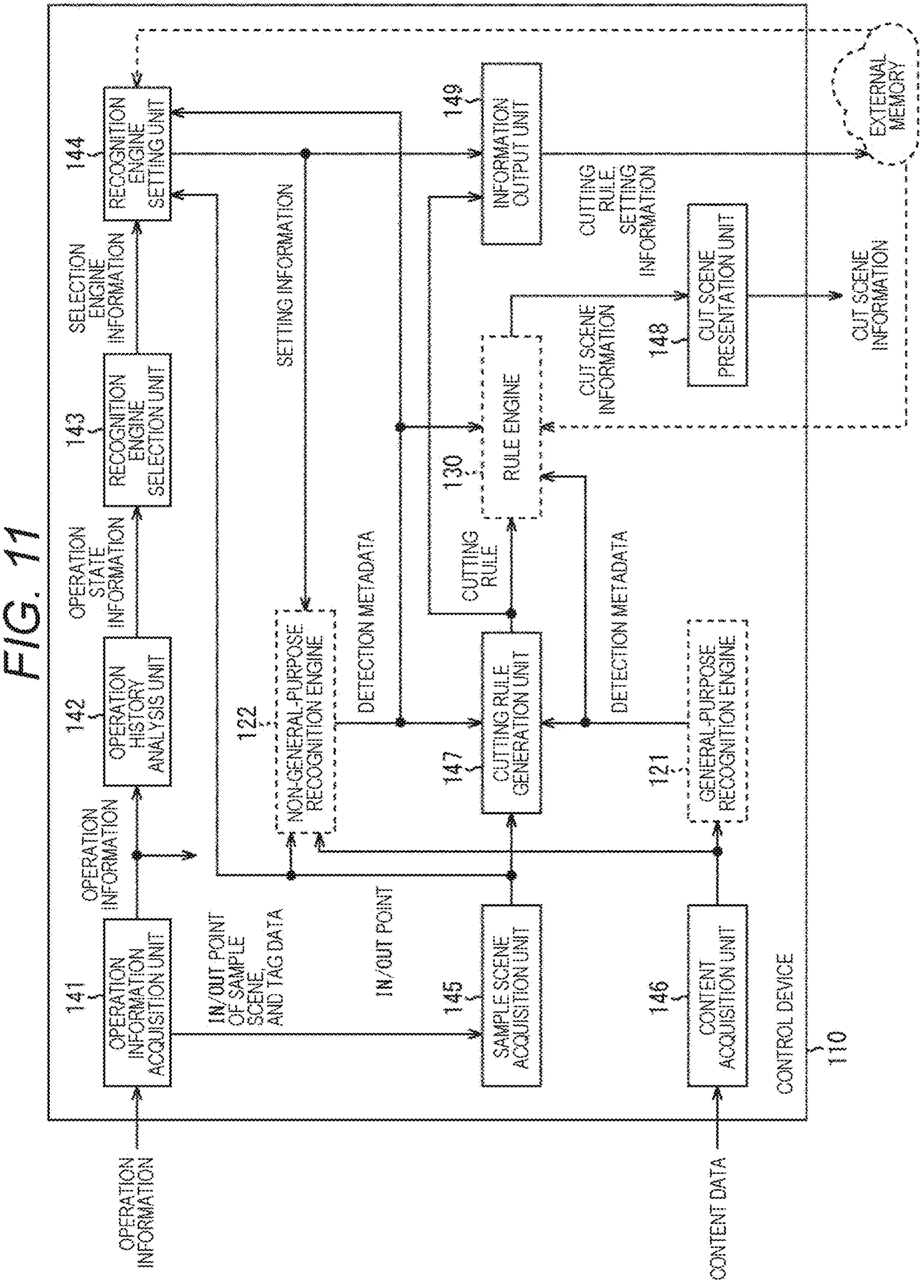
FIG. 11 is a block diagram illustrating a configuration example of a control device 110.

FIG. 11 is a block diagram illustrating a configuration example of the control device 110.

In FIG. 11, the control device 110 includes an operation information acquisition unit 141, an operation history analysis unit 142, a recognition engine selection unit 143, a recognition engine setting unit 144, a sample scene acquisition unit 145, a content acquisition unit 146, a cutting rule generation unit 147, a cut scene presentation unit 148, and an information output unit 149.

The operation information acquisition unit 141 acquires operation information from the terminal 10 supplied to the control device 110, and supplies the operation information to the operation history analysis unit 142, the sample scene acquisition unit 145, and other necessary blocks.

The operation history analysis unit 142 functions as a generation unit that analyzes an operation history on the basis of the operation history which is a time series of the operation information from the operation information acquisition unit 141 and generates operation state information indicating a state of the operation of the user on the terminal 10.

For example, the operation history analysis unit 142 analyzes a time series of a point position when the user designates the IN point and the OUT point of the sample scene in the content, and generates operation state information indicating whether the user designates the IN point and the OUT point slowly or quickly when the user designates the IN point and the OUT point on the timeline of the content. The operation history analysis unit 142 supplies the operation state information to the recognition engine selection unit 143.

The recognition engine selection unit 143 selects a recognition engine to be used for the recognition processing on the content on the basis of at least one of a moving speed, a moving direction, or a feature amount of movement of the operation of the user. For example, the recognition engine selection unit 143 selects a recognition engine (prioritized recognition engine) to be used for the recognition processing on the content as the processing target from among the plurality of recognition engines (recognition units) as the non-general-purpose recognition engine 122 on the basis of the operation state information from the operation history analysis unit 142. The recognition engine selection unit 143 supplies, to the recognition engine setting unit 144, selection engine information indicating a selection engine which is a recognition engine selected from the plurality of recognition engines as the non-general-purpose recognition engine 122.

In the recognition engine selection unit 143, the selection of the selection engine can be performed on the basis of the operation state information, or can be performed in accordance with the operation (operation information) of the user designating the selection engine.

Furthermore, for the selection of the selection engine, a selection rule for selecting the selection engine can be determined in advance, for example, the recognition engine to be selected as the selection engine can be determined in advance for every category of the content as the processing target by the non-general-purpose recognition engine 122. In this case, the selection engine may be selected according to the selection rule determined in advance.

The selection engine is selected on the basis of the operation state information in the recognition engine selection unit 143, and thus, it is possible to select and use a recognition engine that performs recognition processing appropriate for accurate cutting of a desired scene.

Furthermore, the recognition engine selection unit 143 selects, as selection engines, some recognition engines among the plurality of recognition engines as the non-general-purpose recognition engine 122.

Only some recognition engines are selected as the selection engines instead of all of the plurality of recognition engines as the non-general-purpose recognition engine 122, and thus, it is possible to reduce a load of the recognition processing and shorten a period of time required for the recognition processing.

Furthermore, in the present embodiment, the setting (generation of setting information) of the non-general-purpose recognition engine 122 may be performed in accordance with the operation of the user. Therefore, only some recognition engines are selected as the selection engines instead of all of the plurality of recognition engines as the non-general-purpose recognition engine 122, and thus, it is possible to reduce an operation burden on the user in the setting of the selection engines.

In addition to the selection engine information supplied from the recognition engine selection unit 143, the IN point and the OUT point of the sample scene are supplied from the sample scene acquisition unit 145 to the recognition engine setting unit 144. Moreover, the detection metadata is supplied from the non-general-purpose recognition engine 122 to the recognition engine setting unit 144.

The recognition engine setting unit 144 functions as a setting unit that sets (the selection engine of) the non-general-purpose recognition engine 122 on the basis of (the sample scene specified by) the IN point and the OUT point of the sample scene from the sample scene acquisition unit 145.

The recognition engine setting unit 144 specifies a selection engine that causes a plurality of recognition engines as the non-general-purpose recognition engine 122 to perform the recognition processing on the basis of the selection engine information from the recognition engine selection unit 143.

The recognition engine setting unit 144 generates setting information to be set in the selection engine on the basis of the IN point and the OUT point of the sample scene from the sample scene acquisition unit 145, and necessary detection metadata or the like supplied from the non-general-purpose recognition engine 122.

The recognition engine setting unit 144 supplies and sets the setting information of the selection engine to and in the selection engine of the non-general-purpose recognition engine 122. Moreover, the recognition engine setting unit 144 supplies the setting information of the selection engine to the information output unit 149.

The sample scene acquisition unit 145 acquires the IN point and the OUT point of the sample scene and the tag data from the operation information from the operation information acquisition unit 141, and supplies the IN point and the OUT point and the tag data to the non-general-purpose recognition engine 122, the recognition engine setting unit 144, and the cutting rule generation unit 147.

The content acquisition unit 146 acquires content supplied from the content management device 20 to the control device 110, and supplies the content to (the selection engine of) the general-purpose recognition engine 121, the non-general-purpose recognition engine 122, and the like.

To the cutting rule generation unit 147, the IN point and the OUT point of the sample scene is supplied from the sample scene acquisition unit 145, and the detection metadata output from the selection engine of the general-purpose recognition engine 121 and the non-general-purpose recognition engine 122 is also supplied.

The cutting rule generation unit 147 generates the cutting rule on the basis of (the cutting metadata generated on the basis of) the detection metadata output by the selection engine set in the general-purpose recognition engine 121 or the non-general-purpose recognition engine 122 performing the recognition processing on the content from content acquisition unit 146 as the processing target, and (the sample scene specified by) the IN point and the OUT point of the sample scene from sample scene acquisition unit 145.

The cutting rule generation unit 147 supplies and sets the generated cutting rule to and in the rule engine 130. Moreover, the cutting rule generation unit 147 supplies the cutting rule to the information output unit 149.

The cut scene information is supplied from the rule engine 130 to the cut scene presentation unit 148. The cut scene presentation unit 148 supplies (transmits) the cut scene information from the rule engine 130 to the terminal 10 (via the content management device 20), and the terminal 10 displays at least one or more cut scenes specified by the IN point and the OUT point included in the cut scene information to present the cut scene information to the user.

The information output unit 149 outputs (transmits) the setting information of the selection engine supplied from the recognition engine setting unit 144 and the cutting rule supplied from the cutting rule generation unit 147 to an outside.

For example, the information output unit 149 can output and store the setting information and the cutting rule to an external memory (storage device), for example, a storage on a cloud.

The setting information and the cutting rule stored in the external memory can be downloaded as necessary and can be supplied to the rule engine 130 and the recognition engine setting unit 144, respectively.

For example, in a case where a desired scene is cut from content of the same category (sports and the like) as the content used to generate the setting information and the cutting rule stored in the external memory, the setting information and the cutting rule can be downloaded from the external memory to the recognition engine setting unit 144 and the rule engine 130, respectively. Then, the recognition engine setting unit 144 can set the setting information in the non-general-purpose recognition engine 122, and the rule engine 130 can set the cutting rule and can cut the cut scene from the content.

Note that, in FIG. 11, the general-purpose recognition engine 121 performs the recognition processing on the content from the content acquisition unit 146 as the processing target, detects the detection metadata, and supplies the detection metadata to the rule engine 130 and the cutting rule generation unit 147.

The non-general-purpose recognition engine 122 performs the recognition processing on the content from the content acquisition unit 146 as the processing target on the basis of (the sample scene specified by) the IN point and the OUT point of the sample scene from the sample scene acquisition unit 145. The non-general-purpose recognition engine 122 supplies the detection metadata detected by the recognition processing based on (the sample scene specified by) the IN point and the OUT point of the sample scene to the recognition engine setting unit 144.

Furthermore, (the selection engine of) the non-general-purpose recognition engine 122 sets the setting information from the recognition engine setting unit 144. The non-general-purpose recognition engine 122 in which the setting information is set performs the recognition processing on the entire content from the content acquisition unit 146 as the processing target, and supplies detection metadata detected by the recognition processing to the rule engine 130 and the cutting rule generation unit 147.

Here, each block constituting the control device 110 can control another block as necessary. In FIG. 11, in order to avoid complication of the drawing, illustration of a control line in which each block constituting the control device 110 controls another block is appropriately omitted.

<Examples of Plural Recognition Engines Included in Recognition Engine>

FIG. 12 is a diagram illustrating an example of the plurality of recognition engines included in the recognition engine 120.

Examples of the plurality of recognition engines included in the recognition engine 120 (FIG. 9) include a camera SW recognition engine, an object recognition engine, a text recognition engine, a graphic recognition engine, a color recognition engine, an excitement recognition engine, a specific sound detection (recognition) engine, a CM detection (recognition) engine, a matching recognition engine, an emotion recognition engine, a posture recognition engine, a shot composition recognition engine, a camera motion recognition engine, and an action recognition engine. In addition, the recognition engine 120 can include an engine that recognizes (detects) various recognition targets and detects various kinds of detection metadata regarding the recognition targets.

The camera SW recognition engine performs the recognition processing on camera SW as the recognition target. For example, a dictionary for recognizing normal cut camera SW and a dictionary for recognizing dissolve camera SW to which an effect is applied can be prepared as a dictionary for recognizing the camera SW.

For example, the camera SW recognition engine outputs, as the detection metadata, a time code (TC) and the like of a frame in which the camera SW is detected (recognized) in the content.

Examples of the setting of the camera SW recognition engine include setting of a dictionary to be used for the recognition processing, setting of a threshold value calculated in the recognition processing and compared with an existence probability that the camera SW which is the recognition target is present, and the like. In a case where the existence probability is more than or equal to a threshold value (in a case where the existence probability is more than the threshold value), the camera SW is recognized (is present).

As the setting of the dictionary and the threshold value to be used for the recognition processing of the camera SW recognition engine, default settings can be determined in advance.

The object recognition engine performs the recognition processing on an object as the recognition target. For example, a general-purpose dictionary for recognizing a general object and a specialized dictionary for recognizing an object related to an attribute of content (for example, an object appearing in the American football game) can be prepared as a dictionary for recognizing the object.

For example, the object recognition engine outputs, as the detection metadata, TC of a frame in which an object of a specific class (category) is detected (recognized), information (BBOX information) of a BBOX surrounding the specific object, and the like. The BBOX information includes information on a position and a size of the BBOX.

Examples of the setting of the object recognition engine include setting of a dictionary to be used for the recognition processing, setting of a threshold value calculated in the recognition processing and compared with an existence probability that a specific object which is the recognition target is present, and the like. As the setting of the dictionary and the threshold value to be used for the recognition processing of the object recognition engine, default setting can be determined in advance.

The text recognition engine performs the recognition processing on text (one or more characters (strings)) as the recognition target. For example, a dictionary for recognizing general characters and a numeral-specialized dictionary for recognizing numerals can be prepared as the dictionary for recognizing the text.

For example, the text recognition engine outputs, as the detection metadata, a text detection (recognition) result in a designated portion, TC of a frame in which text is detected, and the like.

Examples of the setting of the text recognition engine include setting of a dictionary to be used for the recognition processing and setting of a threshold value to be compared with an existence probability that a specific text (character) which is the recognition target is present, which is calculated in the recognition processing, and the like.

Moreover, examples of the setting of the text recognition engine include setting of a BBOX for designating a portion where the text is recognized, setting for correction in a case where the text in the BBOX is erroneously recognized, and the like.

The setting of the dictionary to be used for the recognition processing of the text recognition engine can be performed in accordance with, for example, the set character attribute of the BBOX.

The graphic recognition engine performs recognition processing on graphics (graphics) as the recognition target.

The graphic recognition engine outputs, for example, TC of a frame in which a graphic similar to (matching with) the graphic registered in the designated portion appears as the detection metadata.

Examples of the setting of the graphic recognition engine include setting of a threshold value to be compared with an existence probability that the graphic which is the recognition target is present, which is calculated in the recognition processing, and the like.

Moreover, examples of the setting of the graphic recognition engine include setting of a BBOX that designates a portion where the graphic is recognized, setting (registration) of a template used in template matching in the recognition processing, and setting of a mode of the recognition processing.

Examples of the mode of the recognition processing of the graphic recognition engine include a template matching mode and a graphic detection mode.

The template matching mode is a mode for performing matching with a graphic (set template) registered in the designated portion (set BBOX). The graphic detection mode is a mode for detecting any graphic without designating a portion where the graphic is recognized and without using a template.

In the template matching mode, the setting of the BBOX, the template, and the like is required for the recognition processing, but in the graphic detection mode, the recognition processing can be performed without the necessary setting in the template matching mode.

The color recognition engine performs the recognition processing (color counting) on a color as the recognition target.

For example, the color recognition engine outputs, as the detection metadata, TC of a frame in which a color registered in a designated portion appears, the number of registered colors appearing in the designated portion (the number of regions painted in the registered color), and the like.

Examples of the setting of the color recognition engine include setting of a threshold value to be compared with an existence probability that the color which is the recognition target is present, which is calculated in the recognition processing, setting of a mode of the recognition processing, and the like.

As the mode of the recognition processing of the color recognition engine, for example, there are a general-purpose detection mode and a specialization mode for recognizing a color of display related to the attribute of the content.

The general-purpose detection mode is a mode for performing the recognition processing without particularly limiting a target for which the color is recognized. Furthermore, the specialization mode includes, for example, a BSO specialization mode, and is a mode for performing the recognition processing with a target for which the color is recognized limited to a BSO (ball, strike, and out) display displayed in a baseball game.

The excitement recognition engine performs the recognition processing on the excitement as the recognition target.

For example, the excitement recognition engine outputs, as the detection metadata, an excitement score in a unit of a predetermined period of time such as 1 second (is), TC of a frame in an excitement section which is a section in which the excitement score exceeds a threshold value, and the like.

Examples of the setting of the excitement recognition engine include setting of a threshold value to be compared with an excitement score calculated in the recognition processing.

For example, the specific sound detection engine performs the recognition processing (detection of specific sound) on the specific sound (specific sound) such as shot sound or clapping sound as the recognition target.

For example, the specific sound detection engine outputs, as the detection metadata, TC of a frame in which the specific sound is detected and the like.

Examples of the setting of the specific sound detection engine include setting of a dictionary to be used for the recognition processing, setting of a threshold value to be compared with an excitement score, and the like.

The CM detection engine performs the recognition processing on a commercial message (CM) as the recognition target.

For example, the CM detection engine outputs, as the detection metadata, TC of a frame in a section in which the CM is detected.

Examples of setting of the CM detection engine include setting of a threshold value to be compared with an existence probability that the CM which is the recognition target is present, which is calculated in the recognition processing, setting of a country mode, and the like. The country mode indicates a country in which the CM is broadcasted. Since a method for detecting the CM performed in the recognition processing is different depending on the country in which the CM is broadcasted, the country mode is set.

The matching recognition engine performs matching as the recognition processing on predetermined data as the recognition target.

For example, the matching recognition engine outputs, as the detection media data, text or sound of a predetermined script as predetermined media data (another data), TC of a frame matched with a predetermined pre-visualization, or the like.

Examples of the setting of the matching recognition engine include setting of predetermined media data (template) and setting of a threshold value to be compared with an existence probability that data matching with the predetermined media data is present, which is calculated in the recognition processing, and the like.

For example, the emotion recognition engine performs the recognition processing on six emotions such as joy, sorrow, anger, surprise, fear, and disgust as the recognition target.

For example, the emotion recognition engine outputs, as the detection metadata, a type of the recognized emotion among the six emotions, TC of a frame in which the emotion is recognized, and the like.

Examples of setting of the emotion recognition engine include setting of a threshold value to be compared with an existence probability that the emotion which is the recognition target is present, which is calculated in the recognition processing, and the like.

The posture recognition engine performs the recognition processing on a posture of a person as the recognition target, for example.

For example, the posture recognition engine outputs, as the detection metadata, skeleton information of the posture of the person, TC of a frame in which a posture of the skeleton information is recognized, and the like.

Examples of the setting of the posture recognition engine include setting of a threshold value to be compared with an existence probability that the posture which is the recognition target is present, which is calculated in the recognition processing, and the like.

The shot composition recognition engine performs the recognition processing on the shot and the composition as the recognition target.

For example, the shot composition recognition engine outputs, as the detection metadata, information of a composition (for example, bust shot or the like) estimated from skeleton information of the person, TC of a frame in which a composition is recognized, and the like.

Examples of the setting of the shot composition recognition engine include setting of a threshold value to be compared with an existence probability that the composition which is the recognition target is present, which is calculated in the recognition processing, and the like.

The camera motion recognition engine performs the recognition processing on the movement of the camera as the recognition target.

For example, the camera motion recognition engine outputs, as the detection metadata, information on the movement of the camera detected from an optical flow, TC of a frame in which the movement of the camera has occurred, and the like.

Examples of the setting of the camera motion recognition engine include setting of a threshold value to be compared with an existence probability that the movement of the camera which is the recognition target is present, which is calculated in the recognition processing, and the like.

The action recognition engine performs the recognition processing on a predetermined action (for example, shot, path, or the like) of the person as the recognition target.

For example, for example, in a case where the content includes an image imaged by a multi-camera, the action recognition engine outputs, as the detection metadata, information (action result) of the action recognized from three-dimensional data obtained from the image of the multi-camera, TC of a frame in which the action is performed, and the like.

Examples of the setting of the action recognition engine include setting of a threshold value to be compared with an existence probability that the action which is the recognition target is present, which is calculated in the recognition processing.

In the present embodiment, among the above recognition engines included in the recognition engine 120, for example, the camera SW recognition engine and the object recognition engine are classified into the general-purpose recognition engine 121, and the other recognition engines are classified into the non-general-purpose recognition engine 122. Note that, the camera SW recognition engine and the object recognition engine classified into the general-purpose recognition engine 121 can also be classified as the non-general-purpose recognition engine 122.

<Processing of Control Device 110>

Figure 13:
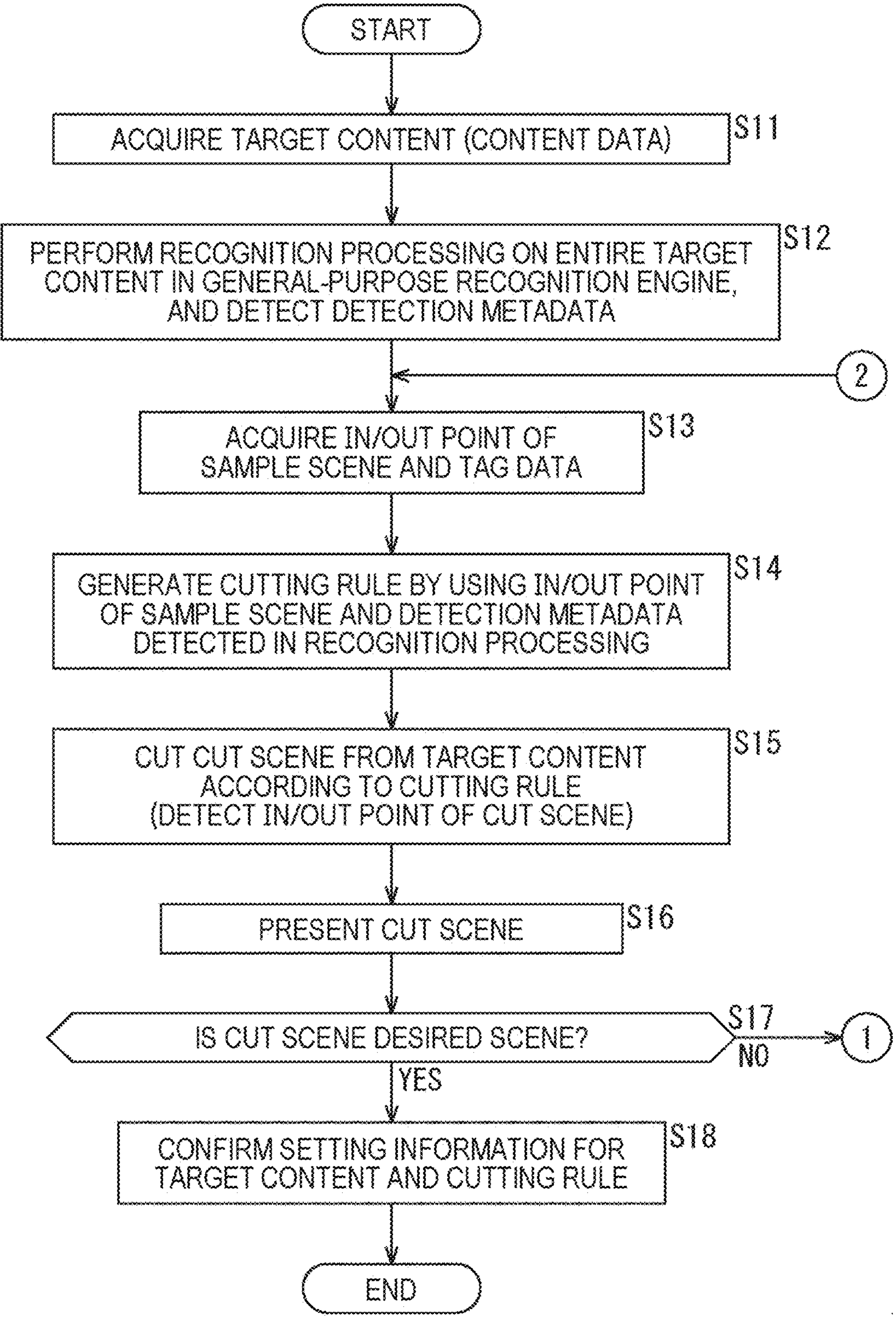
FIG. 13 is a flowchart for describing an example of processing of the control device 110.
Figure 14:
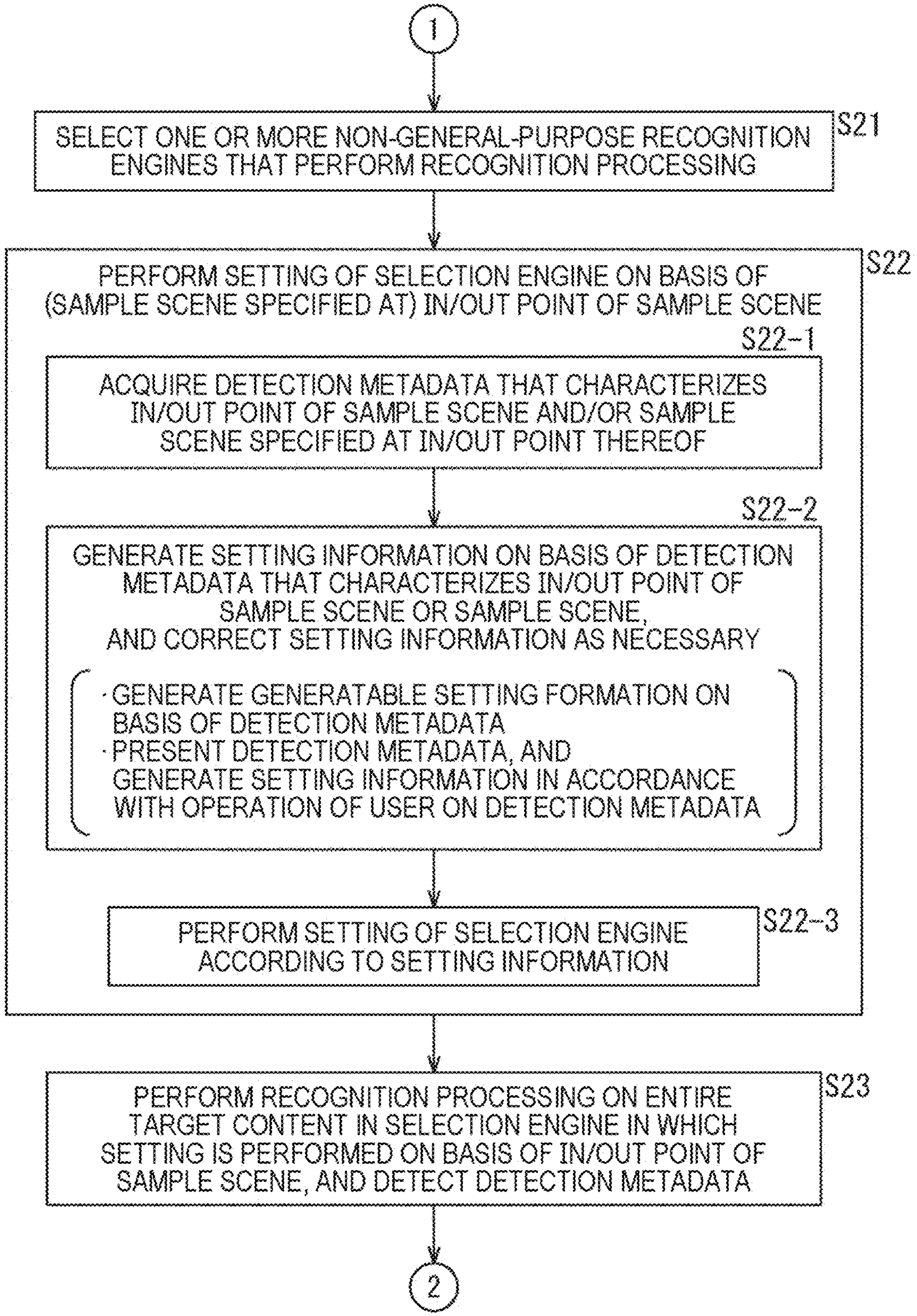
FIG. 14 is a flowchart for describing an example of the processing of the control device 110.

FIG. 13 is a flowchart for describing an example of processing of the control device 110. FIG. 14 is a flowchart subsequent to the flowchart of FIG. 13.

In the control device 110 (FIG. 11), in step S11, the content acquisition unit 146 acquires, as target content, the content to be used to create the cutting rule and supplies the target content to the general-purpose recognition engine 121 and the non-general-purpose recognition engine 122, and the processing proceeds to step S12.

In step S12, the control device 110 causes the general-purpose recognition engine 121 to perform the recognition processing on the entire target content as the processing target and detect the detection metadata, and the processing proceeds to step S13.

The detection metadata detected by the general-purpose recognition engine 121 is supplied to the rule engine 130 and the cutting rule generation unit 147.

In step S13, the sample scene acquisition unit 145 waits for the user to designate (input) an IN point and an OUT point of each of one or more sample scenes of the target content and the necessary tag data, and acquires the IN point and the OUT point of each of the one or more sample scenes designated by the user for the target content and the tag data from the operation information regarding the operation of the terminal 10 by the user. The sample scene acquisition unit 145 supplies the IN point and the OUT point of the sample scene and the tag data to the non-general-purpose recognition engine 122, the recognition engine setting unit 144, and the cutting rule generation unit 147, and the processing proceeds from step S13 to step S14.

In step S14, the cutting rule generation unit 147 generates the cutting rule on the basis of the IN point and the OUT point of the sample scene from the sample scene acquisition unit 145 and the detection metadata detected in the recognition processing of the recognition engine 120. The cutting rule generation unit 147 supplies the cutting rule to the rule engine 130 and the information output unit 149, and the processing proceeds from step S14 to step S15.

Here, in a case where the processing of step S14 is performed first, the detection metadata detected by the general-purpose recognition engine 121 of the recognition engine 120 in the processing of previous step S12 is used for generating the cutting rule in the cutting rule generation unit 147.

In the processing of step S14 after a second time, the latest detection metadata detected by the non-general-purpose recognition engine 122 of the recognition engine 120 in the processing of step S23 of FIG. 14 as described later is used for generating the cutting rule in the cutting rule generation unit 147.

In step S15, the control device 110 causes the rule engine 130 to cut the cut scene from the target content according to the cutting rule (detects the IN point and the OUT point of the cut scene). The rule engine 130 generates the cut scene information including the IN point and the OUT point of the cut scene cut from the target content according to the cutting rule generated by the cutting rule generation unit 147 and supplies the cut scene information to the cut scene presentation unit 148, and the processing proceeds from step S15 to step S16.

In step S16, the cut scene presentation unit 148 presents the cut scene to the user on the basis of the cut scene information from the rule engine 130, and the processing proceeds to step S17.

That is, the cut scene presentation unit 148 supplies the cut scene information from the rule engine 130 to the terminal 10, and the terminal 10 displays at least one or more of the cut scenes specified by the IN point and the OUT points included in the cut scene information to present the cut scene information to the user.

In step S17, the control device 110 determines whether or not the cut scene is the desired scene desired by the user.

In step S17, in a case where it is determined that the cut scene is the desired scene, for example, the user operates the terminal 10 to agree that the cut scene presented in previous step S16 is the desired scene, and in a case where the operation information indicating the operation is acquired by the operation information acquisition unit 141, the processing proceeds to step S18.

In step S18, the information output unit 149 confirms, as the setting information and the cutting rule for the target content, latest setting information from the recognition engine setting unit 144 and a latest cutting rule from the cutting rule generation unit 147, and the processing is ended.

Note that, in a case where the cutting rule generated on the basis of the detection metadata detected by the general-purpose recognition engine 121 in step S12 is confirmed as the cutting rule for the target content, the information output unit 149 confirms, as the latest setting information from the recognition engine setting unit 144, information of an instruction to use the general-purpose recognition engine 121 for the recognition processing as the setting information for the target content.

On the other hand, in a case where it is determined in step S17 that the cut scene is not the desired scene, for example, in a case where the user operates the terminal 10 not to agree that the cut scene is the desired scene and the operation information indicating the operation is acquired by the operation information acquisition unit 141, the processing proceeds to step S21 of FIG. 14.

In step S21, the recognition engine selection unit 143 selects, as the selection engine, one or more recognition engines to be used for the recognition processing from among the plurality of recognition engines as the non-general-purpose recognition engine 122. The recognition engine selection unit 143 supplies the selection engine information indicating the selection engine to the recognition engine setting unit 144, and the processing proceeds from step S21 to step S22.

The selection of the selection engine in step S21 can be performed on the basis of the operation state information when the user designates the IN point and the OUT point of the sample scene acquired in previous step S13. Furthermore, the selection of the selection engine can be performed on the basis of the operation (operation information) of the user designating (the recognition engine to be) the selection engine, or can be performed according to the selection rule determined in advance.

In step S22, the recognition engine setting unit 144 performs setting of the selection engine indicated by the selection engine information from the recognition engine selection unit 143 on the basis of (the sample scene specified by) the IN point and the OUT point of the sample scene from the sample scene acquisition unit 145, and the processing proceeds to step S23.

In the setting of the selection engine, in step S22-1, the recognition engine setting unit 144 sets, as the setting recognition engine, the recognition engine capable of detecting the detection metadata necessary for setting the selection engine (generation of setting information) among the plurality of recognition engines as the recognition engine 120, and controls the setting recognition engine. The recognition engine setting unit 144 controls the setting recognition engine to perform the recognition processing based on (the sample scene specified by) the IN point and the OUT point of the sample scene. Through this recognition processing, the detection metadata that characterizes the IN point and the OUT point of the sample scene and/or the sample scene specified by the IN point and the OUT point is detected, and the recognition engine setting unit 144 acquires such detection metadata.

The setting recognition engine is different for every selection engine. The setting recognition engine that detects the detection metadata necessary for setting the selection engine may be the selection engine itself or may be another recognition engine.

Furthermore, the setting recognition engine may be (any of the plurality of recognition engines as) the general-purpose recognition engine 121, or may be (any of the plurality of recognition engines as) the non-general-purpose recognition engine 122. In addition, the setting recognition engine may be the recognition engine which is not used as any of the general-purpose recognition engine 121 and the non-general-purpose recognition engine 122.

In a case where the setting recognition engine is the non-general-purpose recognition engine 122, the recognition engine setting unit 144 detects the IN point and the OUT point of the sample scene and/or the detection metadata that characterizes the sample scene by causing the non-general-purpose recognition engine 122 as the setting recognition engine to operate with minimum setting.

The minimum setting of the non-general-purpose recognition engine 122 is a minimum setting or more at which the non-general-purpose recognition engine 122 can detect predetermined detection metadata, and can be determined in advance as the default setting.

For example, in a case where the selection engine is the excitement recognition engine of the non-general-purpose recognition engine 122, the excitement recognition engine serves as the setting recognition engine, and the recognition processing based on (the sample scene specified by) the IN point and the OUT point of the sample scene is performed.

In this case, in the excitement recognition engine as the setting recognition engine, the recognition processing is performed on only the section from the vicinity of the IN point to the vicinity of the OUT point of the sample scene as the target without setting a threshold value. Then, the excitement score of the section from the vicinity of the IN point to the vicinity of the OUT point of the sample scene is detected as the detection metadata that characterizes the sample scene.

Furthermore, for example, in a case where the selection engine is the text recognition engine of the non-general-purpose recognition engine 122, a recognition engine capable of performing character detection, character recognition, and meaning estimation serves as the setting recognition engine, and the recognition processing based on (the sample scene specified by) the IN point and the OUT point of the sample scene is performed.

In this case, in the character detection of the setting recognition engine, for example, the character detection is performed on only one frame near the IN point or the OUT point of the sample scene as the target, and a BBOX surrounding the detected character is detected as the detection metadata that characterizes the IN point and the OUT point of the sample scene.

Moreover, in the character recognition of the setting recognition engine, for example, the character recognition is performed on only a plurality of frames near each of the IN point and near the OUT point of the sample scene as the target by using each BBOX detected as detection metadata by character detection, and a character in each BBOX is recognized.

Then, in the meaning estimation of the setting recognition engine, for example, the meaning estimation of the recognized character in each BBOX is performed, and the character attribute of each BBOX, that is, the character attribute indicating the meaning of the character in each BBOX is detected as the detection metadata that characterizes the IN point and the OUT point of the sample scene on the basis of the result of the meaning estimation.

Furthermore, for example, in a case where the selection engine is the graphic recognition engine of the non-general-purpose recognition engine 122, the graphic recognition engine serves as the setting recognition engine, and the recognition processing based on (the sample scene specified by) the IN point and the OUT point of the sample scene is performed.

In this case, in the graphic recognition engine as the setting recognition engine, the graphic detection mode is set, and the recognition processing is performed on only several frames (one or more frames before and after the IN point/OUT point) in the vicinity of the IN point and the OUT point of the sample scene as the target. Then, graphics in several frames in the vicinity of the IN point and the vicinity of the OUT point of the sample scene and the BBOX surrounding the graphic are detected as the detection metadata that characterizes the IN point and the OUT point of the sample scene.

Here, it can be said that the detection metadata detected near the IN point or the OUT point of the sample scene is the detection metadata that characterizes the IN point and the OUT point of the sample scene. It can be said that the detection metadata detected in the section from near the IN point to near the OUT point of the sample scene is the detection metadata that characterizes the sample scene.

The detection metadata that characterizes the IN point and the OUT point of the sample scene and the detection metadata that characterizes the sample scene are hereinafter also referred to as characterizing detection metadata.

After the characterizing detection metadata is acquired in step S22-1, the processing proceeds to step S22-2.

In step S22-2, the recognition engine setting unit 144 generates the setting information of the selection engine on the basis of the characterizing detection metadata, and adjusts (corrects) the setting information as necessary.

In step S22-2, as a method for generating the setting information of the selection engine on the basis of the characterizing detection metadata, for example, there is a method for generating the setting information that can be generated on the basis of the characterizing detection metadata.

For example, in a case where the selection engine is the excitement recognition engine and the excitement score of the section from the vicinity of the IN point to the vicinity of the OUT point of the sample scene is detected as the characterizing detection metadata, a threshold value of the excitement score (threshold value to be compared with the excitement score) such that the section from the IN point to the OUT point is determined to be the excitement section in the determination of the excitement section based on the excitement score is generated as the setting information of the excitement recognition engine.

For example, in a case where the selection engine is the text recognition engine and the BBOX and the character attribute of the BBOX are detected as the characterizing detection metadata, the BBOX and the character attribute are set as the setting information of the text recognition engine.

For example, in a case where the selection engine is the graphic recognition engine and graphics in several frames in the vicinity of the IN point and the vicinity of the OUT point of the sample scene and BBOX surrounding the graphic is detected as the characterizing detection metadata, the graphic and the BBOX are set as the setting information of the graphic recognition engine.

Furthermore, as another method for generating the setting information of the selection engine on the basis of the characterizing detection metadata in step S22-2, for example, there is a method for presenting the characterizing detection metadata to the user and generating the setting information according to the operation of the user for the detection metadata.

For example, in a case where the selection engine is the graphic recognition engine and graphics in several frames in the vicinity of the IN point and the vicinity of the OUT point of the sample scene and the BBOX surrounding the graphic are detected as the characterizing detection metadata, the graphic and the BBOX are presented to the user, and thus, the user can be guided to select the graphic to be the template of the graphic recognition engine.

In this case, for the presentation of the graphic and the BBOX, only the graphic selected by the user operating the terminal 10 and the BBOX surrounding the graphic are set as the setting information of the graphic recognition engine.

The presentation of the characterizing detection metadata such as the graphic and the BBOX to the user is performed by the recognition engine setting unit 144, for example, similarly to a case where the cut scene presentation unit 148 presents the cut scene.

In step S22-2, after the generation of the setting information of the selection engine, the recognition engine setting unit 144 can adjust the setting information as necessary.

That is, the recognition engine setting unit 144 outputs the setting information of the selection engine to the terminal 10, and the terminal 10 presents the setting information of the selection engine to the user, thereby guiding the user to adjust the setting information.

In a case where the user operates the terminal 10 to adjust the setting information for the presentation of the setting information, the recognition engine setting unit 144 adjusts the setting information in accordance with the operation.

For example, in a case where the selection engine is the excitement recognition engine and the threshold value of the excitement score is generated as the setting information of the excitement recognition engine, the recognition engine setting unit 144 presents the excitement score and the threshold value as the setting information to the user, and adjusts the threshold value as the setting information in accordance with the operation of the user for the threshold value.

For example, in a case where the selection engine is the text recognition engine and the BBOX and the character attribute of the BBOX are generated as the setting information of the text recognition engine, the recognition engine setting unit 144 presents the BBOX and the character attribute as the setting information to the user, and adjusts (corrects) the BBOX and the character attribute as the setting information in accordance with the operation of the user for the BBOX and the character attribute.

For example, in a case where the selection engine is the graphic recognition engine and the graphic to become the template and the BBOX surrounding the graphic are generated as the setting information of the graphic recognition engine, the recognition engine setting unit 144 presents the graphic as the setting information and the BBOX surrounding the graphic to the user, and adjusts (corrects) the graphic to become the template as the setting information and the BBOX in accordance with the operation of the user for the BBOX.

After the generation of the setting information of the selection engine and the necessary adjustment are performed in step S22-2, the processing proceeds to step S22-3.

In step S22-3, the recognition engine setting unit 144 performs setting of the selection engine according to the setting information of the selection engine, that is, supplies and sets the setting information of the selection engine to and in the selection engine, and the processing of setting the selection engine in step S22 is ended.

Thereafter, in step S23, the control device 110 causes the selection engine set on the basis of the IN point and the OUT point of the sample scene to perform the recognition processing on the entire target content as the processing target and to detect the detection metadata, and the processing returns to step S13 of FIG. 13.

The detection metadata detected by the selection engine is supplied to the rule engine 130 and the cutting rule generation unit 147.

As described above, in step S13, the IN point and the OUT point of the sample scene of the target content and the tag data are acquired after the user designates the IN point and the OUT point of the sample scene and the necessary tag data.

Then, in step S17 of FIG. 13, similar processing is repeated until it is determined that the cut scene is the desired scene.

Here, in the processing of step S13 after the second time, for example, the IN point and the OUT point of the sample scene acquired in the processing of previous step S13 and the necessary tag data can be used as they are in accordance with the operation of the user.

Note that, since the necessary setting is different for every recognition engine as the non-general-purpose recognition engine 122, the specific processing of the setting of the selection engine in step S22 is different for every recognition engine selected as the selection engine in step S21.

Furthermore, in the selection of the selection engine in step S21, candidates for the selection engine can be selected on the basis of the operation state information or in accordance with the selection rule determined in advance and are presented to the user. Then, the selection engine can be selected from among the candidates for the selection engine in accordance with the operation of the user (on the basis of the operation information).

As described above, in the control device 110, (the recognition engine as) the non-general-purpose recognition engine 122 selected as the selection engine is set on the basis of the IN point and the OUT point of the sample scene designated by the user. That is, the setting of the non-general-purpose recognition engine 122 is performed on the basis of the characterizing detection metadata that characterizes the IN point and the OUT point of the sample scene and/or the sample scene.

Accordingly, even though the user does not have specialized knowledge of the non-general-purpose recognition engine 122, the user can easily set the non-general-purpose recognition engine 122 for accurately cutting the desired scene similar to the sample scene only by designating the IN point and the OUT point of the sample scene.

Moreover, in the control device 110, the cutting rule is generated on the basis of (the cutting metadata generated on the basis of) the detection metadata obtained by performing the recognition processing by the non-general-purpose recognition engine 122 set as described above and (the sample scene specified by) the IN point and the OUT point of the sample scene.

Accordingly, even a user who does not have specialized knowledge, for example, a user who is not an engineer can easily generate a cutting rule that can cut, as a desired scene, a scene similar to the sample scene only by designating the IN point and the OUT point of the sample scene.

As a result, it is possible to accurately cut the desired scene as intended by the user.

Furthermore, in the control device 110, the setting information of the non-general-purpose recognition engine 122 selected as the selection engine is presented to the user, and is adjusted in accordance with the operation of the user.

Accordingly, the user can easily perform fine tuning of the non-general-purpose recognition engine 122 selected for the selection engine.

Furthermore, the IN point and the OUT point of the sample scene is designated, and thus, the user can finely adjust the IN point and the OUT point of the scene to be cut as the cut scene as compared with a case where the scene to become the sample scene is selected from scenes prepared in advance. As a result, it is possible to cut the cut scene in which instants (frames) desired by the user are the IN point and the OUT point.

Moreover, the user designates the IN point and the OUT point of the sample scene, and thus, the non-general-purpose recognition engine 122 selected by the selection engine can be set such that the detection metadata in which frames more similar to the frames of the IN point and the OUT point of the sample scene are detected as the IN point and the OUT point of the cut scene is detected.

Furthermore, in the setting of the selection engine in step S22, on the basis of the IN point and the OUT point of the sample scene designated by the user, instead of the entire target content, the characterizing detection metadata is detected with only a limited part of the target content such as the vicinity of the IN point and the vicinity of the OUT point of the sample scene, or the section from the vicinity of the IN point to the vicinity of the OUT point of the sample scene as the processing target.

Accordingly, even though a recognition engine having a large processing load of detecting the detection metadata is used as the setting recognition engine, the characterizing detection metadata can be detected in a short period of time (a small waiting time).

Furthermore, in the setting of the selection engine in step S22, the selection engine is set on the basis of the IN point and the OUT point of the sample scene designated by the user, and thus, the selection engine can be set such that the detection metadata (characterizing detection metadata) that characterizes the IN point and the OUT point of the sample scene and/or the sample scene is detected.

Moreover, in the setting of the selection engine in step S22, it is possible to reduce burden on the user by setting the selection engine on the basis of the IN point and the OUT point of the sample scene designated by the user.

For example, in the setting of the graphic recognition engine selected as the selection engine, in a case where targets are limited to only several frames in the vicinity of the IN point and the vicinity of the OUT point of the sample scene instead of the target contents, the graphics in the several frames and the BBOXs surrounding the graphics are detected as the characterizing detection metadata and are presented to the user, and the graphic to be set as the template of the graphic recognition engine is selected, the burden on the user can be reduced as compared with a case where the graphic to be set as the template of the graphic recognition engine is selected from all the graphics of the target content.

Here, in a case where the characterizing detection metadata acquired in step S22-1 is also detected in a dissimilar frame which is not similar to a frame near the IN point or the OUT point of the sample scene or in a dissimilar section which is not similar to a section from near the IN point to near the OUT point of the sample scene, it can be said that the characterizing detection metadata is detection metadata that characterizes not only the IN point and the OUT point of the sample scene, and the like but also the dissimilar frame and the like.

In a case where the characterizing detection metadata acquired in step S22-1 is the detection metadata that characterizes the dissimilar frame and the like, when the cut scene is cut by using the selection engine set on the basis of such characterizing detection metadata or the generated cutting rule, a scene which is not similar to the sample scene is also likely to be cut as the cut scene in addition to a scene similar to the sample scene (desired scene).

In a case where it is determined in step S17 that the cut scene is not the desired scene, the control device 110 repeats the processing of steps S12 to S17 and steps S21 to S23. Then, in the repetitive processing, re-designation of the IN point and the OUT point of the sample scene (step S13), re-selection of the selection engine (step S21), and re-setting of the selection engine (step S22) are performed.

The re-designation of the IN point and the OUT point of the sample scene, the re-selection of the selection engine, and the re-setting of the selection engine are performed, and thus, the characterizing detection metadata acquired in step S22-1 is metadata that characterizes only the IN point and the OUT point of the sample scene and/or the sample scene, that is, the detection metadata that characterizes the IN point and the OUT point of the sample scene (and the scene similar to the sample scene) and the like, but does not characterize (hardly characterizes) the dissimilar frame and the like.

Then, the cut scene is cut by using the selection engine set on the basis of such characterizing detection metadata and the generated cutting rule, and thus, a scene similar to the sample scene, that is, only the desired scene as intended by the user can be accurately cut as the cut scene.

Note that, the tag data of the sample scene designated by the user can be used, for example, for the meaning estimation of the detection metadata. For example, in a case where the tag data indicates that the sample scene from the IN point to the OUT point is the touchdown scene, when the text as the detection metadata detected at the same position in the frames (images) in the vicinity of the IN point and the vicinity of the OUT point of the sample scene is changed (different) between the vicinity of the IN point and the vicinity of the OUT point, it can be estimated that the text as the detection metadata is a score changed due to touchdown.

<Display Example of Content Selection Screen>

Figure 15:
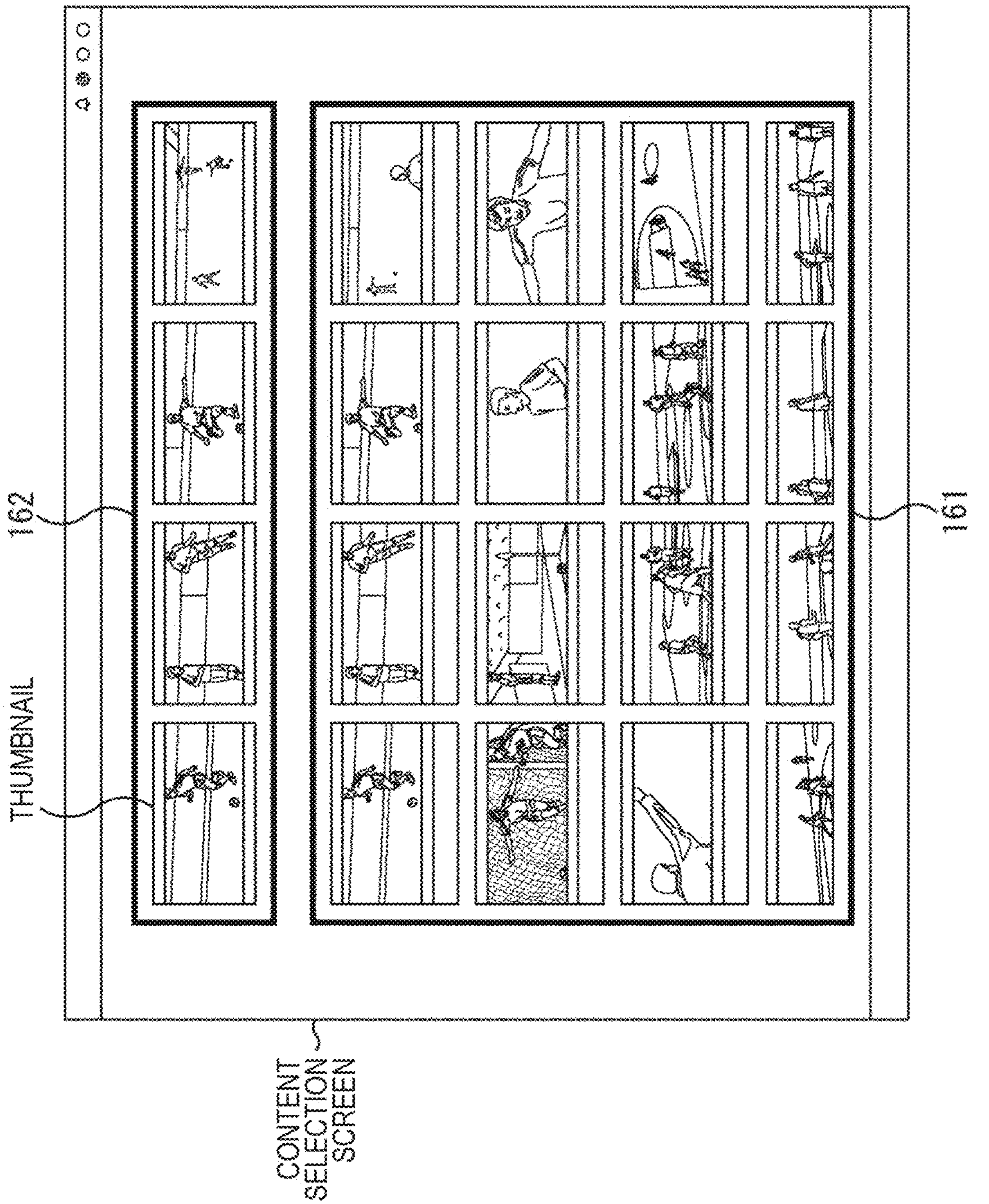
FIG. 15 is a diagram illustrating a display example of a content selection screen for selecting a target content.

FIG. 15 is a diagram illustrating a display example of a content selection screen for selecting the target content.

The content selection screen is displayed on the terminal 10.

In FIG. 15, the content selection screen has a region 161 and a region 162.

The region 161 is a region at a lower part of the content selection screen, and thumbnails of clips (files) of content retained in a predetermined folder of the content management device 20 (FIG. 1) are displayed in the region 161.

The region 162 is an upper part of the content selection screen, that is, an upper region of the region 161, and thumbnails of candidate contents which are candidates for the target content designated by the user from the content of which thumbnails are displayed in the region 161 are displayed in the region 162.

On the content selection screen having the above-described configuration, the user can designate the thumbnails displayed in the region 161 by operating the terminal 10. In the terminal 10, when the thumbnails displayed in the region 161 are designated by the user operation, the contents corresponding to the thumbnails are selected as the candidate contents, and the thumbnails of the candidate contents are displayed in the region 162.

For the candidate contents whose thumbnails are displayed in the region 162, information of the candidate contents (operation information indicating the candidate contents) can be transmitted from the terminal 10 to the content analysis device 30.

When the content analysis device 30 receives the information of the candidate contents, the control device 110 can perform the recognition processing by the general-purpose recognition engine 121 described in step S12 of FIG. 13 on the candidate contents in a background. Therefore, in the processing of the control device 110 of FIGS. 13 and 14 performed in a case where the target content is selected from the candidate contents, it is possible to shorten a period of time until the cut scene is presented in first step S16.

The user can designate the thumbnails displayed in the region 162 by operating the terminal 10. In the terminal 10, when the thumbnails displayed in the region 162 are designated, the candidate contents corresponding to the thumbnails are selected as the target content, and the information of the target content (the operation information indicating the target content) is transmitted to the content analysis device 30.

When the information of the target content is received, the content analysis device 30 starts the processing in FIGS. 13 and 14 in the control device 110.

<Display Example of Sample Scene Selection Screen>

Figure 16:
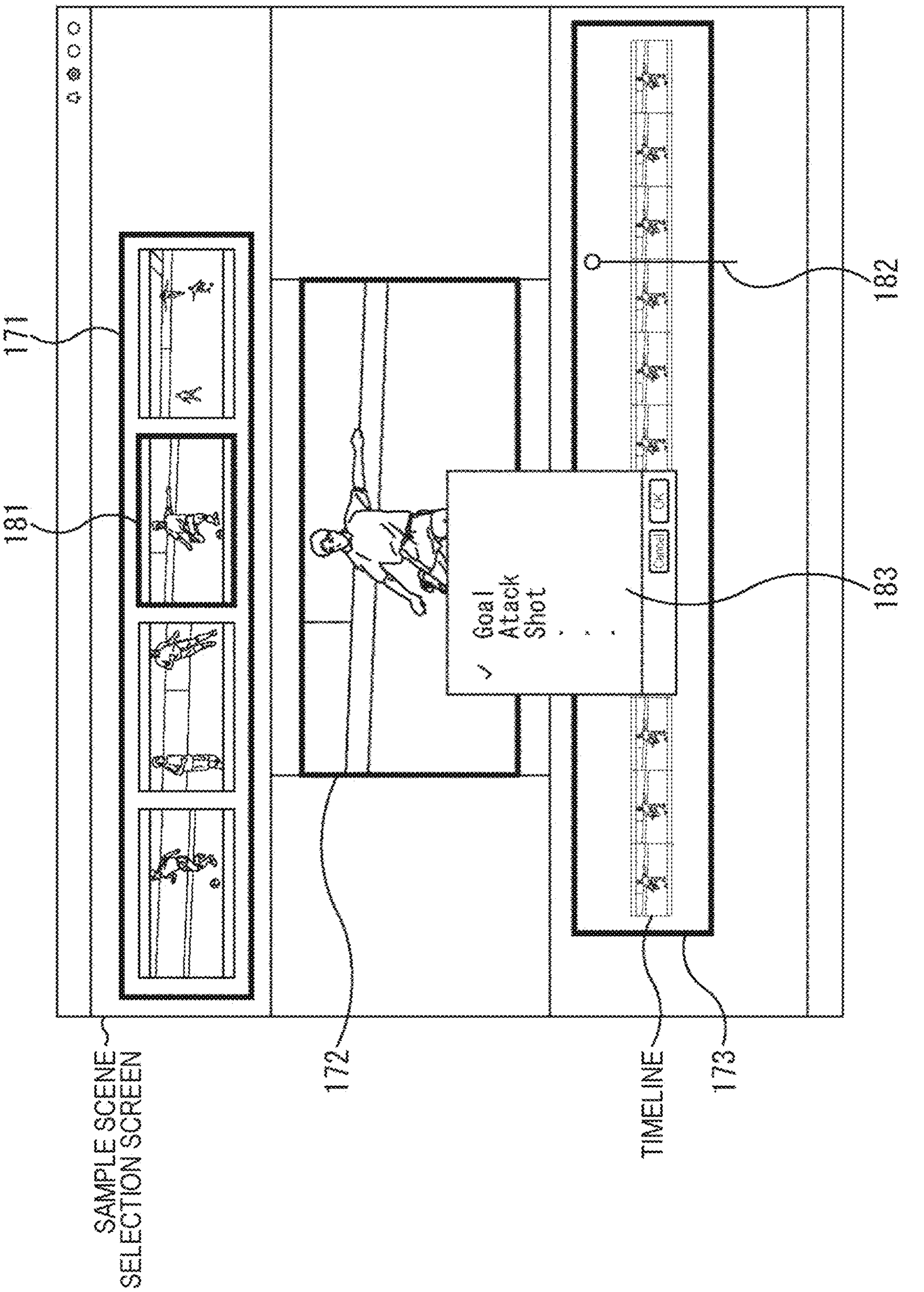
FIG. 16 is a diagram illustrating a display example of a sample scene selection screen for selecting a sample scene from the target content.

FIG. 16 is a diagram illustrating a display example of a sample scene selection screen for selecting the sample scene from the target content.

The sample scene selection screen is displayed on the terminal 10.

In FIG. 16, the sample scene selection screen has regions 171, 172, and 173.

The region 171 is a region similar to the region 162 of the content selection screen (FIG. 15), and the thumbnails of the candidate contents are displayed. In FIG. 16, a third thumbnail 181 from the left, among the thumbnails displayed in the region 171, is designated by the user, and a candidate content corresponding to the thumbnail 181 is selected as the target content.

The region 172 is a middle part of the content selection screen, that is, a lower region of the region 171, and an image (frame) at a position (time) indicated by a playback head 182, as described later, of the target content is displayed in the region 172.

The region 172 is a lower part of the content selection screen, that is, a lower region of the region 172, and a timeline in which images (frames) of the target content are disposed in chronological order is displayed in the region 173.

The playback head 182 indicating a playback position of the target content is displayed on the timeline.

The user can normally play the target content displayed in the region 172 back by operating the terminal 10. The playback head 182 moves in accordance with the position of the target content in which the normal playback is being performed.

Furthermore, the user can operate the playback head 182 to move in a time axis direction of the timeline. Therefore, the user can operate to move the playback position (frame to be played back) of the target content. The user can operate to move the playback position to a desired position and designate the position as the IN point or the OUT point. For example, a sequence of frames from an IN point to an OUT point designated next to the IN point is specified as a sample scene.

Note that, for the IN point and the OUT point of the sample scene, in addition to designating the OUT point after the IN point, the OUT point can be designated first. Thereafter, the IN point can be designated.

A plurality of sets of IN points and OUT points of the sample scene, that is, sample scenes can be designated.

The IN point and the OUT point of the sample scene can be designated by the user moving the playback head 182, by directly designating a position on the timeline, or by displaying candidate points to become candidates of the IN point and the OUT point on the timeline in the terminal 10 and allowing the user to select the IN point and the OUT point from the candidate points. For example, a scene break, an IN point and an OUT point designated by the user in the past, and the like can be adopted as the candidate points. Furthermore, the IN point and the OUT point of the sample scene can be designated by causing the user to designate the scene to be the sample scene. The designation of (the scene to be) the sample scene can be performed, for example, by cutting one or more scenes to become candidates of the sample scene from the target content by any method and causing the user to select a candidate to be the sample scene from among the candidates.

One or more pieces of tag data indicating information regarding the sample scene such as the details of the sample scene can be associated with the sample scene.

The tag data associated with the sample scene can be selected (designated) from, for example, a pull-down menu 183 displayed by operating the terminal 10.

In the pull-down menu 183, tag data indicating sports scenes such as a goal, an attack, and a shot is prepared. In addition, in the pull-down menu 183, a type of goal, for example, touchdown of the American football, a field goal, and the like can be prepared as the tag data.

Figure 17:
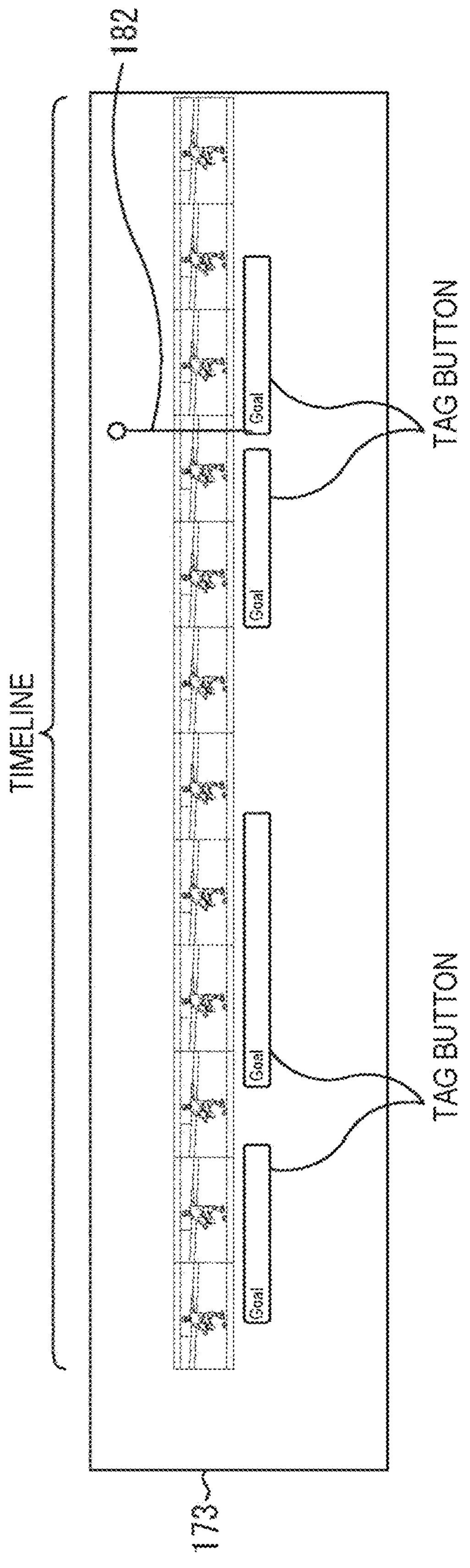
FIG. 17 is a diagram illustrating details of a region 173 of the sample scene selection screen.

FIG. 17 is a diagram illustrating details of the region 173 of the sample scene selection screen.

When the IN point and the OUT point of the sample scene are designated, tag buttons are displayed below the timeline of the region 173.

The tag button is a graphical user interface (GUI) that has a width of a section of the timeline corresponding to the sample scene and is displayed below the section. Accordingly, according to the tag button, the user can roughly grasp the section that is the sample scene (specified by the IN point and the OUT point) designated by the user in the timeline.

In the tag button for the sample scene, the details (goal and the like) of the tag data designated (input) for the sample scene are displayed.

In the terminal 10, when the tag button is operated, the pull-down menu 183 (FIG. 16) is displayed, and it is possible to select (reselect) tag data to be associated with the sample scene.

<Display Example of Cut Scene Screen>

Figure 18:
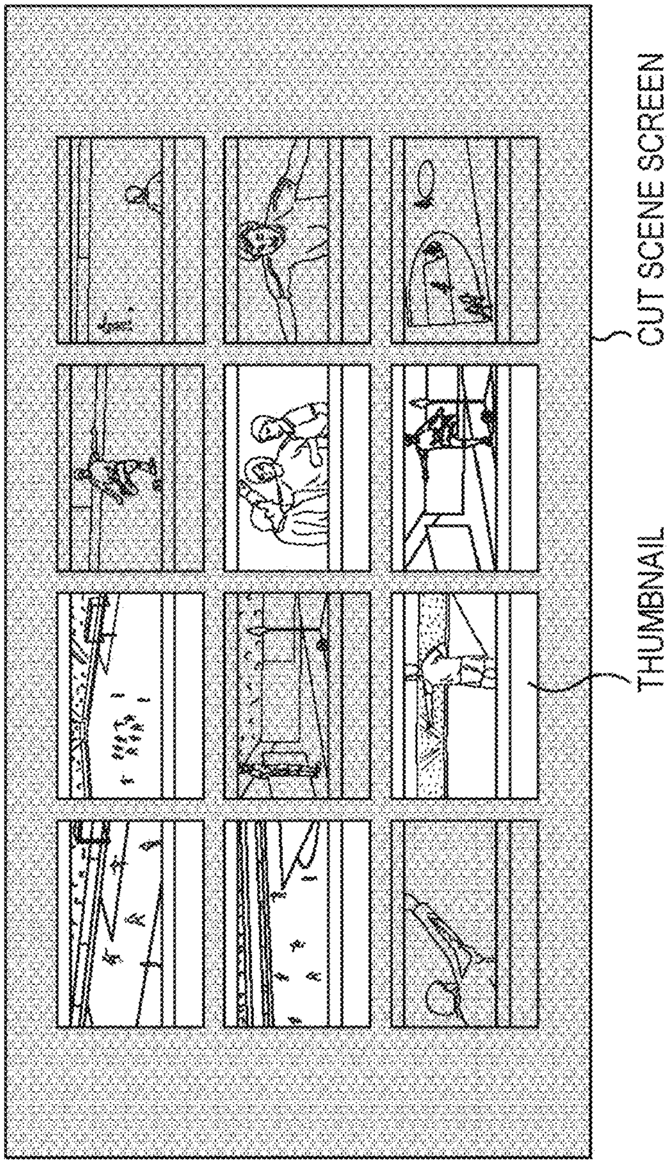
FIG. 18 is a diagram illustrating a display example of a cut scene screen displaying a cut scene.

FIG. 18 is a diagram illustrating a display example of a cut scene screen displaying the cut scene.

The cut scene screen is displayed on the terminal 10 under the control of the cut scene presentation unit 148 of the control device 110 (FIG. 11) (the cut scene information supplied (transmitted) from the cut scene presentation unit 148 to the terminal 10).

Thumbnails of the cut scenes are displayed on the cut scene screen.

The user can designate the thumbnails of the cut scene screen by operating the terminal 10. In the terminal 10, when the thumbnails of the cut scene screen are designated, the cut scenes corresponding to the thumbnails are played back.

<Example of Generation of Setting Information>

Hereinafter, a specific example of the generation of the setting information based on the characterizing detection metadata in S22-2 of FIG. 14 will be described.

Examples of the generation method for generating the setting information on the basis of the characterizing detection metadata include first and second generation methods described in step S22-2.

The first generation method is a method for generating the setting information that can be generated on the basis of the characterizing detection metadata. The second generation method is a method for presenting the characterizing detection metadata to the user and generating the setting information in accordance with an operation of the user for the characterizing detection metadata.

The pieces of setting information generated by the first and second generation methods can be adjusted (corrected) as necessary. That is, the setting information can be presented to the user, and the setting information can be adjusted in accordance with the operation of the user for the setting information. Note that, the adjustment of the setting information can also be performed in accordance with the operation of the user for the characterizing detection metadata before the setting information is generated (before the setting information is generated).

Figure 19:
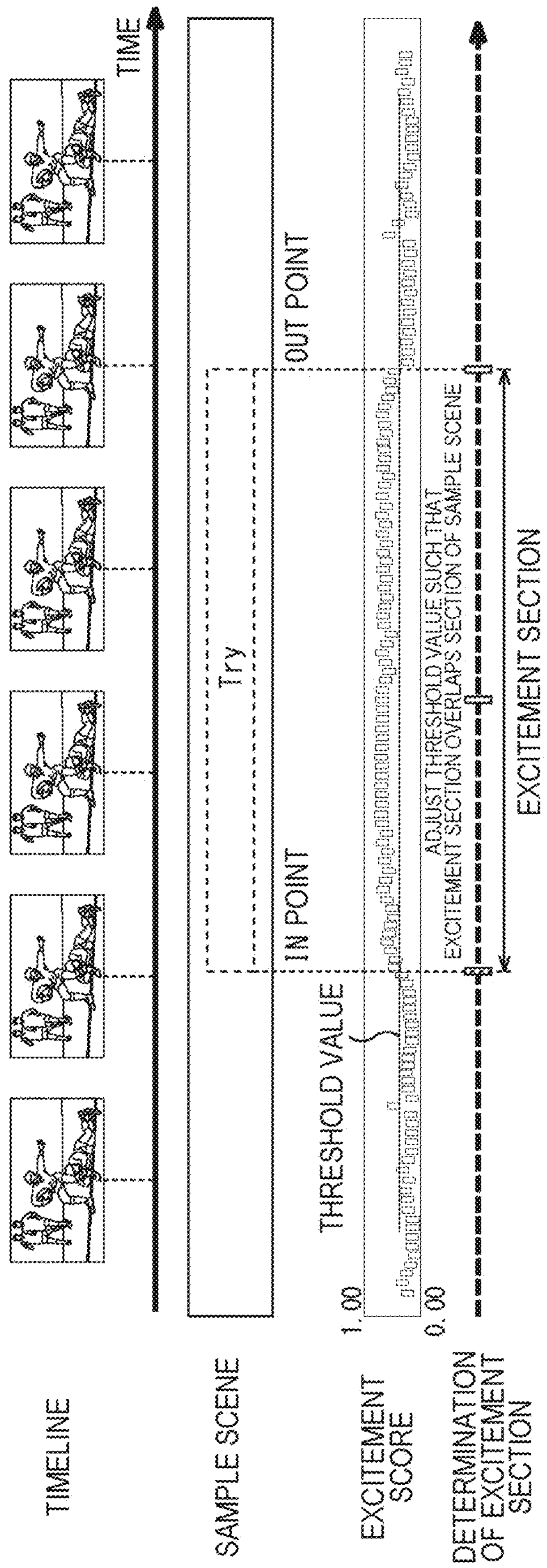
FIG. 19 is a diagram for describing an example of generation of setting information of a first generation method.

FIG. 19 is a diagram for describing an example of generation of the setting information of the first generation method.

FIG. 19 illustrates an example of the generation of the threshold value of the excitement score (the threshold value to be compared with the excitement score) as the setting information to be set in the excitement recognition engine.

In the determination of the excitement section based on the excitement score, the recognition engine setting unit 144 generates the threshold value as the setting information of the excitement recognition engine such that (the vicinity of) the IN point to (the vicinity of) the OUT point of the sample scene is determined to be the excitement section as much as possible.

FIG. 19 illustrates the timeline of the target content, the sample scene, the excitement score, and the determination result of the excitement section based on the excitement score.

In FIG. 19, content of a rugby game is set as the target content, and head and last (frames) of a Try scene are designated as the IN point and the OUT point of the sample scene, respectively.

In the generation of the setting information of the excitement recognition engine, the recognition processing is performed only on the section from the vicinity of the IN point to the vicinity of the OUT point of the sample scene as the target in the excitement recognition engine. Therefore, an excitement score in a unit of a predetermined period of time unit such as 1 second (1 s) in the section from the vicinity of the IN point to the vicinity of the OUT point of the sample scene is detected as the characterizing detection metadata.

In the excitement recognition engine, in a case where the excitement score can take a value in a predetermined range of −1024 to +1024, for example, the excitement score can be normalized such that the excitement score takes a value in a range of 0.0 to 1.0.

The recognition engine setting unit 144 (FIG. 11) generates the threshold value of the excitement score as the setting information on the basis of the excitement score of the section from the vicinity of the IN point to the vicinity of the OUT point of the sample scene as the characterizing detection metadata.

In other words, in the determination of the excitement section based on the excitement score in the excitement recognition engine, the recognition engine setting unit 144 generates, as the setting information of the excitement recognition engine, the threshold value of the excitement score such that (a section coinciding as much as possible) the section from the IN point to the OUT point is determined to be the excitement section.

As described above, in the generation of the threshold value as the setting information of the excitement recognition engine, the threshold value is generated by using the excitement score in (the section of) the sample scene specified by the IN point and the OUT point of the sample scene as a so-called hint.

In the determination of the excitement section, a section in which the excitement score is more than or equal to the threshold value (a section more than the threshold value) and of which a length is more than or equal to a predetermined length is determined to be the excitement section in which the excitement score is high.

In the determination of the excitement section, the excitement score that crosses the threshold value in a short period of time (one second, several seconds, or the like) is ignored as an outlier.

Here, as the method for generating the threshold value of the excitement score as the setting information, there is a method for generating the threshold value on the basis of the excitement score of any section of the target content regardless of (the IN point and the OUT point of) the sample scene.

Figure 20:
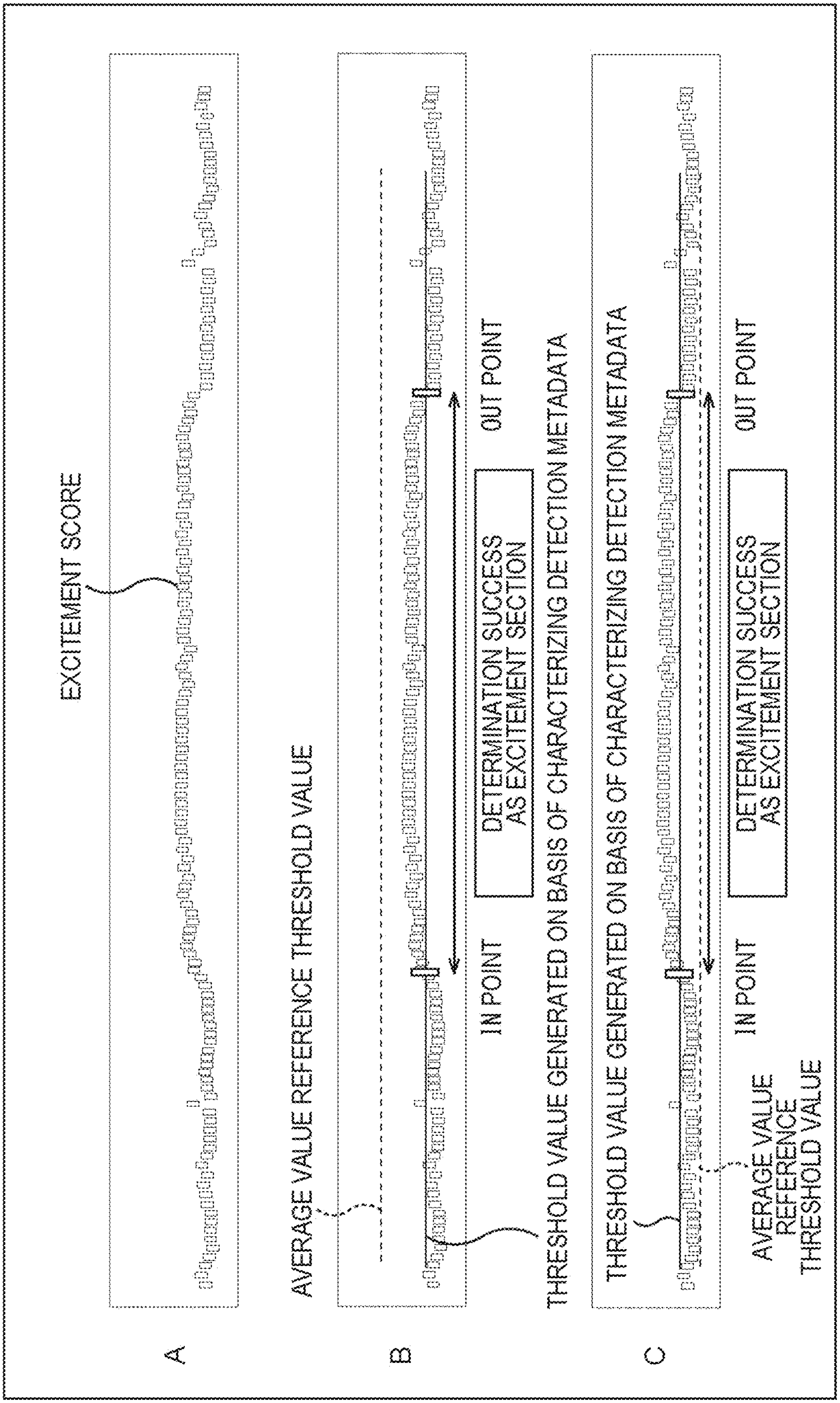
FIG. 20 is a diagram for describing a method for generating a threshold value on the basis of an excitement score of any section of the target content.

FIG. 20 is a diagram for describing the method for generating the threshold value on the basis of the excitement score of any section of the target content.

A in FIG. 20 illustrates a time series of the excitement score of the target content.

As the method for generating the threshold value on the basis of the excitement score of any section of the target content, for example, there is a method for generating the threshold value on the basis of the excitement scores of all the sections of the target content with an average value of the excitement scores of all the sections as a reference. Note that, the reference is not limited to the average value of the excitement scores of all the sections of the target content, and an average value of excitement scores of some sections (sections of a predetermined length) of the target content may be used as the reference.

Furthermore, for example, for streaming target content, for example, there is a method for generating the threshold value on the basis of excitement scores of predetermined sections before the sample scene, such as a first half section of the target content, with an average value of the excitement scores of the predetermined sections as a reference.

For example, when an average value of +0.15 is generated as the threshold value with the average value of the excitement scores of all the sections of the target content, in a case where the average value of the excitement scores is 0.55, 0.70 is generated as the threshold value.

As described above, the threshold value generated on the basis of the average value of the excitement scores is also referred to as an average value reference threshold value.

In a case where the average value reference threshold value is used in the determination of the excitement section, there are often a case where the section of the desired scene is not determined to be the excitement section, or a case where a section including an unnecessary section adjacent to the section of the desired scene in addition to the section of the desired scene is determined to be the excitement section.

B in FIG. 20 illustrates an example of a case where the sample scene as the desired scene is not determined to be the excitement section in the determination of the excitement section performed by using the average value reference threshold value.

C in FIG. 20 illustrates an example of a case where the section including the sample scene as the desired scene and the unnecessary section adjacent to the desired scene is determined to be the excitement section in the determination of the excitement section performed by using the average value reference threshold value.

In B in FIG. 20, the excitement score of the section of the sample scene falls below the average value reference threshold value, and the section of the sample scene (and the scene similar to the sample scene) is not determined to be the excitement section.

In C in FIG. 20, in addition to the excitement score of the section of the sample scene, the excitement score of the unnecessary section adjacent to the section of the sample scene also exceeds the average value reference threshold value, and the section including the sample scene and the unnecessary section adjacent to the sample scene is determined to be the excitement section.

On the other hand, in a case where the threshold value as the setting information generated on the basis of the excitement score of the section from the vicinity of the IN point to the vicinity of the OUT point of the sample scene as the characterizing detection metadata is used, the excitement score exceeds the average value reference threshold value in substantially the same section as the sample scene. As a result, the section substantially the same as the sample scene (and the scene similar to the sample scene) is determined to be the excitement section.

Note that, the control device 110 can present (cause the terminal 10 to display), to the user, the threshold value as the setting information generated on the basis of the excitement score of the section from the vicinity of the IN point to the vicinity of the OUT point of the sample scene as the characterizing detection metadata and the excitement scores of the sample scene and the section in the vicinity of the sample scene.

The user can adjust (correct) the threshold value as the setting information by viewing the threshold value as the setting information and the excitement score presented to the terminal 10 and operating the terminal 10.

Figure 21:
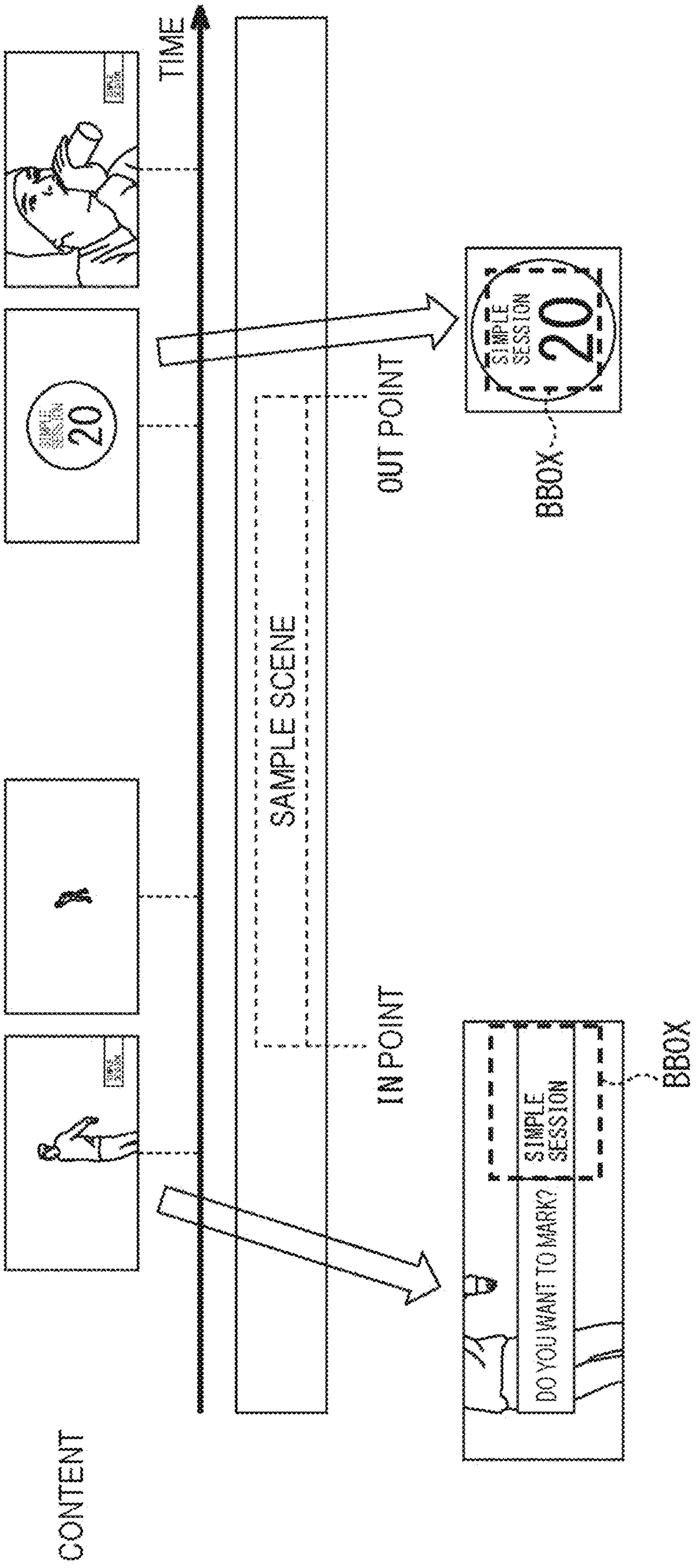
FIG. 21 is a diagram for describing an example of generation of setting information of a second generation method.

FIG. 21 is a diagram for describing an example of the generation of the setting information of the second generation method.

FIG. 21 illustrates an example of the generation of the setting information to be set in the graphic recognition engine.

The recognition engine setting unit 144 generates the BBOX as the setting information of the graphic recognition engine and the graphic to become the template in accordance with the operation of the user for the BBOX (including the graphic surrounded by the BBOX) detected in the frame in the vicinity of each of the IN point and the OUT point of the sample scene.

FIG. 21 schematically illustrates near the sample scene in the timeline of the target content.

In the generation of the setting information of the graphic recognition engine, in the graphic recognition engine in the graphic detection mode, the recognition processing is performed on only several frames in the vicinity of the IN point and the vicinity of the OUT point of the sample scene as the target. Then, for example, a graphic such as a display object like a subtitle and a BBOX which is a region surrounding the graphic within several frames in the vicinity of the IN point and the vicinity of the OUT point of the sample scene are detected as the characterizing detection metadata.

The recognition engine setting unit 144 presents the graphic and the BBOX as the characterizing detection metadata to the user.

In FIG. 21, a graphic (a graphic in which characters of SIMPLE SESSION are displayed) as the characterizing detection metadata and the BBOX are presented (displayed) together with a message of "Do you want to mark?" inquiring whether or not the graphic and the BBOX are set as the setting information.

When the user operates the terminal 10 to use the graphic and the BBOX as the setting information for the presentation of the graphic and the BBOX as the characterizing detection metadata, the graphic and the BBOX are set as the setting information. In the graphic recognition engine, the graphic as the setting information is used as the template (image).

As described above, in a case where targets are limited to only several frames in the vicinity of the IN point and the vicinity of the OUT point of the sample scene instead of all the target contents, the graphics in the several frames and the BBOXs surrounding the graphics are detected as the characterizing detection metadata and are presented to the user, and the graphic to be set as the setting information of the graphic recognition engine and the BBOXs are selected, the burden on the user can be reduced and the setting information of the graphic recognition engine can be efficiently generated as compared with a case where the graphic to be the template of the graphic recognition engine is selected from all the graphics of the target content.

Furthermore, according to the presentation of the graphic and the BBOX as the characterizing detection metadata, the user is likely to notice the graphic as the setting information to be set in the recognition engine (here, the graphic recognition engine) for accurately cutting the desired scene.

In the generation of the setting information of the graphic recognition engine, for example, the threshold value to be compared with the existence probability that the graphic which is the recognition target is present, which is calculated in the recognition processing of the graphic recognition engine, is generated as the setting information.

For example, in the graphic recognition engine, by using the graphic (template) having become the setting information, the recognition processing is performed on the BBOX as the setting information in several frames in the vicinity of the IN point and the vicinity of the OUT point of the sample scene, as the processing target, and the threshold value with which the graphic having become the setting information can be recognized is generated as the setting information.

In the generation of the setting information of the graphic recognition engine, (the characterizing detection metadata to become) the setting information of the graphic recognition engine can be adjusted (corrected) in accordance with the operation of the terminal 10 by the user.

Figure 22:
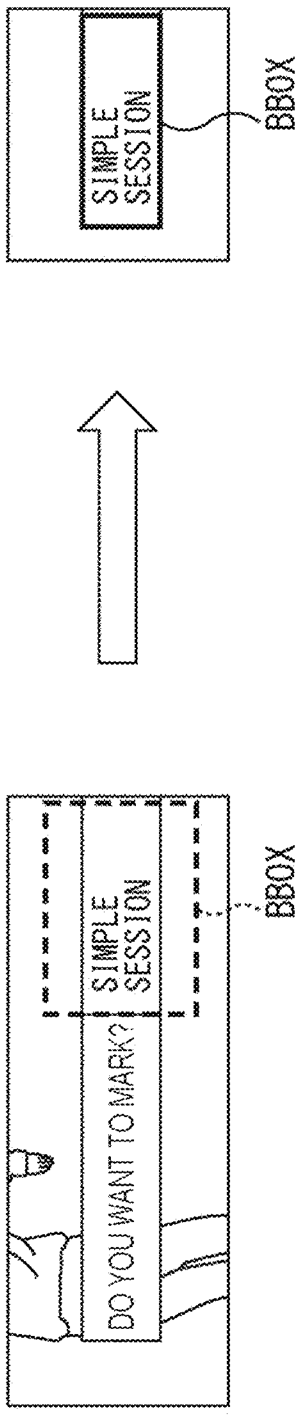
FIG. 22 is a diagram illustrating an example of adjustment of setting information of a graphic recognition engine corresponding to an operation of a user.

FIG. 22 is a diagram illustrating an example of the adjustment of the setting information of the graphic recognition engine in accordance with the operation of the user.

The BBOX as the setting information generated as described with reference to FIG. 21 can be adjusted in accordance with the operation of the user.

That is, the user can change the position and/or size of the BBOX as the setting information, can delete the BBOX, or can add a new BBOX. For example, the user operates the terminal 10 for the presentation of the graphic and the BBOX as the characterizing detection metadata to be set as the setting information, and can adjust the BBOX indicated by a dotted line in the drawing to be like BBOX indicated by a solid line to surround the graphic as tightly as possible.

In the recognition engine setting unit 144, the BBOX as (the characterizing detection metadata to be set as) the setting information is adjusted in accordance with the operation of the user.

Figure 23:
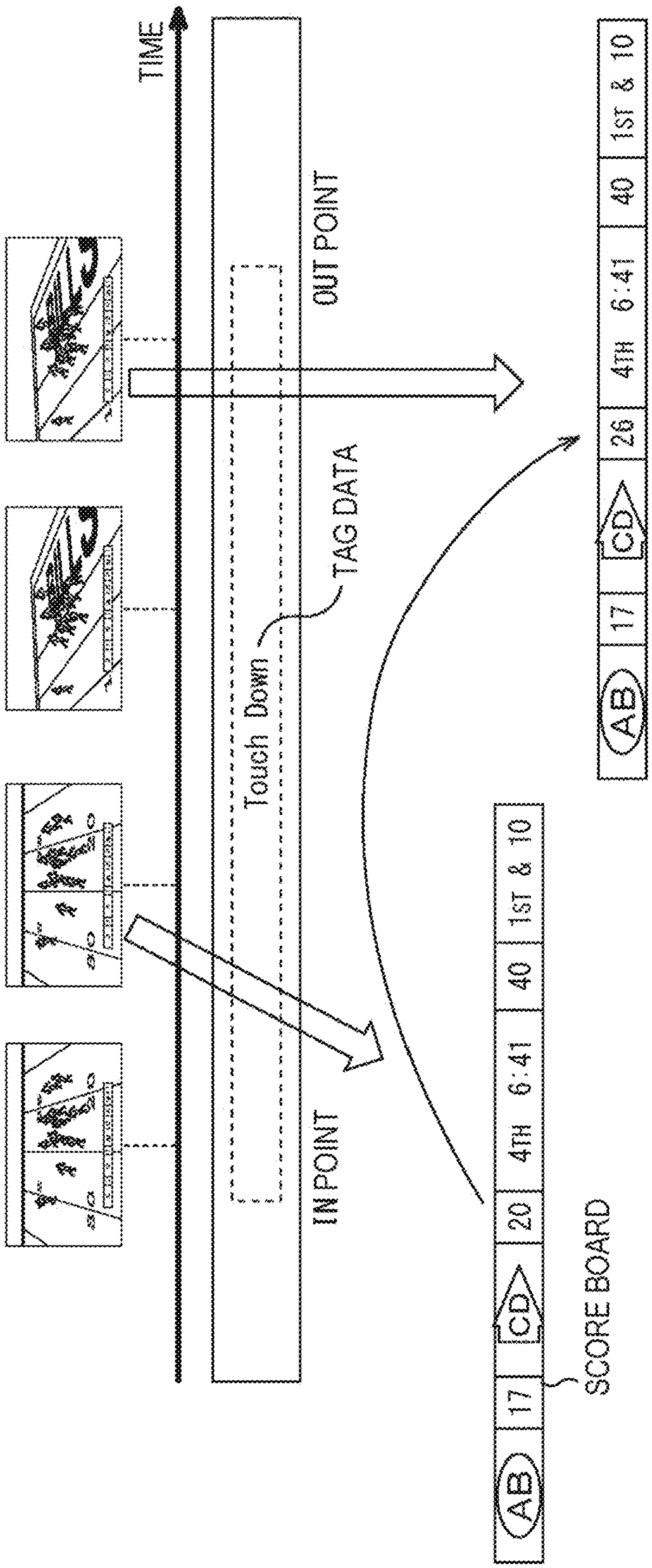
FIG. 23 is a diagram illustrating an example of meaning estimation performed in generation of setting information of a text recognition engine.

FIG. 23 is a diagram illustrating an example of meaning estimation performed in the generation of the setting information of the text recognition engine.

In the generation of the setting information of the text recognition engine, the character detection, the character recognition, and the meaning estimation are performed as described with reference to FIG. 14.

In FIG. 23, the target content is content of an American football game of teams AB and CD, and a touchdown scene is a sample scene. The sample scene is associated with tag data indicating that the sample scene is the touchdown scene.

A scoreboard appears in a frame in the vicinity of the IN point and the vicinity of the OUT point of the sample scene.

In the generation of the setting information of the text recognition engine, each character in the scoreboard is detected (recognized) as the detection metadata by the character detection and the character recognition.

In FIG. 23, among characters in the scoreboard, a character of 20 in the frame in the vicinity of the IN point of the sample scene is changed to 26 in the frame in the vicinity of the OUT point.

In this case, in the meaning estimation, it can be estimated that the character as the detection metadata changed from 20 to 26 is the score changed due to touchdown indicated by the tag data.

Moreover, it is also possible to estimate an American football rule that a score due to touchdown is +6.

Figure 24:
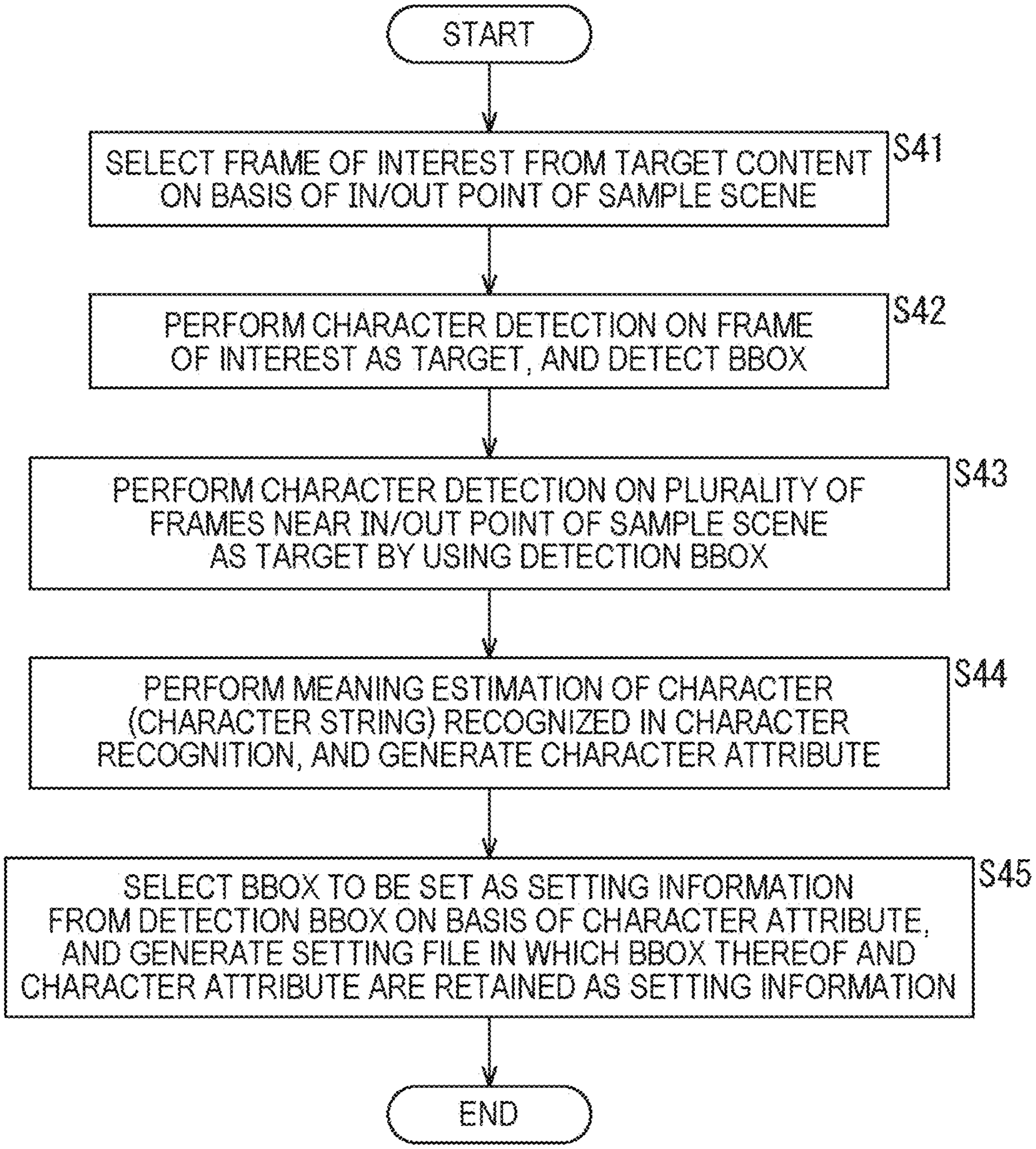
FIG. 24 is a flowchart for describing an example of generation of setting information of the text recognition engine.

FIG. 24 is a flowchart for describing an example of the generation of the setting information of the text recognition engine.

In the generation of the setting information of the text recognition engine, detection BBOX (hereinafter, also referred to as detection BBOX), which is a predetermined region surrounding a character detected by the character detection of one frame of the sample scene, and corresponds to a specific character attribute among character attributes indicating the meaning of the character in the detection BBOX, which is obtained by the meaning estimation of the character recognized by the character recognition of the character in the detection BBOX from the BBOX is selected as BBOX as the setting information to be set in the text recognition engine.

In step S41, the recognition engine setting unit 144 selects one frame of interest of the sample scene as a frame of interest from the target content on the basis of the IN point and the OUT point of the sample scene, and the processing proceeds to step S42.

For example, the recognition engine setting unit 144 selects, as the frame of interest, one frame after a lapse of a predetermined period of time such as 1 second from the IN point of the sample scene or one frame before a lapse of a predetermined period of time from the OUT point.

In step S42, the recognition engine setting unit 144 causes the recognition engine capable of performing the character detection in the recognition engine 120 to perform the character detection on the frame of interest as the target. In the character detection, all characters in the frame of interest and BBOX surrounding each character are detected as the detection BBOX as the characterizing detection metadata.

After the detection of the detection BBOX in step S42, the processing proceeds to step S43.

In step S43, the recognition engine setting unit 144 causes the recognition engine capable of performing the character recognition in the recognition engine 120 to perform the character recognition of the character (string) in each detection BBOX by using each detection BBOX on only a plurality of frames near the IN point and near the OUT point of the sample scene as the target, and the processing proceeds to step S44.

In step S44, the recognition engine setting unit 144 causes the recognition engine capable of performing the meaning estimation in the recognition engines 120 to perform the meaning estimation of the character in each detection BBOX recognized by the character recognition.

The recognition engine setting unit 144 generates the character attribute of each detection BBOX on the basis of the result of the meaning estimation of the character in each detection BBOX, and the processing proceeds from step S44 to step S45.

In step S45, on the basis of the character attribute of the detection BBOX, the recognition engine setting unit 144 selects the detection BBOX of the specific character attribute from the detection BBOX as the BBOX to be set as the setting information of the text recognition engine. Moreover, the recognition engine setting unit 144 generates a setting file in which the selected BBOX and the character attribute of the BBOX are retained as the setting information of the text recognition engine, and the processing is ended.

The setting information retained in the setting file generated as described above is set in the text recognition engine.

The text recognition engine in which the setting information is set performs the recognition processing on the entire target content as the target on the basis of the setting information.

In the recognition processing of the text recognition engine, the character recognition using the BBOX as the setting information and the character analysis of the character recognized by the character recognition using the character attribute of the BBOX as the setting information are performed.

The metadata of the text (character) included in the target content detected by the character recognition and the character analysis of the recognition processing of the text recognition engine is retained, as the detection metadata detected by the recognition processing of the text recognition engine, in a metadata file. (The cutting metadata generated on the basis of) the detection metadata retained in the metadata file is used for generating the cutting rule and cutting the cut scene according to the cutting rule (detecting the IN point and the OUT point of the cut scene).

The result of the character analysis is also used for the correction of the character erroneously recognized by the character recognition and the high-context interpretation.

In the correction of the erroneously recognized character, for example, in a case where the character in the BBOX whose character attribute is the score is erroneously recognized as the lower case letter “l” which is not the numeral, the erroneously recognized lower case letter “l” is corrected to the numeral “1”.

In the high-context interpretation of the character, for example, what kind of meaning a change point at which the character changes is interpreted. A change in the character includes a case where a changing character is stationary in addition to a case where a stationary (unchanged) character changes.

In the interpretation of the change point, for example, the stop of a changing numeral is interpreted as the stop of a count of the play clock or the stop of a count of a game clock. Furthermore, for example, the start of a change in a stationary numeral is interpreted as the start of the count of the game clock.

Hereinafter, the generation of the setting information of the text recognition engine will be further described by exemplifying a case where the target content is the content of the American football game.

FIG. 25 is a diagram illustrating an example of a list of IN points, points, and OUT points of the sample scene acquired by the sample scene acquisition unit 145, and tag data.

In FIG. 25, start in a third line (from the top) and end in a fourth line indicate TCs expressed by periods of time of the IN point and the OUT point of the sample scene, respectively.

clock in a fifth line from the top and label in a sixth line indicate tag data.

In FIG. 25, the tag data clock on the fifth line indicates that the sample scene includes a point in time at which the game clock is 6:49 at a fourth quarter, and the tag data label on the sixth line indicates that the sample scene is the touchdown scene.

Figure 26:
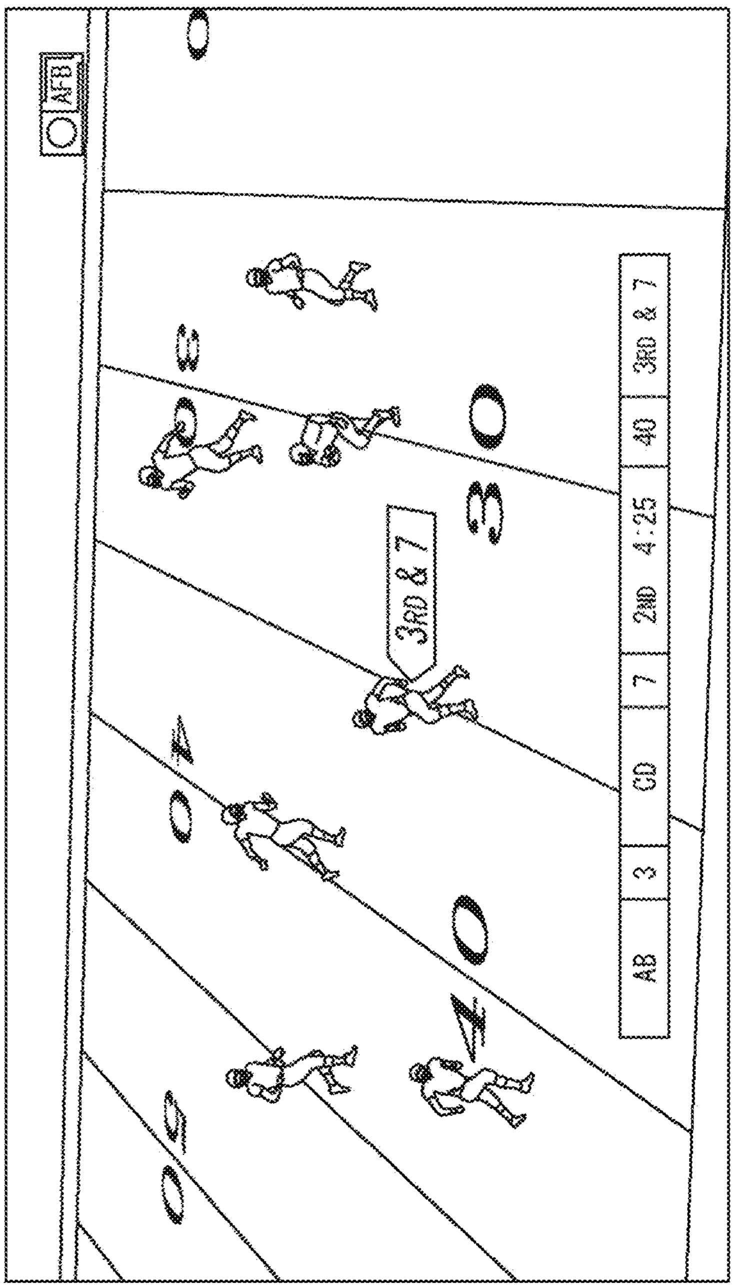
FIG. 26 is a diagram illustrating an example of a frame of interest selected on the basis of an IN point and an OUT point of a sample scene in the generation of the setting information of the text recognition engine.

FIG. 26 is a diagram illustrating an example of the frame of interest selected on the basis of the IN point and the OUT point of the sample scene in the generation of the setting information of the text recognition engine.

That is, FIG. 26 is a diagram illustrating an example of the frame of interest selected in step S41 of FIG. 24.

For example, one frame after 1 second from the IN point is selected as the frame of interest on the basis of the IN point and the OUT point of the sample scene illustrated in FIG. 25.

In FIG. 26, in the frame of interest, the scoreboard appears together with a state of play on the ground.

In the generation of the setting information of the text recognition engine, as described in step S42 of FIG. 24, the character detection is performed for the frame of interest as the target.

Figure 27:
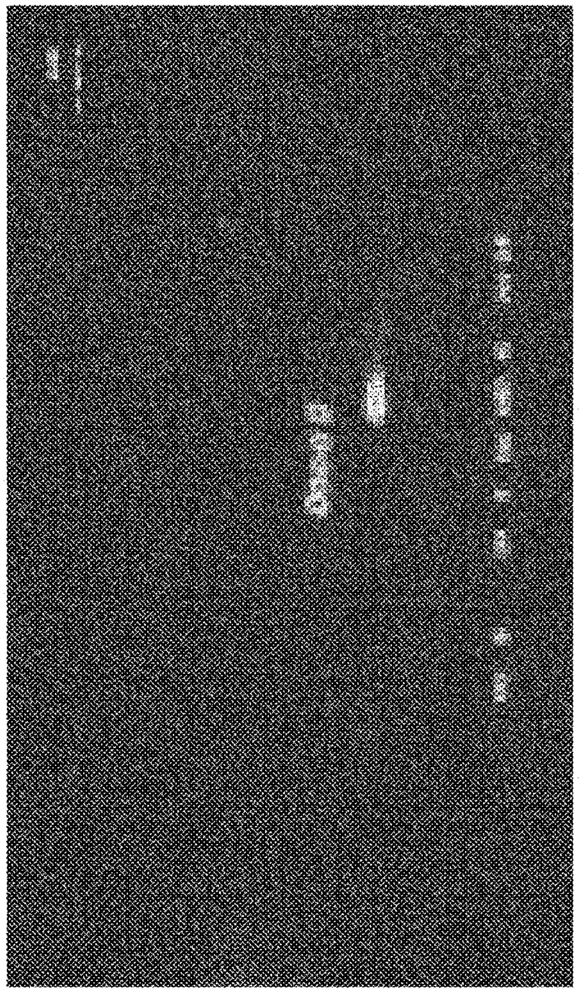
FIG. 27 is a diagram for describing character detection performed on a frame of interest as a target.

FIG. 27 is a diagram for describing the character detection performed for the frame of interest as the target.

In the character detection, an existence probability that the character is present at each position of the frame of interest is calculated, and for example, a position (range) where the existence probability is more than or equal to a threshold value is detected as a character existence position where the character is present.

FIG. 27 illustrates an example of a heat map indicating a distribution of existence probabilities corresponding to the frame of interest of FIG. 26. In the heat map, a white portion indicates a higher existence probability.

In the character detection, the arrangement of character present positions arranged at predetermined intervals or less in the frame of interest is detected as a meaningful arrangement of characters. Then, the BBOX surrounding the arrangement of characters is detected as the detection BBOX.

Figure 28:
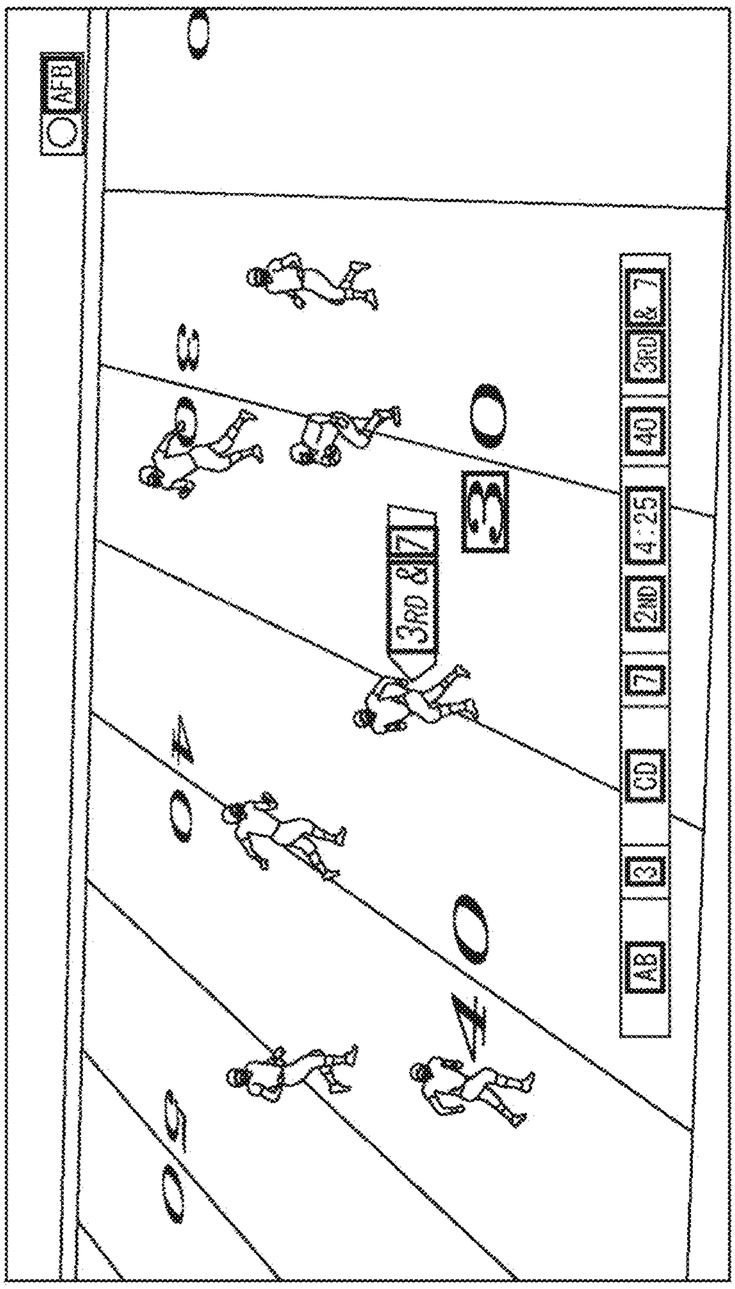
FIG. 28 is a diagram illustrating an example of a detection BBOX detected by character detection.

FIG. 28 is a diagram illustrating an example of the detection BBOX detected by the character detection.

That is, FIG. 28 illustrates an example of the detection BBOX detected by the character detection performed for the frame of interest in FIG. 26 as the target.

In FIG. 28, a thick frame box indicates the detection BBOX.

In FIG. 28, BBOX each surrounding characters of a logo related to the American football on upper right of a frame of interest and characters of “3RD &” and “7” among display “3RD & 7” of the number of downs displayed at a center of the frame of interest and the remaining number of yards of offense is detected as the detection BBOX.

Moreover, BBOX surrounding “3” in display “30” of the yard on the ground and BBOX surrounding each character of the scoreboard are detected as the detection BBOXs.

As for the characters on the scoreboard, BBOXs surrounding a team name “AB”, a score “3” of the team AB, a team name “CD”, a score “7” of the team CD, a quarter “2ND”, a game clock “4:25”, and a play clock “40” are detected as the detection BBOXs. Moreover, BBOXs surrounding the characters of “3RD” and “& 7” in the display “3RD & 7” of the number of downs and the number of remaining yards of the offense are detected as the detection BBOXs.

In the generation of the setting information of the text recognition engine, as described in step S43 of FIG. 24, after the detection BBOX from the frame of interest is detected, the character recognition of the character in each detection BBOX is performed by using the detection BBOX on only a plurality of frames near the IN point and near the OUT point of the sample scene as the target.

The character recognition is performed on, for example, a frame of one second before and after the IN point of the sample scene and a frame of one second before and after the OUT point as the target.

FIG. 29 is a diagram illustrating an example of a list of detection (characterizing) metadata detected in the character recognition.

In FIG. 29, id in a first line indicates a number for specifying the detection BBOX. In type in a second line, detection metadata detected by the character analysis of the recognition processing of the text recognition engine is disposed. Before the recognition processing of the text recognition engine is performed, information according to a rule determined in advance is disposed in type.

confidence in a fifth line indicates the certainty of a result of the character recognition. text in a sixth line indicates a character recognized by the character recognition. startFrame in a seventh line indicates a frame of the target content in which display of the character recognized by the character recognition is started. duration in an eighth line indicates the number of frames in which the display of the character recognized by the character recognition continues. start in a ninth line and end in a tenth line indicate TC of the target content in which the display of the character recognized by the character recognition is started and TC of the ended target content, respectively.

Thereafter, pieces of information similar to in the fifth and tenth lines are repeated for the character recognized by using the detection BBOX specified by id in the list.

In the generation of the setting information of the text recognition engine, as described in step S44 of FIG. 24, after the character recognition of the character in each detection BBOX, the meaning estimation of the character in each detection BBOX is performed.

FIG. 30 is a diagram illustrating an example of a list of detection (characterizing) metadata detected in the meaning estimation.

In FIG. 30, bbox_type in a third line indicates a character attribute of the detection BBOX specified by id. As the character attribute, for example, score indicating a score, clock indicating a clock, ordinal indicating a quarter, name indicating a name, and other indicating other meanings are prepared, and in the meaning estimation, any one of these character attributes is generated and disposed in bbox_type. In the example of FIG. 30, the character attribute of the detection BBOX specified by id is a score, and "score_text_type" indicating the score is disposed in bbox_type.

For example, change_flag in a fourth line indicates whether or not information of a change point at which the character recognized by the character recognition has changed, such as a case where the play clock has stopped, is included in the list. In change_flag, true is disposed in a case where the information of the change point is included, and false is disposed in a case where the information of the change point is not included. The change point is detected by the character analysis of the recognition processing of the text recognition engine. For example, false is disposed in change_flag until the character analysis is performed.

In the list of FIG. 30, items of information indicated in other lines are similar to those in FIG. 29.

In the generation of the setting information of the text recognition engine, as described in step S45 of FIG. 24, after the meaning estimation of the character in each detection BBOX, the BBOX to be set as the setting information of the text recognition engine is selected from the detection BBOXs on the basis of the character attribute of the detection BBOX generated by the meaning estimation.

Figure 31:
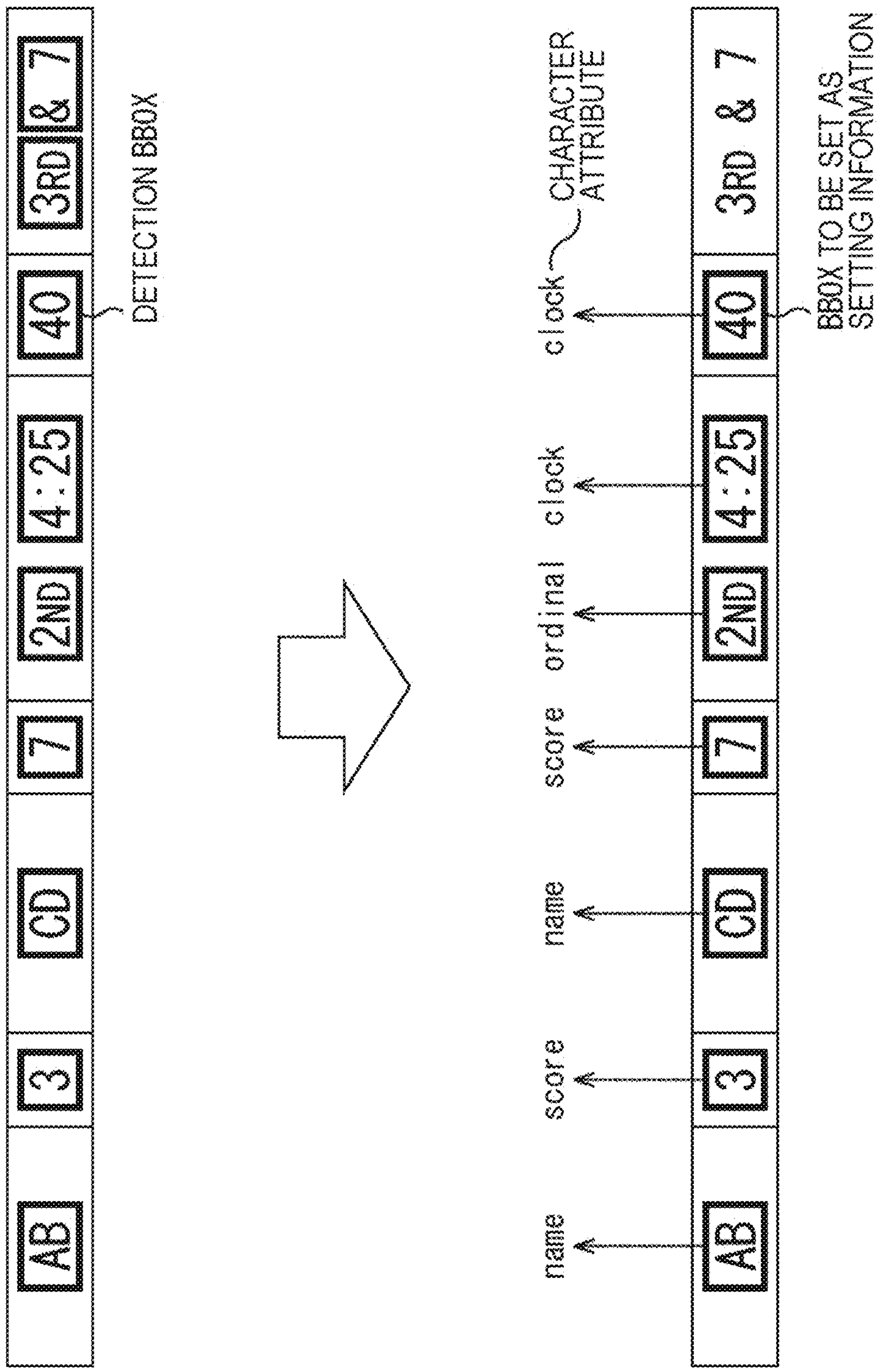
FIG. 31 is a diagram illustrating an example of selection of a BBOX as the setting information of the text recognition engine.

FIG. 31 is a diagram illustrating an example of the selection of the BBOX to be set as the setting information of the text recognition engine.

FIG. 31 illustrates an example of the character attribute generated for the detection BBOX surrounding the character on the scoreboard.

In FIG. 31, the character attributes of the detection BBOX surrounding the score 3 of the team AB and the detection BBOX surrounding the score 7 of the team CD are scores. Furthermore, the character attribute of the detection BBOX surrounding the quarter 2ND is ordinal, and the character attribute of the detection BBOX surrounding the game clock 4:25 and the character attribute of the detection BBOX surrounding the play clock 40 are clocks. Furthermore, the character attributes of the detection BBOXs surrounding the team names are names. Note that, the character attribute of the other detection BBOX is "other".

In the selection of the BBOX to be set as the setting information of the text recognition engine, for example, the detection BBOXs having the character attributes score, clock, and ordinal are selected as the BBOXs to be the setting information of the text recognition engine.

The recognition engine setting unit 144 can present (display on the terminal 10) the BBOXs to be set as the setting information of the text recognition engine and the character attributes of the BBOXs to the user, for example, as illustrated in FIG. 31.

The user can correct (adjust) the BBOXs to be set as the setting information of the text recognition engine and the character attributes of the BBOXs by operating the terminal 10.

Moreover, the user can operate the terminal 10 to add or delete the BBOX to be set as the setting information of the text recognition engine and the character attribute of the BBOX.

After the BBOX to be set as the setting information of the text recognition engine and the character attribute of the BBOX are corrected as necessary, the BBOX to be set as the setting information and the character attribute of the BBOX are set in the text recognition engine.

In the text recognition engine in which the setting information is set, the recognition processing is performed on the entire target content as the target.

As described with reference to FIG. 24, in the recognition processing of the text recognition engine, the character recognition using the BBOX as the setting information and the character analysis of the character recognized by the character recognition using the character attribute of the BBOX as the setting information are performed.

FIG. 32 is a diagram illustrating an example of a list of detection metadata detected in the character recognition using the BBOX as the setting information in the recognition processing of the text recognition engine.

Each line of the list of FIG. 32 is similar to an item of information shown in each line of the list of FIG. 29, and thus, the description thereof is omitted.

FIG. 33 is a diagram illustrating an example of the list of detection metadata detected in the character analysis using the character attribute of the BBOX as the setting information in the recognition processing of the text recognition engine.

In FIG. 33, score_text_type indicating that the character attribute of the BBOX specified by id in a first line is score is disposed in bbox_type in a third line. In change_flag in a fourth line, true indicating that information of a change point is included in the list is disposed.

In FIG. 33, id on a seventh line indicates id for specifying the change point. score_difference in an eighth line indicates a change amount of the character at the change point. In FIG. 33, score_difference indicates the character in the BBOX whose character attribute is score, that is, the change amount of the score.

confidence in an eleventh line indicates the certainty of the result of the character recognition of the character in the BBOX specified by id in the first line. startFrame in a twelfth line indicates a frame of the target content in which the change in the character in the BBOX has started. duration in a thirteenth line indicates the number of frames in which the character in the BBOX specified by id in the first line continues to change. start in a fourteenth line and end in a fifteenth line indicate TC of the target content whose change in the character in the BBOX specified by id in the first line has started and the TC of the ended target content, respectively.

Thereafter, in the list, pieces of information similar to seventh to fifteenth lines are repeated for the change point occurring in the character in the detection BBOX specified by id.

In FIG. 33, other pieces of information are similar to the case of FIGS. 29 and 30.

<Generation of Cutting Rule>

Figure 34:
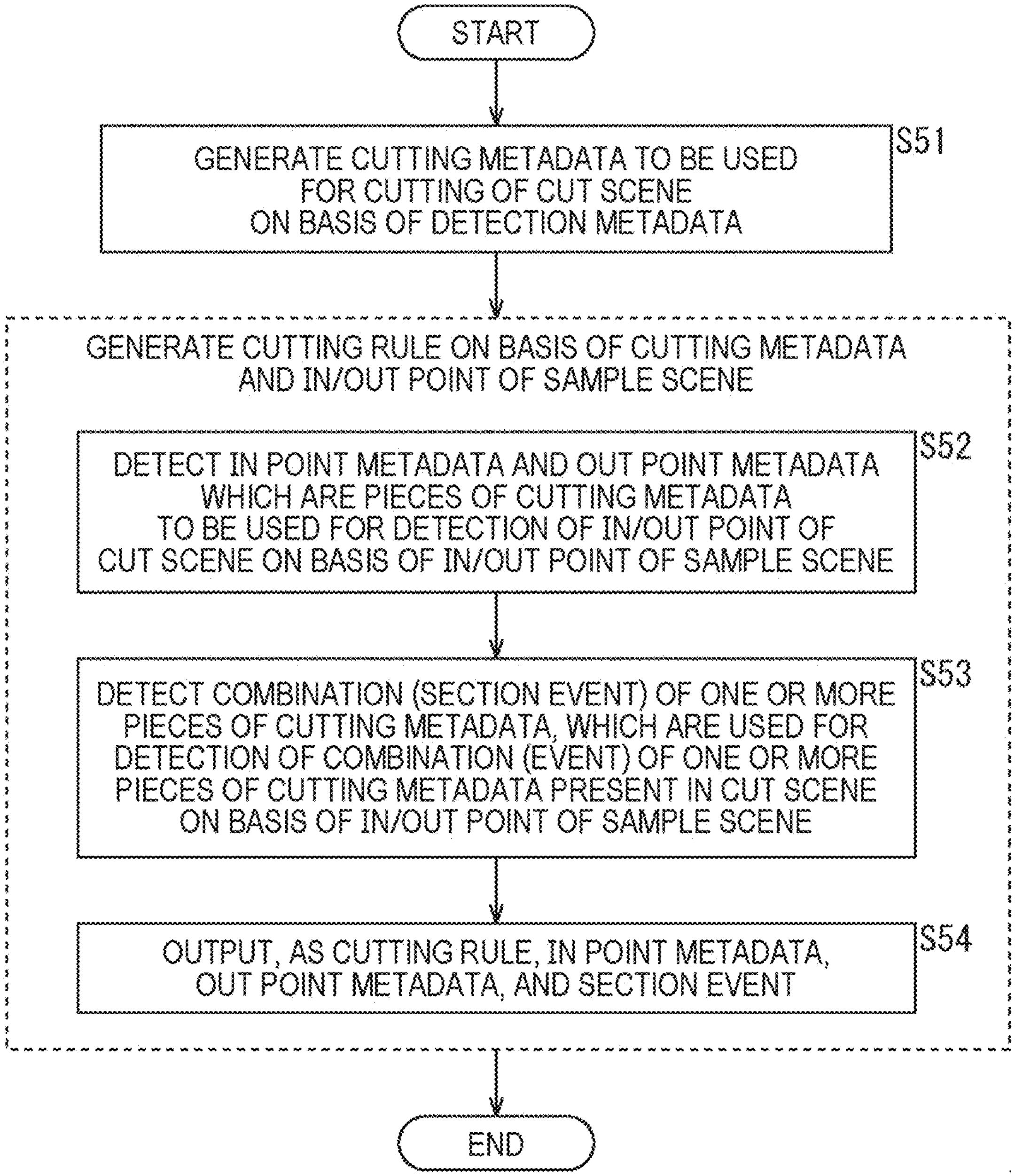
FIG. 34 is a flowchart for describing an example of processing of generating a cutting rule of a cutting rule generation unit 147.

FIG. 34 is a flowchart for describing an example of processing of generating the cutting rule of the cutting rule generation unit 147.

In step S51, the cutting rule generation unit 147 generates the cutting metadata to be used for cutting the cut scene on the basis of the detection metadata from the recognition engine 120 (general-purpose recognition engine 121 and non-general-purpose recognition engine 122).

Here, the cutting metadata can be abstracted (classified) into metadata of an Appear type, an Exist type, and a Change type.

(The cutting metadata of) the Appear type is metadata indicating appearance or disappearance of any target. The Exist type is metadata indicating that any target is present (or is not present). The Change type is metadata indicating a change in value.

The Appear type, the Exist Type type, and the Change type function as triggers for detection of the IN point and the OUT point of the cut scene in cutting of the cut scene.

In addition, a Label type indicating a value itself including the character can be generated as the cutting metadata.

In the present embodiment, among the Appear type, the Exist type, the Change type, and the Label type, the Appear type, the Exist type, and the Change type are used to cut the cut scene. The Label type can be used as auxiliary information in a case where tag data associated with the sample scene or the cut scene is generated or a specific scene such as a highlight scene is selected regardless of the sample scene.

After step S51, the processing proceeds to step S52 and subsequent steps, and the cutting rule generation unit 147 generates the cutting rule on the basis of the cutting metadata and the IN point and the OUT point of the sample scene.

In step S52, the cutting rule generation unit 147 detects the cutting metadata used to detect the IN point and the OUT point of the cut scene on the basis of the IN point and the OUT point of the sample scene, and the processing proceeds to step S53. Hereinafter, the cutting metadata used to detect the IN point and the OUT point of the cut scene is also referred to as IN point metadata and OUT point metadata, respectively.

In step S53, the cutting rule generation unit 147 detects an event used to detect a combination (hereinafter, also referred to as an event) of one or more pieces of cutting metadata present in the cut scene on the basis of the IN point and the OUT point of the sample scene, and the processing proceeds to step S54. Hereinafter, the event used to detect the event present in the cut scene is also referred to as a section event.

In step S54, the cutting rule generation unit 147 outputs the IN point metadata, the OUT point metadata, and the section event as the cutting rule to the rule engine 130 and the information output unit 149, and the processing is ended.

In the cutting of the cut scene according to the cutting rule, it is expected that the desired scene desired by the user is cut as the cut scene from the content of the same category as the target content in addition to the target content used to generate the cutting rule.

The content of the same category as the target content means, for example, the content of the same sport when the target content is the content of the sports game.

Figure 35:
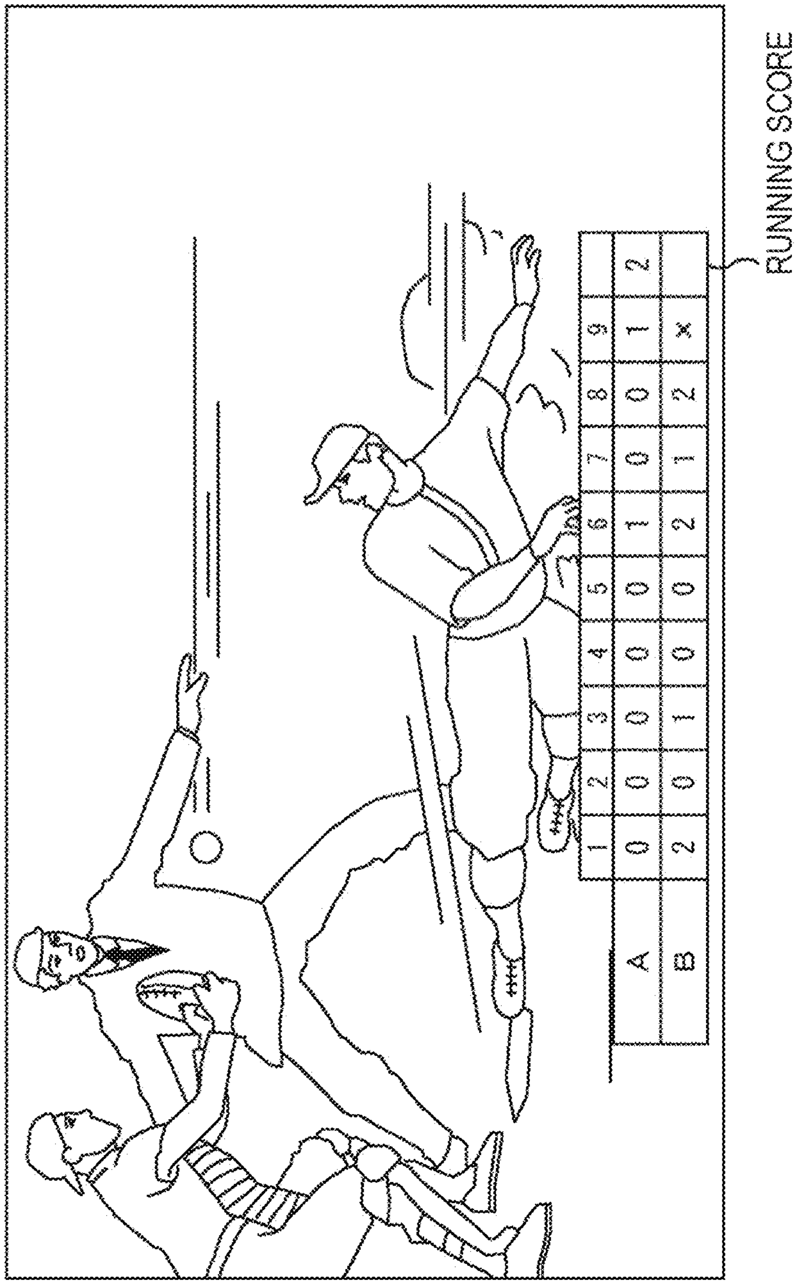
FIG. 35 is a diagram for describing a first example of an Appear type among pieces of cutting metadata.

FIG. 35 is a diagram for describing a first example of the Appear type among the pieces of cutting metadata.

FIG. 35 illustrates an example of one scene (frame) in which a running score appears in the content of the baseball game.

For example, the cutting metadata indicating that the display of the running score has started (the appearance of the running score) or has ended (the disappearance of the running score) is the Appear type.

The position (frame) on the timeline in the target content of the Appear type indicating that the display of the running score has started, that is, the frame in which such an Appear type is generated, becomes a candidate for the OUT point of the cut scene.

Figure 36:
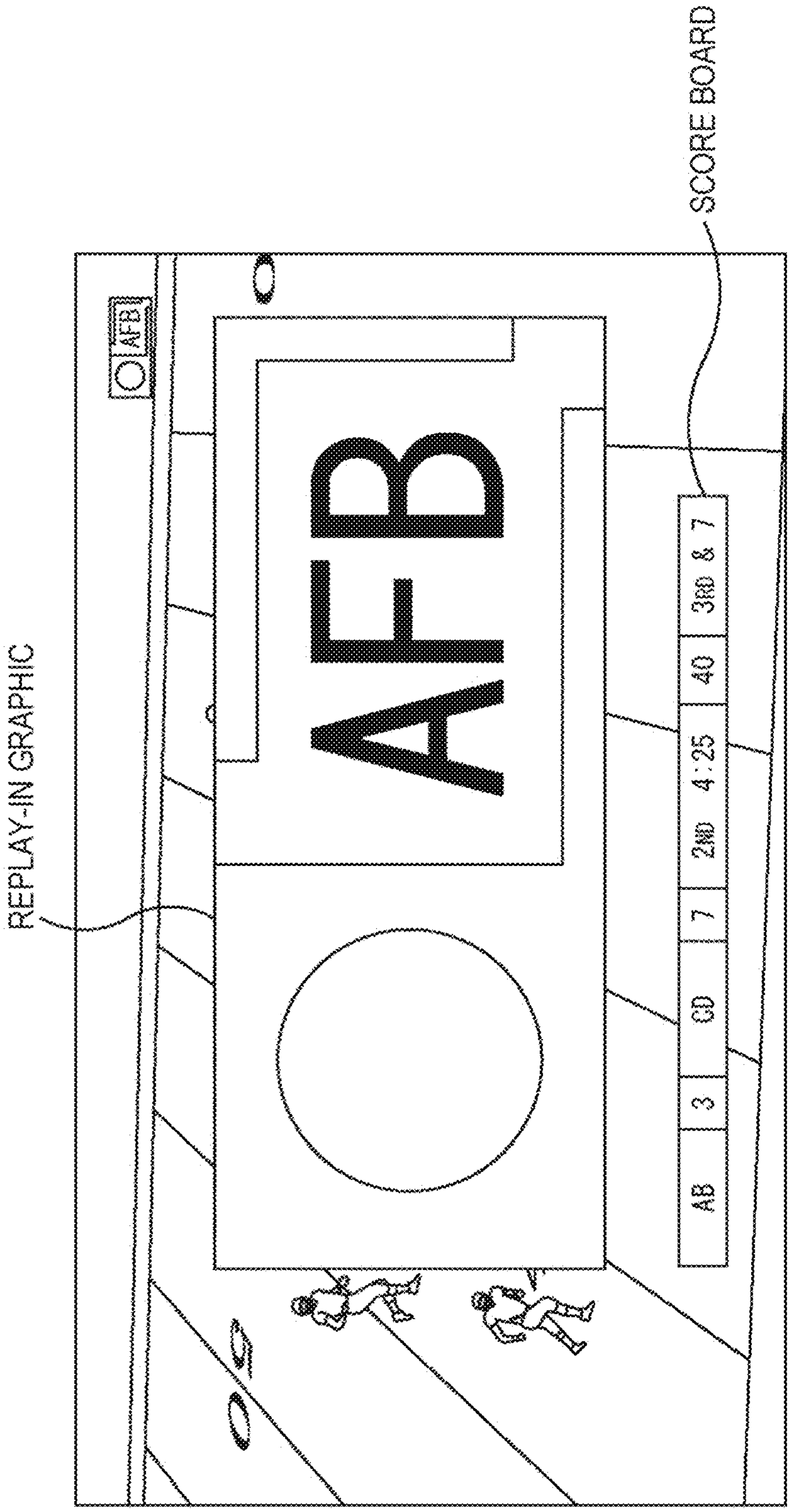
FIG. 36 is a diagram for describing a second example of the Appear type among the pieces of cutting metadata.

FIG. 36 is a diagram for describing a second example of the Appear type among the pieces of cutting metadata.

FIG. 36 illustrates an example of one scene in which a replay-in graphic appears in the content of the American football game.

For example, the cutting metadata indicating that the display of the replay-in graphic has started or ended is the Appear type.

A position of the Appear type indicating that the display of the replay-in graphic has started becomes a candidate for the OUT point of the cut scene.

In addition, for example, in the content of the American football game, the cutting metadata indicating that the display of the scoreboard has started or ended is the Appear type.

A position of the Appear type indicating that the display of the scoreboard has ended becomes a candidate for the OUT point of the cut scene.

Furthermore, for example, in the content of the sports game, the cutting metadata indicating that the camera SW is performed (the appearance of the camera SW) is the Appear type.

A position of the Appear type indicating that the camera SW is performed becomes a candidate for the IN point and the OUT point of the cut scene.

Figure 37:
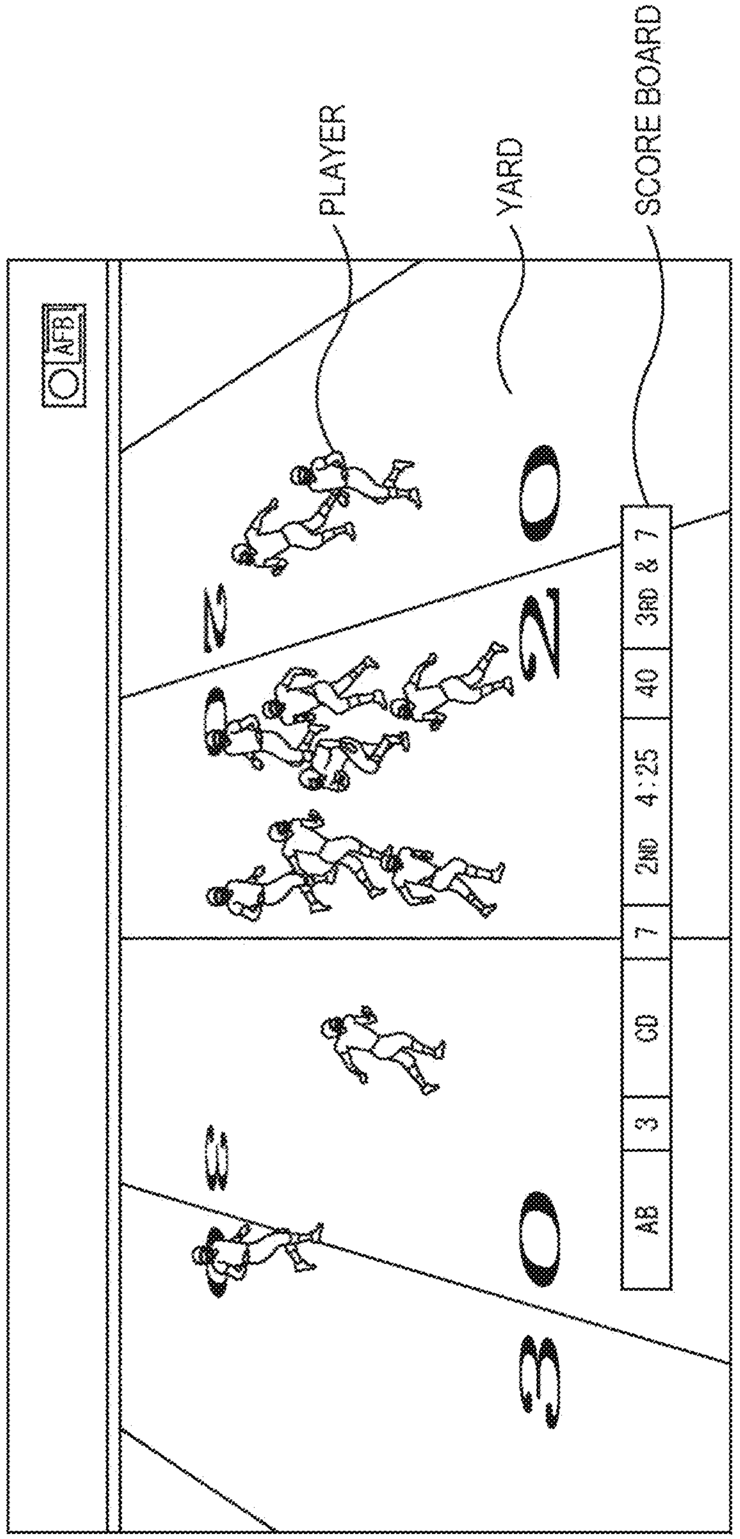
FIG. 37 is a diagram for describing a first example of an Exist type among the pieces of cutting metadata.

FIG. 37 is a diagram for describing a first example of the Exist type among the pieces of cutting metadata.

FIG. 37 illustrates an example of one scene (frame) before down (offense) in the content of the American football game.

For example, the cutting metadata indicating that the player is present (appears), that the display of the yard of the ground is present, that the scoreboard is present, and the like is the Exist type.

For example, a position (frame) where there are an Exist type indicating that a player is present, an Exist type indicating that there is display of the yard of the ground, and an Exist type indicating that there is the scoreboard, and there is an Appear type indicating that the camera SW is performed becomes a candidate for the IN point of the cut scene.

Figure 38:
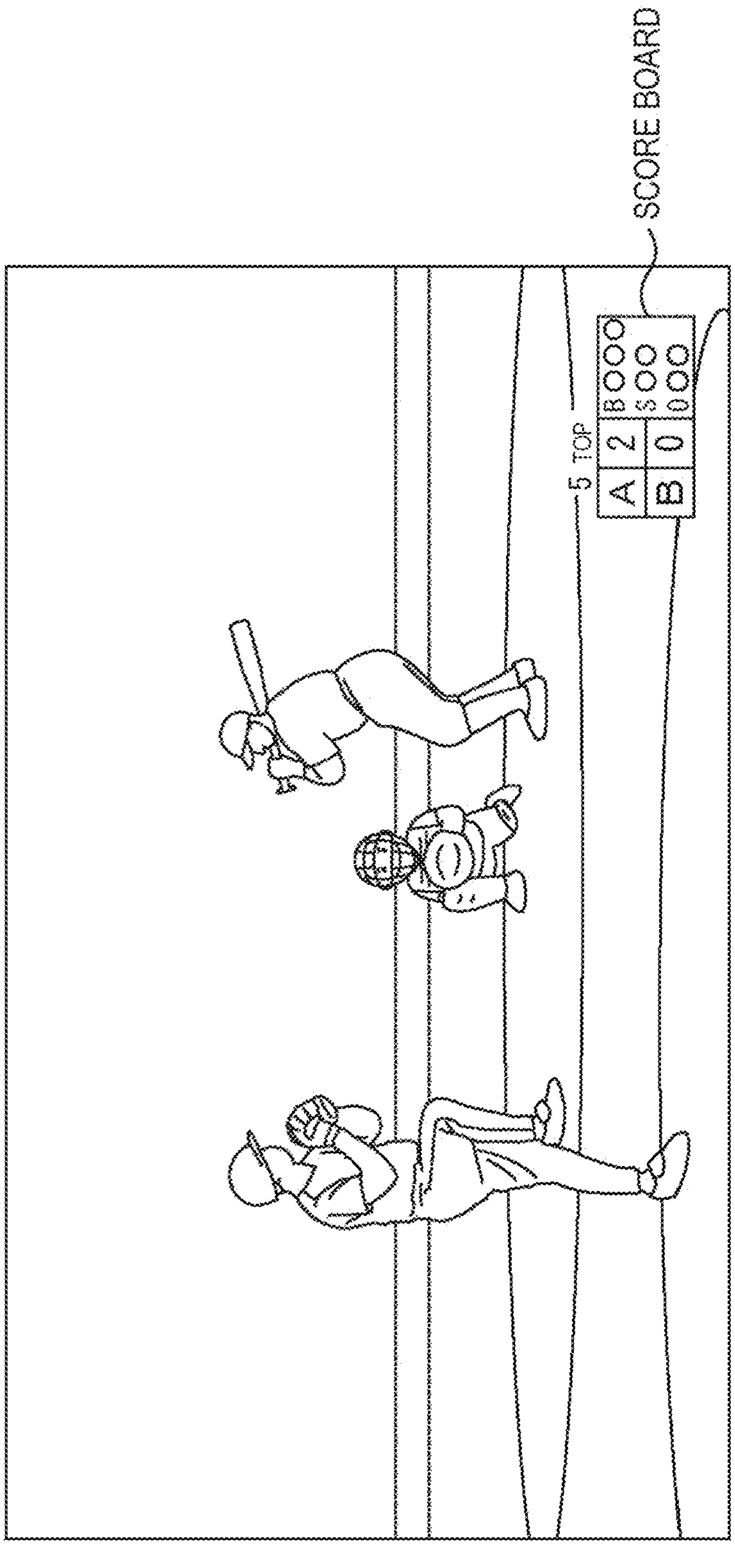
FIG. 38 is a diagram for describing a second example of the Exist type among the pieces of cutting metadata.

FIG. 38 is a diagram for describing a second example of the Exist type among the pieces of cutting metadata.

FIG. 38 illustrates an example of one scene (frame) imaged from a backscreen in the content of the baseball game.

For example, the cutting metadata indicating that (a player performing) a pitching operation is present (appears), the scoreboard is present, or the like is the Exist type.

For example, a position (frame) where an Exist type indicating that the pitching operation is present and an Exist type indicating that the scoreboard is present are present, and an Appear type indicating that the camera SW is performed is present becomes a candidate for the IN point of the cut scene.

In addition, for example, the cutting metadata indicating that the excitement section is present is the Exist type.

In a case where the Exist type indicating that the excitement section is present is present in consecutive frames, a position (frame) of a first Exist type is a candidate for the IN point of the cut scene, and a position (frame) of a last Exist type becomes a candidate for the OUT point of the cut scene.

Figure 39:
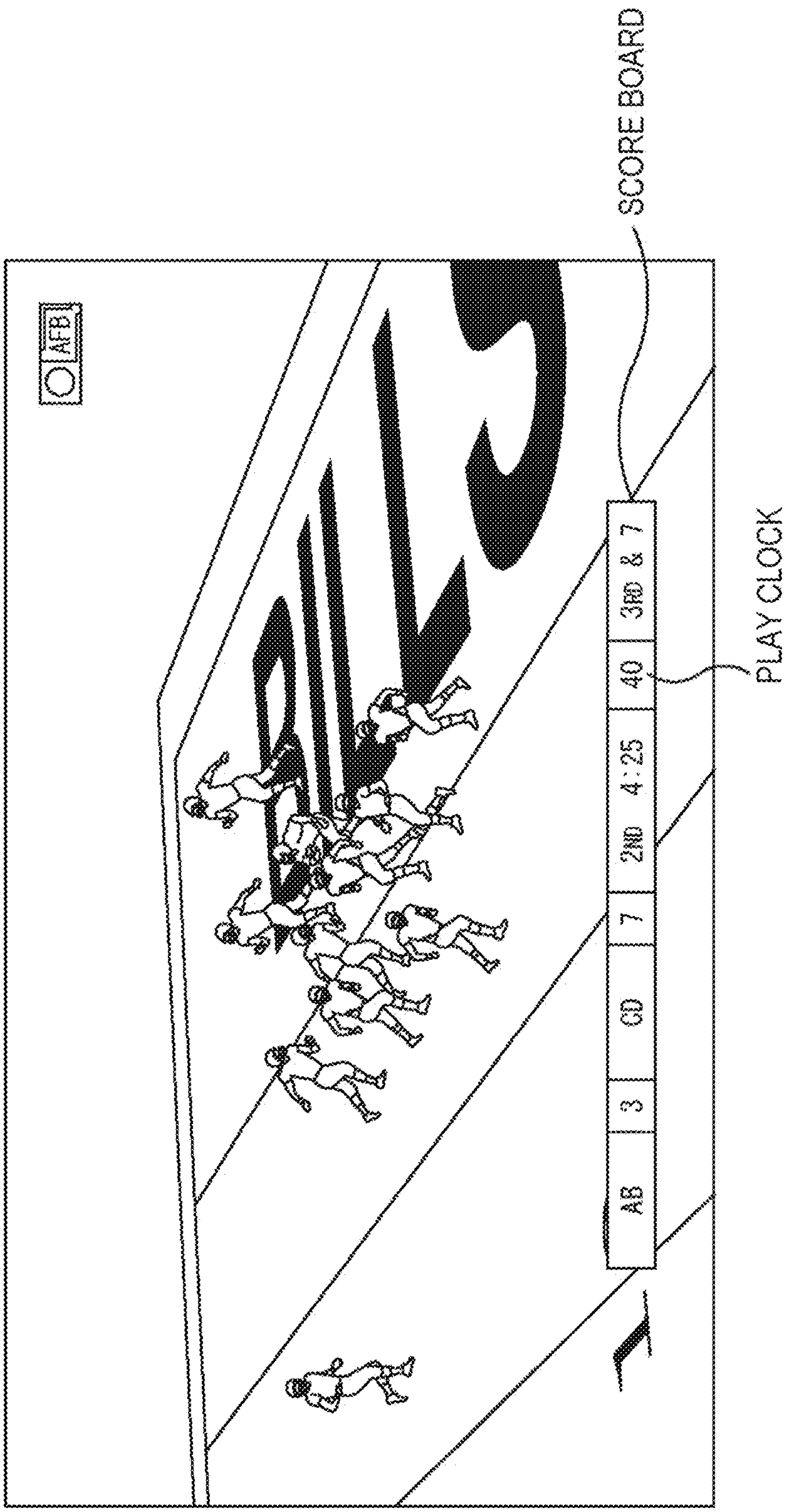
FIG. 39 is a diagram for describing a first example of a Change type among the pieces of cutting metadata.

FIG. 39 is a diagram for describing a first example of the Change type among the pieces of cutting metadata.

FIG. 39 illustrates an example of one scene in which the scoreboard appears in the content of the American football game.

For example, the cutting metadata indicating that the play clock of the scoreboard is reset to an initial value and a value as the play clock is changed to, for example, 40 seconds as the initial value is the Change type.

For example, a position (frame) where a Change type indicating that the play clock is changed to 40 seconds is present and an Appear type indicating that the camera SW is performed is present becomes a candidate for the IN point of the cut scene.

Figure 40:
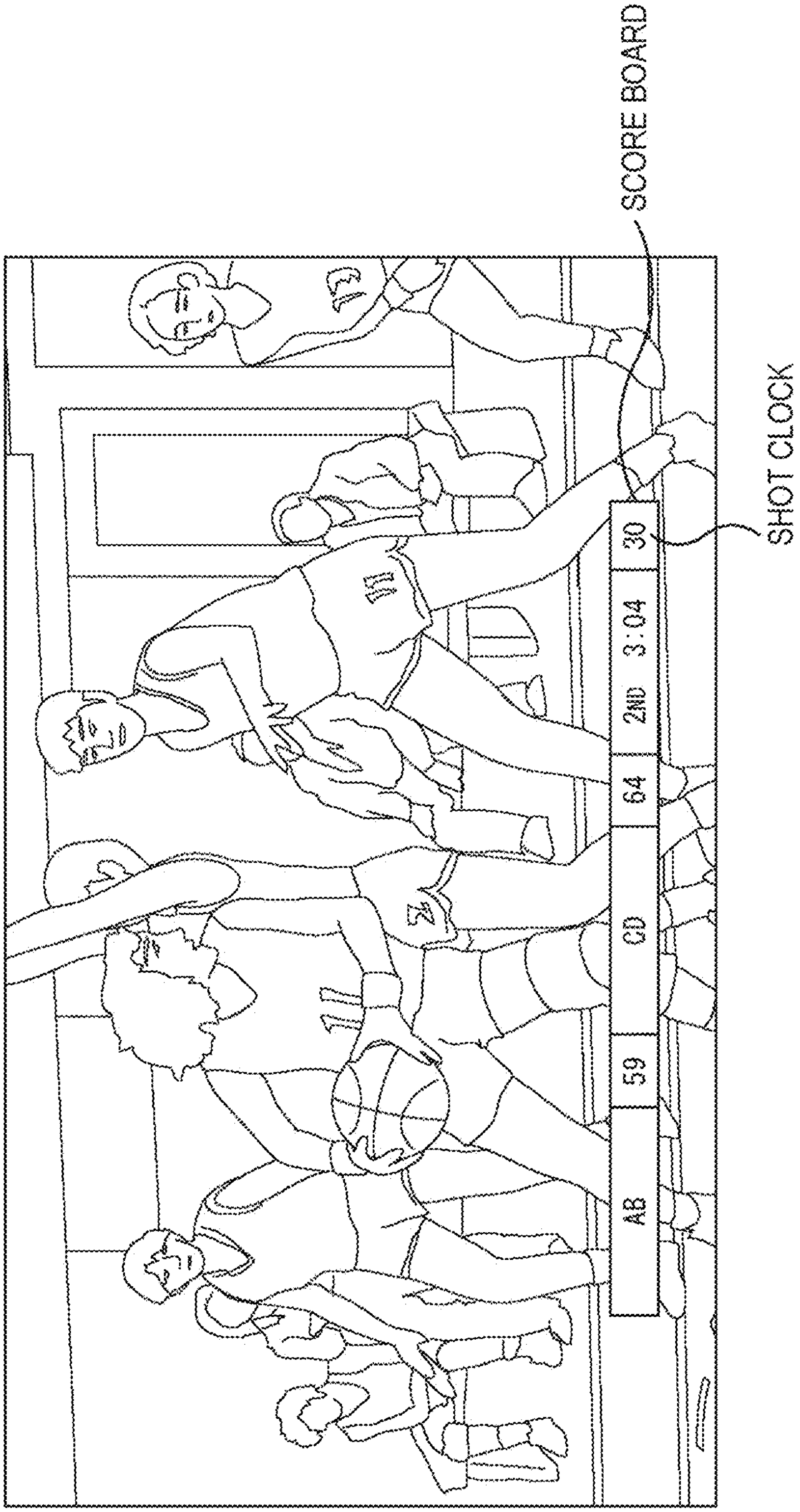
FIG. 40 is a diagram for describing a second example of the Change type among the pieces of cutting metadata.

FIG. 40 is a diagram for describing a second example of the Change type among the pieces of cutting metadata.

FIG. 40 illustrates an example of one scene in which the scoreboard appears in the content of the basketball game.

For example, the cutting metadata indicating that a shot clock of the scoreboard is reset to an initial value and a value as the shot clock is changed to, for example, 30 seconds as the initial value is the Change type.

For example, a position (frame) where a Change type indicating that the shot clock is changed to 30 seconds is present becomes a candidate for the IN point of the cut scene.

Figure 41:
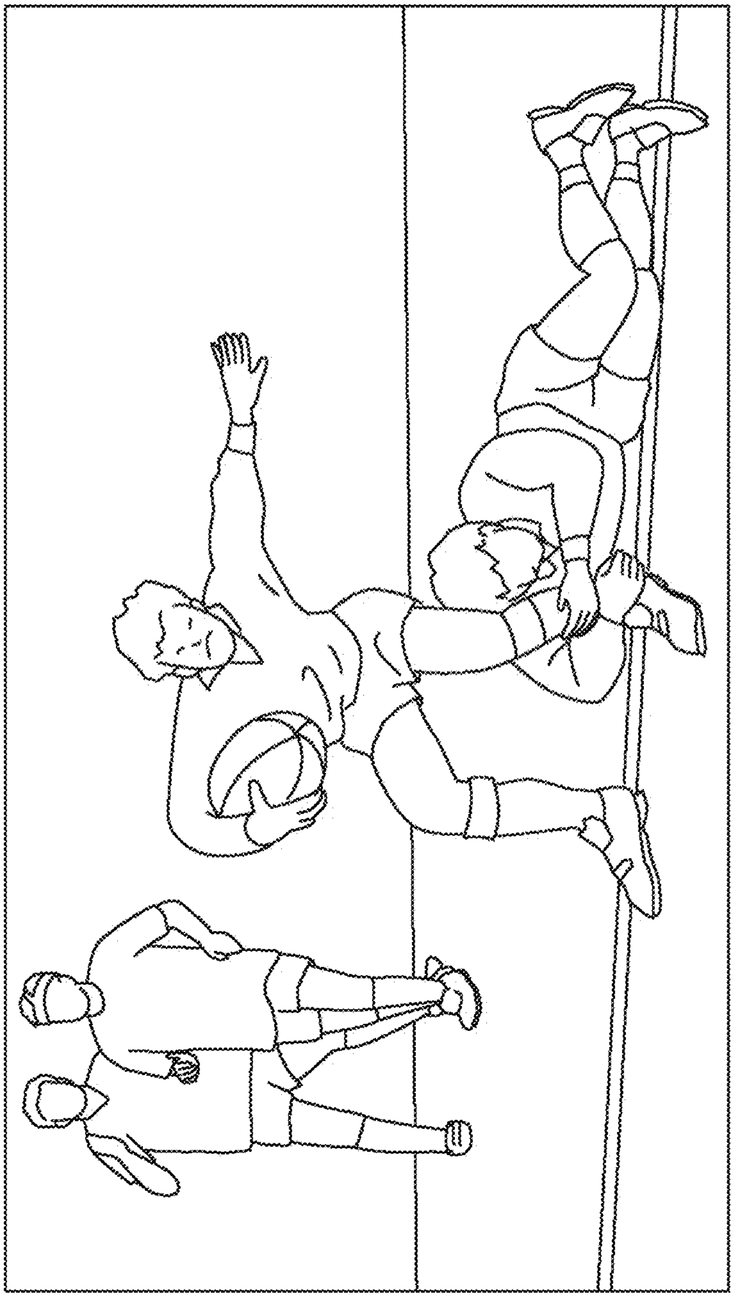
FIG. 41 is a diagram for describing a first example of a Label type among the pieces of cutting metadata.

FIG. 41 is a diagram for describing a first example of the Label type among the pieces of cutting metadata.

FIG. 41 illustrates an example of one scene (frame) in which a tackle is performed in the content of the rugby game.

For example, the cutting metadata indicating (a value of) the tackle as information of an action is the Label type.

For example, tag data indicating the tackle can be associated with a frame in which a Label type indicating the tackle is present. The tag data indicating the tackle can be used, for example, in a case where a scene of the tackle is searched for as a candidate for the highlight scene.

Figure 42:
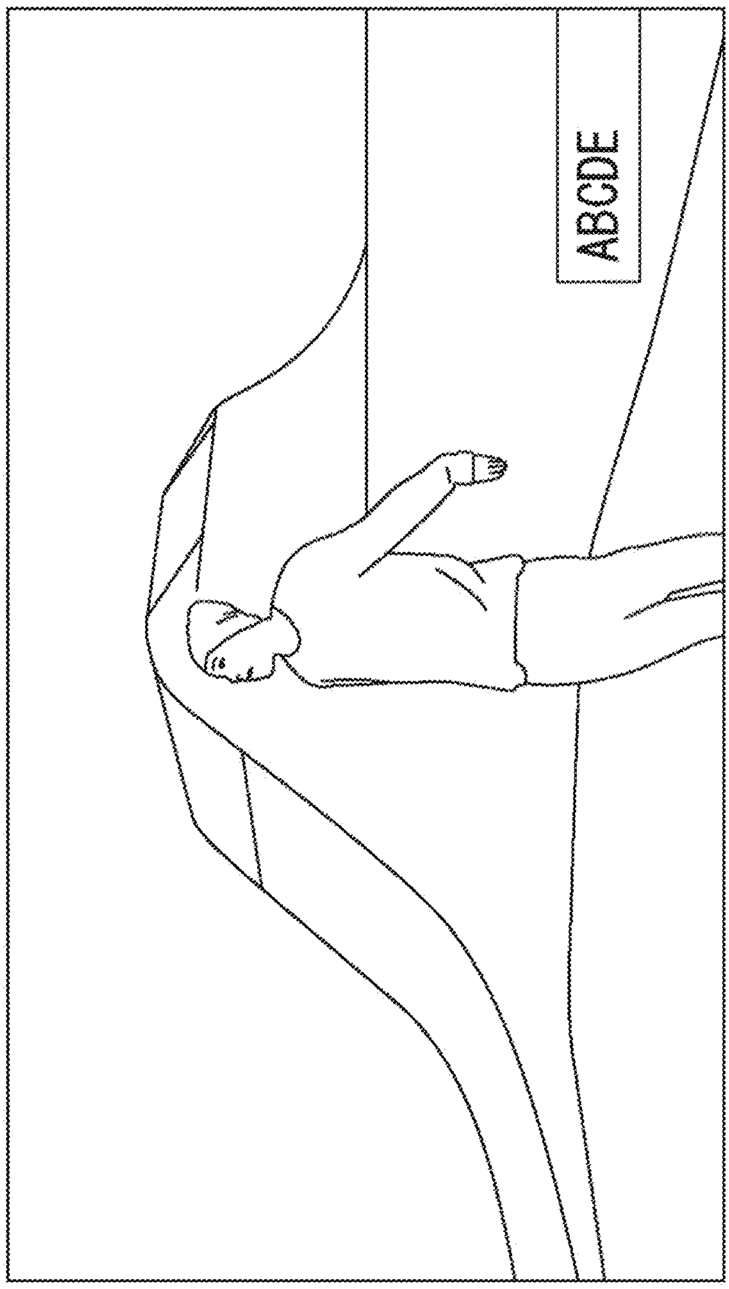
FIG. 42 is a diagram for describing a second example of the Label type among the pieces of cutting metadata.

FIG. 42 is a diagram for describing a second example of the Label type among the pieces of cutting metadata.

FIG. 42 illustrates an example of one scene in which a player and a player name ABCDE appear in a content of a skateboard game.

For example, since the cutting metadata indicating the player name indicates the character (value) itself as the player name, the cutting metadata is the Label type.

For example, in a frame in which the Label type indicating the player name is present, the player name indicated by the Label type can be associated as the tag data.

In addition, for example, the cutting metadata indicating the BBOX indicates a position (value) of a person such as the player surrounded by the BBOX, and thus, the cutting metadata is the Label type.

FIG. 43 is a diagram illustrating an example of the cutting metadata generated on the basis of the detection metadata output from the plurality of recognition engines included in the recognition engine 120.

FIG. 43 illustrates examples of the cutting metadata generated on the basis of the detection metadata output from the camera SW recognition engine, the object recognition engine, the text recognition engine, the graphic recognition engine, the color recognition engine, the excitement recognition engine, the specific sound detection (recognition) engine, the CM detection (recognition) engine, the matching recognition engine, the emotion recognition engine, the posture recognition engine, the shot composition recognition engine, the camera motion recognition engine, and the action recognition engine described in FIG. 12.

Examples of the cutting metadata generated on the basis of the detection metadata output from the camera SW recognition engine include the Appear type and the Exist type.

For example, the Exist type is generated in the frame in which the camera SW is recognized (in which the camera SW is present), and the Appear type indicating the appearance or disappearance of the camera SW is generated in first and last (or next to the last) frames of one or more consecutive frames in which the camera SW is present.

Examples of the cutting metadata generated on the basis of the detection metadata output from the object recognition engine include the Appear type, the Exist type, and the Label type.

For example, the Exist type is generated in one or more frames in which the recognition target such as a person is present, and the Appear type indicating the appearance or disappearance of the recognition target is generated in first and last (or next to the last) frames of one or more consecutive frames in which the recognition target is present. For example, in the frame in which the recognition target such as a person is present, the (Label Type) type indicating the position or the like in the frame of the BBOX surrounding the recognition target is generated.

Examples of the cutting metadata generated on the basis of the detection metadata output from the text recognition engine include the Appear type, the Exist type, the Change type, and the Label type.

For example, the Exist type is generated in one or more frames in which the recognition target such as the clock (the numeral as the clock) is present, and the Appear type indicating the appearance or disappearance of the recognition target is generated in first and last (or next to the last) frames of one or more consecutive frames in which the recognition target is present. For example, the Change type is generated in a frame in which a value (numeral) as the clock as the recognition target is simply changed or a frame in which a value (numeral) as the clock as the recognition target is changed to a specific value X. Furthermore, for example, a Label Type indicating the value is generated in one or more frames in which the value as the clock as the recognition target is less than or equal to (less than) the specific value X.

Examples of the cutting metadata generated on the basis of the detection metadata output from the graphic recognition engine include the Appear type and the Exist type.

For example, the Exist type is generated in one or more frames in which the recognition target such as (display of) the scoreboard is present, and the Appear type indicating the appearance or disappearance of the recognition target is generated in first and last (or next to the last) frames of one or more consecutive frames in which the recognition target is present.

Examples of the cutting metadata generated on the basis of the detection metadata output by the color recognition engine include the Appear type, the Exist type, the Change type, and the Label type.

For example, the Exist type is generated in one or more frames in which the recognition target such as the BSO display is present, and the Appear type indicating the appearance or disappearance of the recognition target is generated in first and last (or next to the last) frames of one or more consecutive frames in which the recognition target is present. Furthermore, for example, the Change type is generated in a frame in which the BSO display of the recognition target is simply changed or a frame in which the BSO display is changed to a specific BSO display X. Furthermore, for example, a Label Type indicating the specific BSO display X is generated in a frame in which the BSO display of the recognition target is the specific BSO display X.

Examples of the cutting metadata generated on the basis of the detection metadata output from the excitement recognition engine include the Appear type and the Exist type.

For example, the Exist type is generated in one or more frames (frames in which the excitement section is present) in the excitement section, and the Appear type indicating the appearance or disappearance of the excitement section is generated in the first and last (or next to the last) frames of the excitement section.

Examples of the cutting metadata generated on the basis of the detection metadata output by the specific sound detection engine include the Appear type and the Exist type.

For example, the Exist type is generated in one or more frames in which the recognition target such as the shot sound is present, and the Appear type indicating the appearance or disappearance of the recognition target is generated in first and last (or next to the last) frames of one or more consecutive frames in which the recognition target is present.

Examples of the cutting metadata generated on the basis of the detection metadata output from the CM detection engine include the Appear type and the Exist type.

For example, the Exist type is generated in one or more frames in which the CM which is the recognition target is present, and the Appear type indicating the appearance or disappearance of the CM is generated in first and last (or next to the last) frames of one or more consecutive frames in which the CM is present.

Examples of the cutting metadata generated on the basis of the detection metadata output from the matching recognition engine include the Appear type and the Exist type.

For example, the Exist type is generated in one or more frames in which data matching with predetermined media data is present, and the Appear type indicating the appearance or disappearance of the data matching with predetermined media data is generated in first and last (or last) frames of one or more consecutive frames in which the data matching with predetermined media data is present.

Examples of the cutting metadata generated on the basis of the detection metadata output from the emotion recognition engine include the Appear type, the Exist type, and the Label type.

For example, the Exist type is generated in one or more frames in which the emotion of the recognition target is present, and the Appear type indicating the appearance or disappearance of the emotion is generated in first and last (or next to the last) frames of one or more consecutive frames in which the emotion of the recognition target is present. For example, a Label Type indicating a specific emotion X is generated in a frame in which the specific emotion X is present.

Examples of the cutting metadata generated on the basis of the detection metadata output from the posture recognition engine include the Appear type, the Exist type, and the Label type.

For example, the Exist type is generated in one or more frames in which the skeleton information indicating the posture of the person is present (the posture of the person is recognized), and the Appear type indicating the appearance or disappearance of the skeleton information is generated in first and last (or next to last) frames of one or more consecutive frames in which the skeleton information is present. For example, a Label Type indicating the specific skeleton information X is generated in a frame in which the specific skeleton information X is present.

Examples of the cutting metadata generated on the basis of the detection metadata output from the shot composition recognition engine include an Appear type, an Exist type, and a Label type.

For example, the Exist type is generated in one or more frames in which composition information indicating the composition is present (the composition is recognized (estimated)), and the Appear type indicating the appearance or disappearance of the composition information is generated in first and last (or next to the last) frames of one or more consecutive frames in which the composition information is present. For example, in a frame in which composition information X indicating a specific composition is present, a Label Type indicating the composition information X is generated.

Examples of the cutting metadata generated on the basis of the detection metadata output from the camera motion recognition engine include an Appear type, an Exist type, and a Label type.

For example, an Exist type is generated in one or more frames in which the camera movement is present (in which the camera is moving), and an Appear type indicating the appearance or disappearance of the camera motion is generated in first and last (or next to last) frames of one or more consecutive frames in which the camera movement is present. For example, a Label Type indicating a specific movement X of the camera is generated in a frame in which the specific movement X is present.

Examples of the cutting metadata generated on the basis of the detection metadata output from the action recognition engine include the Appear type, the Exist type, and the Label type.

For example, the Exist type is generated in one or more frames in which an action such as a person is present (the action is recognized), and the Appear type indicating the appearance or disappearance of the action is generated in first and last (or next to the last) frames of one or more consecutive frames in which the action is present. For example, a Label Type indicating a specific action X is generated in a frame in which the specific action X is present.

Figure 44:
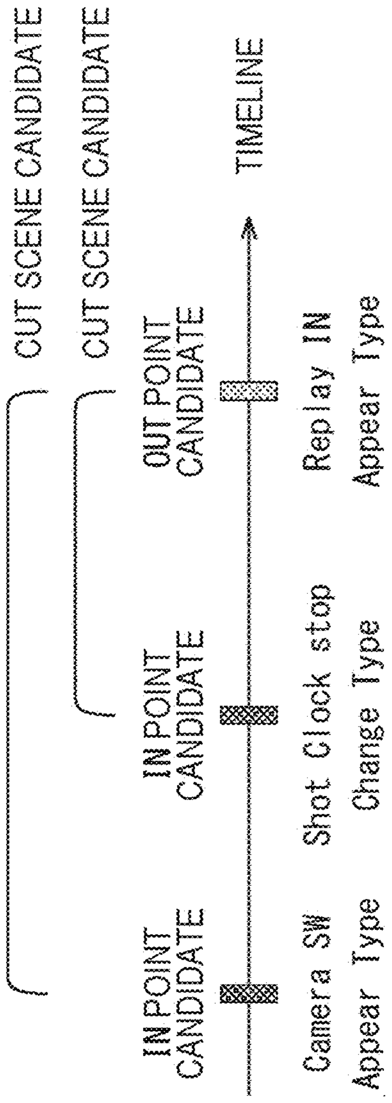
FIG. 44 is a diagram for describing an outline of cutting of the cut scene according to the cutting rule.

FIG. 44 is a diagram for describing an outline of the cutting of the cut scene according to the cutting rule.

In the cutting of the cut scene, that is, the detection of the IN point and the OUT point of the cut scene, an IN point candidate and an OUT point candidate to become the candidates for the IN point and the OUT point of the cut scene are selected from the position (frame) where the Appear type or the Change type is present.

Then, a section from the IN point candidate to the OUT point candidate after (temporally after) the IN point candidate becomes cut scene candidates that are candidates for the cut scene.

Figure 45:
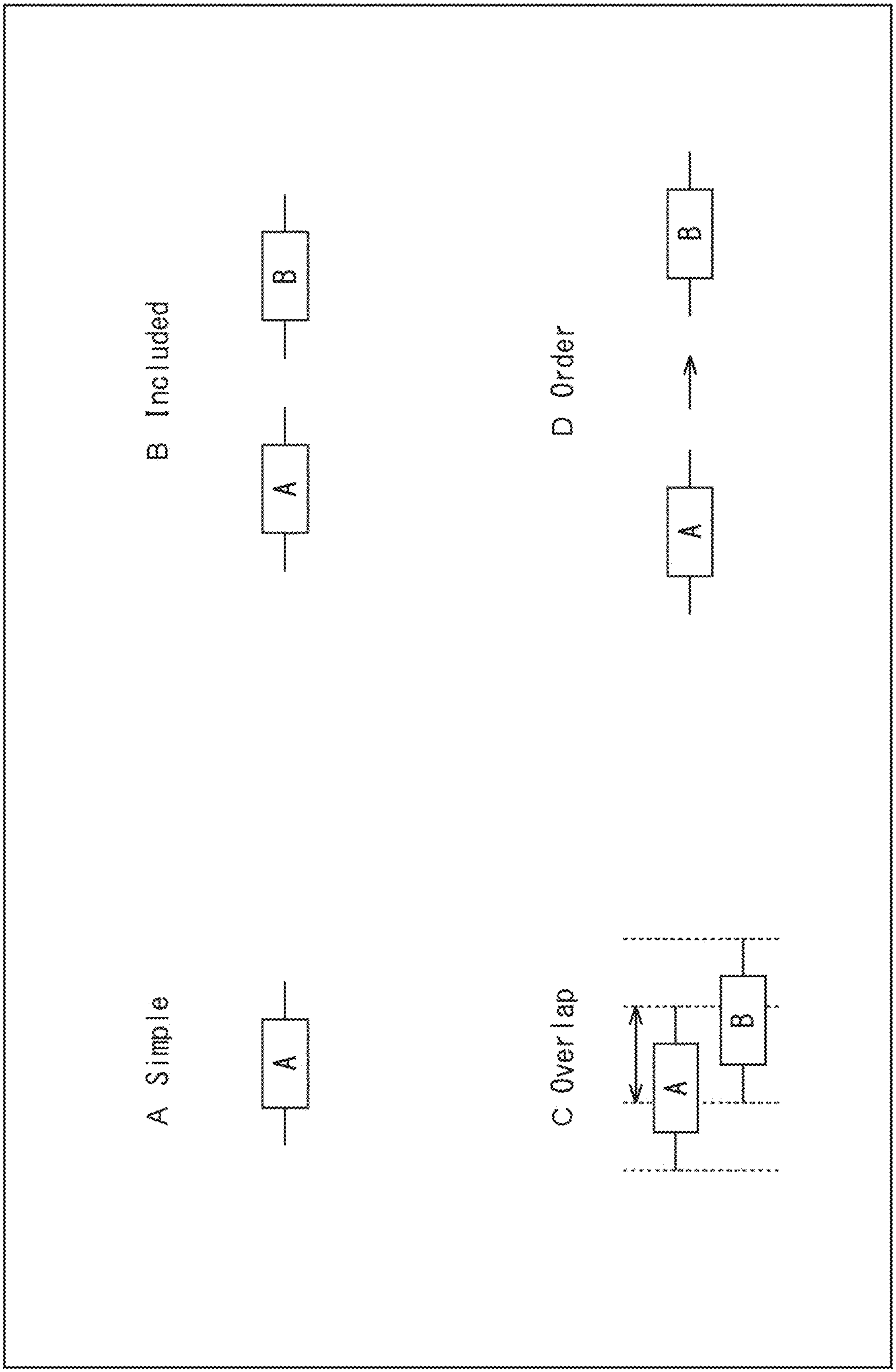
FIG. 45 is a diagram for describing a pattern of an event which is a combination of one or more pieces of cutting metadata.

FIG. 45 is a diagram for describing a pattern of the event which is the combination of one or more pieces of cutting metadata.

In the cutting of the cut scene according to the cutting rule, a cut scene candidate including an event similar to a section event becoming the cutting rule is cut as the cut scene from the cut scene candidates. That is, the IN point and the OUT point (the IN point candidate and the OUT point candidate) of the cut scene candidates including the event similar to the section event becoming the cutting rule are detected as the IN point and the OUT point of the cut scene.

The Exist type and the Change type among the pieces of cutting metadata can constitute the event (including the section event).

There are four patterns of events: Simple, Included, Overlap, and Order.

The Simple pattern is a pattern in which one piece of cutting metadata A is present.

The Included pattern, the Overlap pattern and the Order pattern are patterns in which a plurality of pieces of cutting metadata (two pieces of cutting metadata A and B in FIG. 45 and the like) are present.

The Overlap pattern is a pattern in which, among patterns in which the plurality of pieces of cutting metadata are present, particularly, a period of time in which one piece of cutting metadata A among the plurality of pieces of cutting metadata is present and a period of time in which another piece of cutting metadata B is present overlap at least partially.

The Order pattern is a pattern in which, among patterns in which the plurality of pieces of cutting metadata are present, particularly, periods of time in which one piece of cutting metadata A among the plurality of pieces of cutting metadata and another piece of cutting metadata B are present are disposed in order without overlapping each other.

Figure 46:
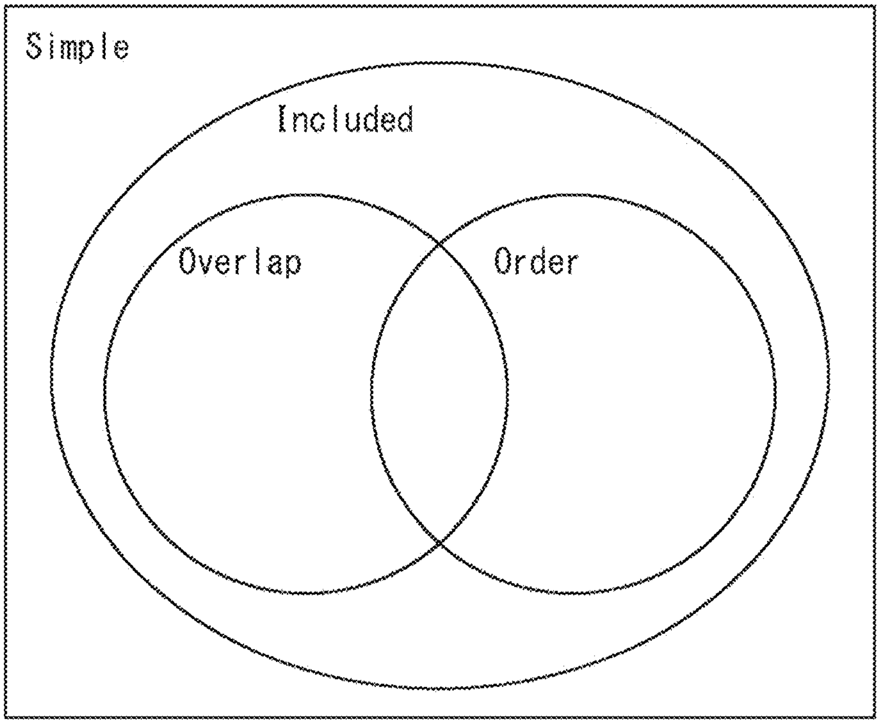
FIG. 46 is a diagram illustrating an inclusion relationship among a Simple pattern, an Included pattern, an Overlap pattern, and an Order pattern.

FIG. 46 is a diagram illustrating an inclusion relationship among the Simple pattern, the Included pattern, the Overlap pattern, and the Order pattern.

Since the Included pattern, the Overlap pattern, and the Order pattern are the Simple patterns when focusing on one piece of cutting metadata, these patterns are included in the Simple pattern.

Since the Overlap pattern and the Order pattern are also the Included patterns, these patterns are included in the Included pattern.

For example, in a case where the period of times in which the pieces of cutting metadata A and B of the plurality of pieces of cutting metadata included in the Overlap pattern are present overlap each other partially and the period of times in which the pieces of cutting metadata B and C are present overlap each other partially, when the periods of time in which the pieces of cutting metadata A and C are present do not overlap each other partially, the pieces of cutting metadata A and C constitute the Order pattern.

Accordingly, a part of the Overlap pattern and a part of the Order pattern overlap each other.

Figure 47:
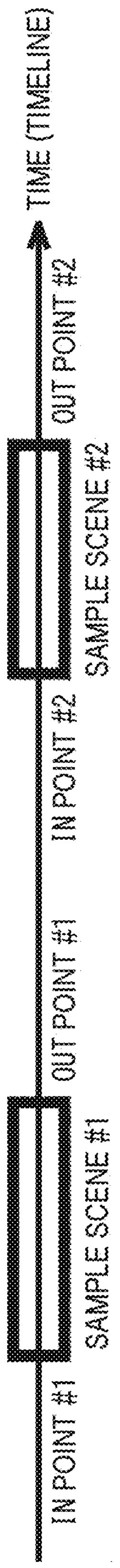
FIG. 47 is a diagram illustrating an example of designation of the sample scene.

FIG. 47 is a diagram illustrating an example of the designation of the sample scene.

For the cutting rule, as the number of sample scenes is larger, the cutting rule that can cut a scene more similar to the sample scene, that is, a more appropriate scene as the desired scene can be generated, and cutting accuracy of the cut scene is improved.

Accordingly, in the present embodiment, a plurality of sample scenes, for example, two sample scenes #1 and #2 are designated.

In the generation of the cutting rule, similar pieces of cutting metadata among the plurality of sample scenes are generated as the cutting rule on the basis of the plurality of sample scenes (here, two sample scenes #1 and #2).

Hereinafter, an IN point and an OUT point of a sample scene #i are also referred to as an IN point #i and an OUT point #i, respectively.

Figure 48:
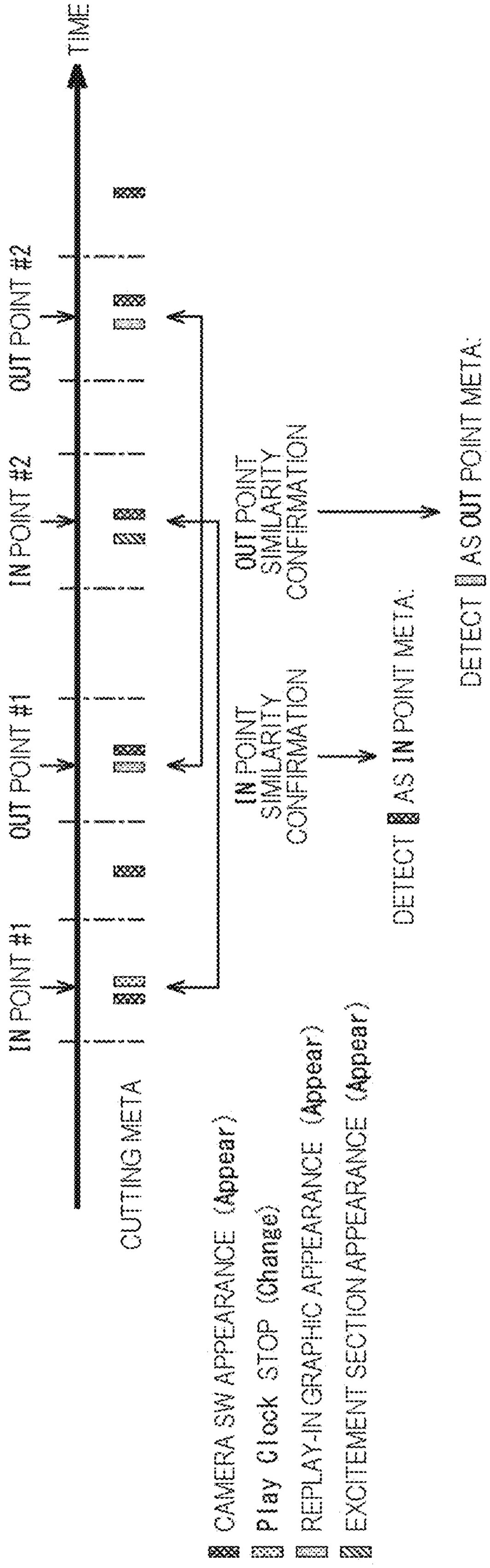
FIG. 48 is a diagram for describing an example of detection of IN point metadata and OUT point metadata.

FIG. 48 is a diagram for describing an example of detection of IN point metadata and OUT point metadata to become the cutting rule.

FIG. 48 illustrates an example of the detection of the IN point metadata and the OUT point metadata used for the detection (search) of the IN point and the OUT point of the cut scene performed in step S52 of FIG. 34.

FIG. 48 illustrates pieces of cutting metadata present near the sample scenes #1 and #2 of the target content.

In FIG. 48, examples of the pieces of cutting metadata present near the sample scenes #1 and #2 of the target content include an Appear type indicating the appearance of the camera SW, a Change type indicating the stop of the play clock, an Appear type indicating the appearance of the replay-in graphic, and an Appear type indicating the appearance of the excitement section.

For each of the IN point and the OUT point of the sample scene, the cutting rule generation unit 147 detects the Appear type and the Change type present in the vicinity of the IN point and the vicinity of the OUT point as the candidates for the IN point metadata and the candidates for the OUT point metadata.

Then, the cutting rule generation unit 147 confirms similarity between the candidates for the IN point metadata in the vicinity of the IN point among the plurality of sample scenes (IN point similarity confirmation), and detects the most similar candidate for the IN point metadata as the IN point metadata on the basis of the similarity.

For example, in a case where there are candidates of which details coincide among candidates for IN point metadata in the vicinity of an IN point #1 of the sample scene #1 and candidates for IN point metadata in the vicinity of an IN point #2 of the sample scene #2, the candidates are detected as the IN point metadata.

In a case where there are a plurality of most similar candidates for the IN point metadata among the candidates for the IN point metadata in the vicinity of the IN point #1 of the sample scene #1 and the candidates for the IN point metadata in the vicinity of the IN point #2 of the sample scene #2, for example, a candidate present in the smallest number in the entire target content is detected as the IN point metadata among the plurality of candidates.

In a case where there are a plurality of most similar candidates for the IN point metadata, the number of cut scene candidates (FIG. 44) can be reduced in the cutting of the cut scene by detecting a candidate present in the smallest number in the entire target content among the plurality of candidates as the IN point metadata.

In FIG. 48, for the IN point #1 of the sample scene #1, an Appear type indicating the appearance of the camera SW in the vicinity of the IN point #1 and a Change type indicating the stop of the play clock are detected as candidates for the IN point metadata.

For the IN point #2 of the sample scene #2, an Appear type indicating the appearance of the excitement section in the vicinity of the IN point #2 and an Appear type indicating the appearance of the camera SW are detected as candidates for the IN point metadata.

Since a candidate having highest similarity among the candidates for the IN point metadata in the vicinity of the IN point between the sample scenes #1 and #2 is the Appear type indicating the appearance of the camera SW of which the details coincide, the Appear type indicating the appearance of the camera SW is detected as the IN point metadata.

The cutting rule generation unit 147 confirms similarity between the candidates for the OUT point metadata in the vicinity of the OUT point among the plurality of sample scenes (OUT point similarity confirmation), and detects the most similar candidate for the OUT point metadata as the OUT point metadata on the basis of the similarity.

For example, in a case where there are candidates whose details coincide with each other among candidates for OUT point metadata in the vicinity of an OUT point #1 of the sample scene #1 and candidates for OUT point metadata in the vicinity of an OUT point #2 of the sample scene #2, the candidates are detected as the OUT point metadata.

In a case where there is a plurality of most similar candidates for the OUT point metadata among the candidates for the OUT point metadata in the vicinity of the OUT point #1 of the sample scene #1 and the candidates for the OUT point metadata in the vicinity of the OUT point #2 of the sample scene #2, for example, a candidate present in the smallest number in the entire target content is detected as the OUT point metadata among the plurality of candidates.

In a case where there are a plurality of most similar candidates for the OUT point metadata, the number of cut scene candidates (FIG. 44) can be reduced in the cutting of the cut scene by detecting, as the OUT point metadata, the candidate present in the smallest number in the entire target content among the plurality of candidates.

In FIG. 48, for the OUT point #1 of the sample scene #1, the Appear type indicating the appearance of the replay-in graphic in the vicinity of the OUT point #1 and the Appear type indicating the appearance of the camera SW are detected as candidates for the OUT point metadata.

For the OUT point #2 of the sample scene #2, an Appear type indicating the appearance of the replay-in graphic in the vicinity of the OUT point #2 and an Appear type indicating the appearance of the camera SW are detected as candidates of the OUT point metadata.

As a candidate having highest similarity among the candidates of the OUT point metadata in the vicinity of the OUT point between the sample scenes #1 and #2, there are the Appear type indicating the appearance of the replay-in graphic and the Appear type indicating the appearance of the camera SW of which the details coincide.

In this case, the candidate present in the smallest number in the entire target content, of the Appear type indicating the appearance of the replay-in graphic and the Appear type indicating the appearance of the camera SW is detected as the OUT point metadata.

In FIG. 48, since the smaller number of candidates are present in the entire target content in the Appear type indicating the appearance of the replay-in graphic than in the Appear type indicating the appearance of the camera SW, the Appear type indicating the appearance of the replay-in graphic is detected as the OUT point metadata.

Note that, in a case where there is only one sample scene, for example, it is possible to detect, as the IN point metadata and the OUT point metadata, the cutting metadata and the like having the smallest number of pieces of metadata present in the entire target content among the pieces of cutting metadata present at the positions closest to the IN point and the OUT point and the cutting metadata present in the vicinity of the IN point and the vicinity of the OUT point.

Figure 49:
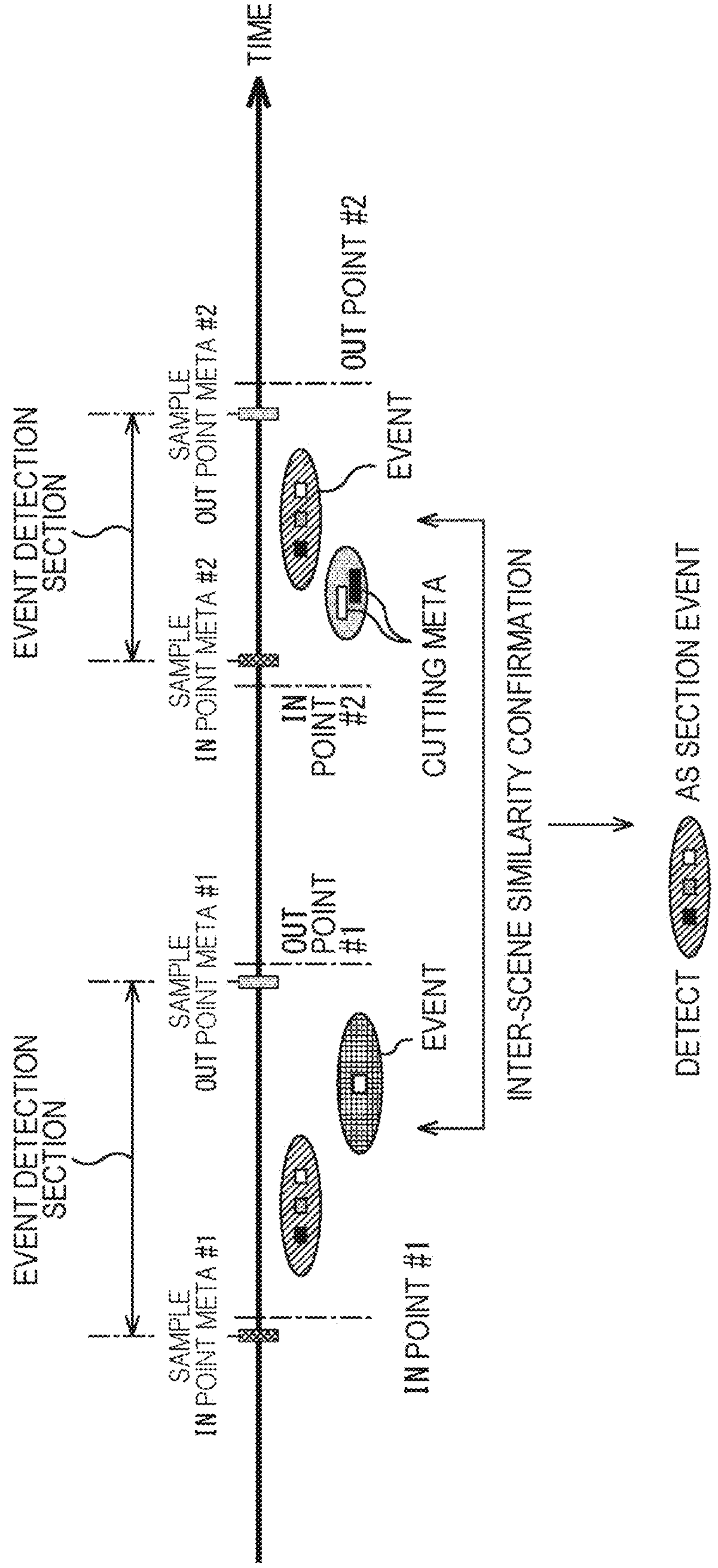
FIG. 49 is a diagram for describing an example of detection of a section event.

FIG. 49 is a diagram for describing an example of the detection of the section event to become the cutting rule.

FIG. 49 illustrates an example of the detection of the section event used for the detection (search) of the event of the cut scene performed in step S53 of FIG. 34.

FIG. 49 illustrates an event which is the combination of the cutting metadata present near the sample scenes #1 and #2 of the target content and one or more pieces of metadata.

Here, the cutting metadata detected as the IN point metadata and the OUT point metadata in the IN point and the vicinity of the OUT point of the sample scene are also referred to as sample IN point metadata and sample OUT point metadata, respectively.

For each of the plurality of sample scenes, the cutting rule generation unit 147 uses, as an event detection section in which the event is detected, a section from the position of the sample IN point metadata to the position of the sample OUT point metadata, and detects events present in the event detection section.

Then, the cutting rule generation unit 147 confirms similarity between the events detected in the event detection section among the plurality of sample scenes (inter-scene similarity confirmation), and detects a most similar event as the section event on the basis of the similarity.

For example, a section sandwiched between positions of sample IN point metadata #1 and sample OUT point metadata #1, which are the IN point metadata and the OUT point metadata in the vicinity of the IN point #1 and the vicinity of the OUT point #1 of the sample scene #1, is detected as the event section.

Similarly, a section sandwiched between positions of sample IN point metadata #2 and sample OUT point metadata #2, which are the IN point metadata and the OUT point metadata in the vicinity of the IN point #2 and the vicinity of the OUT point #2 of the sample scene #2 is detected as the event section.

Moreover, events present in the event detection section of each of the sample scenes #1 and #2 are detected. Then, among the events present in the event detection section of the sample scene #1 and the events present in the event detection section of the sample scene #2, a most similar event (including a combination of the events) is detected as the section event.

In a case where there is a plurality of the most similar events, for example, among the plurality of events, an event present in the smallest number in the entire target content is detected as the section event. The event present in the smallest number in the entire target content is detected as the section event, and thus, the number of cut scene candidates (FIG. 44) can be reduced in the cutting of the cut scene.

In FIG. 49, the same event is present in the event detection section of each of the sample scenes #1 and #2, and the same event is detected as the most similar event in the section event.

Note that, in a case where there is only one sample scene, for example, among the events present in the event detection section of the sample scene, a longest event, an event present in the smallest number in the entire target content, and the like can be detected as the section event.

Figure 50:
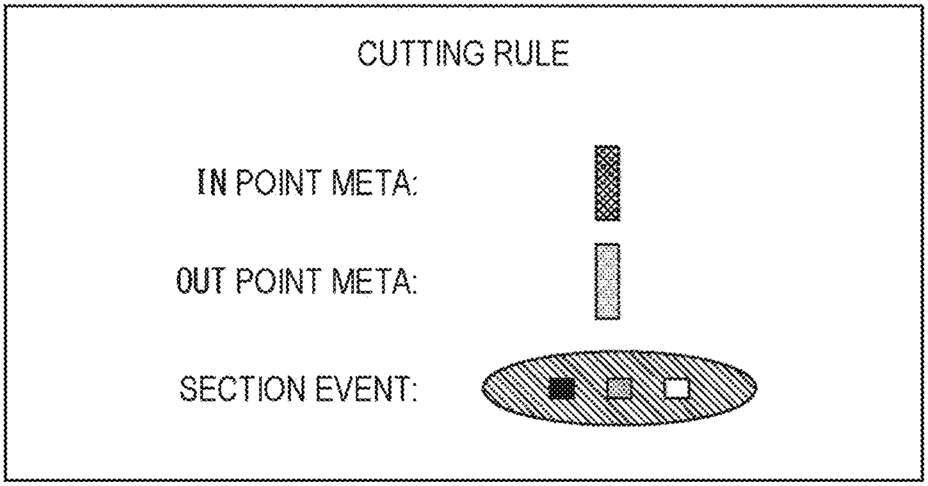
FIG. 50 is a diagram schematically illustrating the cutting rule.

FIG. 50 is a diagram schematically illustrating the cutting rule.

The cutting rule includes the IN point metadata and the OUT point metadata detected as described in FIG. 48, and the section event detected as described in FIG. 49.

In the cutting of the cut scene according to the cutting rule, the section is from the position where (the cutting metadata coinciding with) the IN point metadata is present to the position where (the cutting metadata coinciding with) the OUT point metadata is present, and is also the section where (the event coinciding with) the section event is present is cut as the cut scene.

Figure 51:
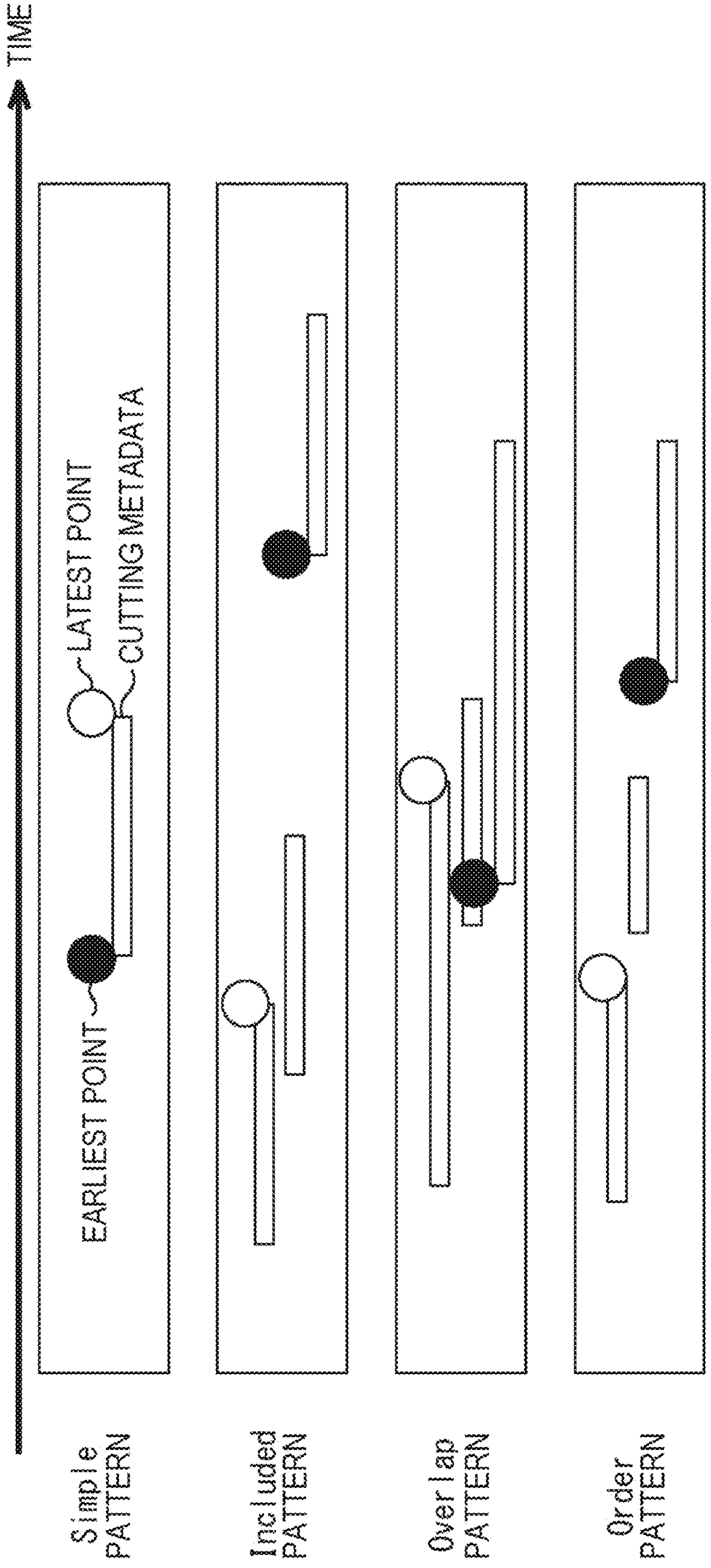
FIG. 51 is a diagram for describing a latest point and an earliest point of the event.

FIG. 51 is a diagram for describing a latest point and an earliest point of the event.

In the generation of the cutting rule, when any event can be detected as the section event without limitation, a scene shorter than the sample scene is likely to be erroneously cut even though the scene is not the desired scene in cutting the cut scene.

Accordingly, in the detection of the section event, an event in which the scene shorter than the sample scene is erroneously cut (hereinafter, also referred to as a non-target event) is excluded from the detection target of the section event.

That is, in the detection of the section event, it is determined whether or not the event is the non-target event, and the event determined to be the non-target event is not detected as the section event.

The latest point and the earliest point of the event are used to determine the non-target event.

The latest point means a latest time (frame number, TC, and the like) at which the IN point (foremost end) of the cut scene can be taken in order to establish the event in the cut scene. In other words, the latest point means a last point in time in time order at which the IN point of the cut scene can be taken in order to establish the event. At a time at which the IN point of the cut scene is later than the latest point of the event, the event is not established in the cut scene. That is, the event is not included in the cut scene in which the time later than the latest point of the event is the IN point.

The earliest point means an earliest time at which the OUT point (rearmost end) of the cut scene can be taken in order to establish the event in the cut scene. In other words, the earliest point means an earliest point in time in time order at which the OUT point of the cut scene can be taken in order to establish the event. At a time at which the OUT point of the cut scene is earlier than the earliest point of the event, the event is not established in the cut scene. That is, the event is not included in the cut scene in which the time earlier than the earliest point of the event is the OUT point.

FIG. 51 illustrates the latest point and the earliest point of each event of the Simple pattern, the Included pattern, the Overlap pattern, and the Order pattern.

In the Simple pattern including one piece of cutting metadata, an earliest time in a section in which the one piece of cutting metadata is present is the earliest point, and a latest time is the latest point.

The event of the Simple pattern is not included in the cut scene in which the time later than the latest point of the event of the Simple pattern is the IN point and the cut scene in which the time earlier than the earliest point of the event of the Simple pattern is the OUT point, and the event of the Simple pattern is not established in the cut scene.

In the Included pattern, the Overlap pattern, and the Order pattern including the plurality of pieces of cutting metadata, the latest time in the section in which the cutting metadata not present at the earliest time, among the plurality of pieces of cutting metadata, is present is the latest point.

Furthermore, among the plurality of pieces of cutting metadata constituting the Included pattern, the Overlap pattern, and the Order pattern, the earliest time in the section in which the cutting metadata is present from the latest time is the earliest point.

The event of the Included pattern is not included in the cut scene in which the time later than the latest point of the event of the Included pattern is the IN point and the cut scene in which the time earlier than the earliest point of the event of the Included pattern is the OUT point, and the event of the Included pattern is not established in the cut scene. The same applies to the events of the Overlap pattern and the Order pattern.

Figure 52:
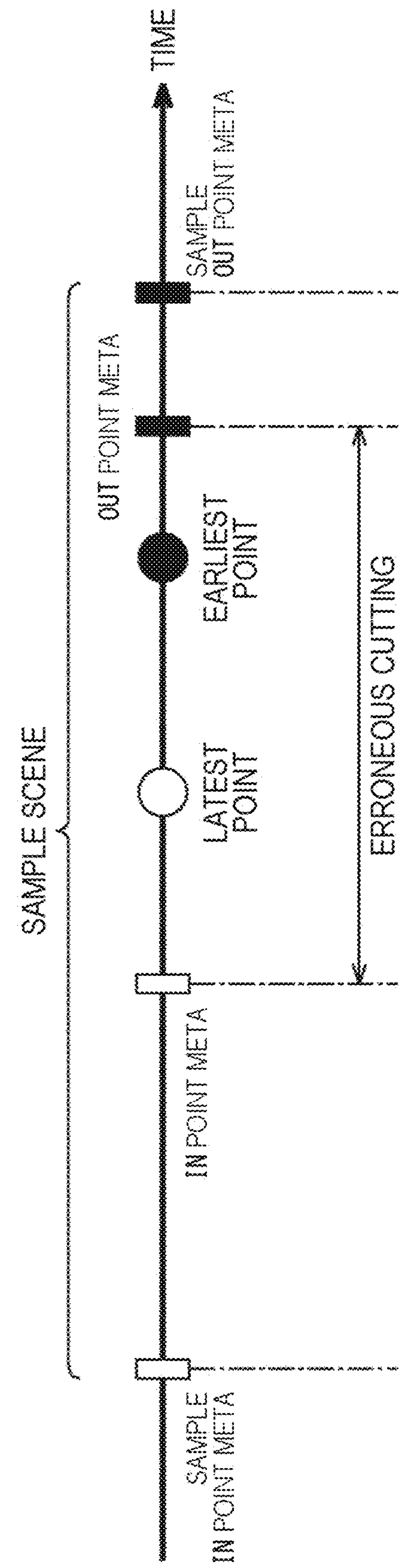
FIG. 52 is a diagram for describing a case where a scene shorter than the sample scene is erroneously cut.

FIG. 52 is a diagram for describing a case where the scene shorter than the sample scene is erroneously cut.

In order to simplify the description, it is assumed that the sample IN point metadata and sample OUT point metadata are present at the IN point and the OUT point of the sample scene, respectively.

In FIG. 52, the cutting metadata, the latest point, and the earliest point are illustrated on the timeline (time axis).

In FIG. 52, (the cutting metadata coinciding with) the IN point metadata is present at a position (frame) (time) after the sample IN point metadata and before the latest point. Moreover, (the cutting metadata coinciding with) the OUT point metadata is present at a position before the sample OUT point metadata and after the earliest point.

As described with reference to FIG. 50, in the cutting of the cut scene according to the cutting rule, the section is from the position where (the cutting metadata coinciding with) the IN point metadata is present to the position where (the cutting metadata coinciding with) the OUT point metadata is present, and is also the section where (the event coinciding with) the section event is present is cut as the cut scene.

Accordingly, in FIG. 52, instead of the sample scene, the section shorter than the sample scene, that is, the section from the position of the IN point metadata present at the position after the sample IN point metadata and before the latest point to the position of the OUT point metadata present at the position before the sample OUT point metadata and after the earliest point is cut (likely to be cut) as the cut scene.

In the cutting of the cut scene according to the cutting rule generated on the basis of the sample scene, since the sample scene is the desired scene, such a sample scene is appropriately cut as the cut scene.

On the other hand, as described above, it can be said that the cutting of the section shorter than the sample scene as the cut scene instead of the sample scene is the cutting of the erroneous (inappropriate) scene which is not the desired scene.

As illustrated in FIG. 52, in a case where IN point metadata is present at the position after the sample IN point metadata and before the latest point, or in a case where OUT point metadata is present at the position before the sample OUT point metadata and after the earliest point, it is likely to cut the erroneous scene that is shorter than the sample scene and is not the desired scene as described above.

Accordingly, the cutting rule generation unit 147 determines whether or not the event is the non-target event in which the erroneous cutting described above is performed on the basis of the latest point and the earliest point of the event, and excludes the event determined to be the non-target event from the detection target of the section event.

In the determination of the non-target event, the event in which the IN point metadata is present at a time before the latest point or the OUT point metadata is present after the earliest point in the section from the position of the sample IN point metadata to the position of the sample OUT point metadata is determined to be the non-target event.

Figure 53:
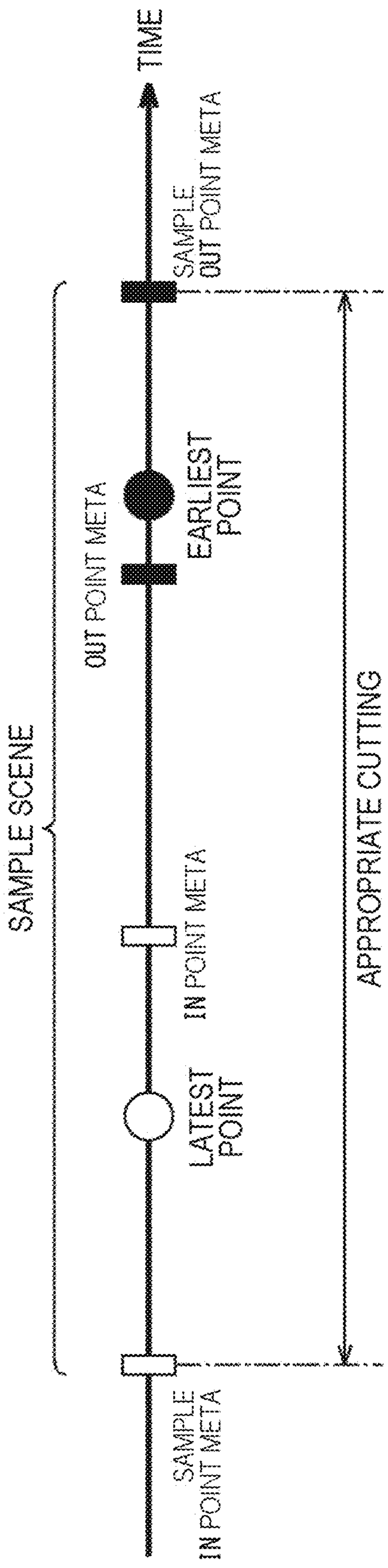
FIG. 53 is a diagram for describing a case where appropriate cutting is performed.

FIG. 53 is a diagram for describing a case where appropriate cutting is performed.

FIG. 53 illustrates a case where the sample scene is cut as the cut scene.

In FIG. 53, the cutting metadata, the latest point, and the earliest point are illustrated on the timeline.

In FIG. 53, (the cutting metadata coinciding with) the IN point metadata is present at the position after the sample IN point metadata and after the latest point, but the IN point metadata is not present at the position before the latest point.

Moreover, (the cutting metadata coinciding with) the OUT point metadata is present at the position before the sample OUT point metadata and before the earliest point, but the OUT point metadata is not present at the position after the earliest point.

In the cutting of the cut scene, the section is from the position where (the cutting metadata coinciding with) the IN point metadata is present to the position where (the cutting metadata coinciding with) the OUT point metadata is present and is also the section where (the event coinciding with) the section event is present is cut as the cut scene.

Accordingly, in the case of FIG. 53, the section from the position of the sample IN point metadata to the position of the sample OUT point metadata, that is, the sample scene is appropriately (correctly) cut as the cut scene.

Figure 54:
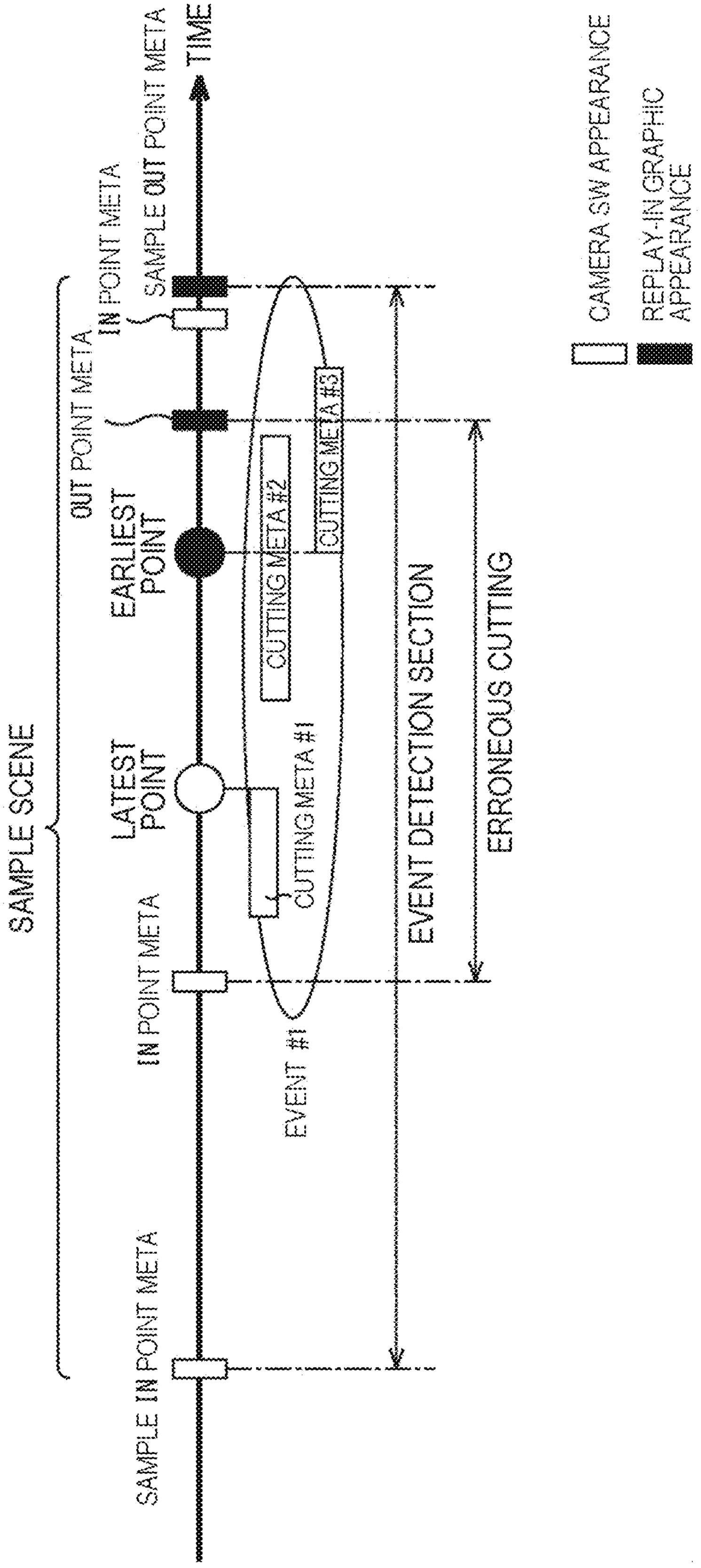
FIG. 54 is a diagram illustrating a first example of a case where the event is a non-target event.

FIG. 54 is a diagram illustrating a first example of a case where the event is the non-target event.

In FIG. 54, the cutting metadata, an event #1, and the latest point, and the earliest point of the event #1 are illustrated on the timeline.

In FIG. 54, the IN point metadata (sample IN point metadata) is the cutting metadata (Appear type) indicating the appearance of the camera SW. Moreover, the OUT point metadata (sample OUT point metadata) is the cutting metadata (Appear type) indicating the appearance of the replay-in graphic.

In FIG. 54, the event #1 is present in the event detection section from the position of the sample IN point metadata to the position of the sample OUT point metadata, which is equal to the sample scene.

The event #1 includes three pieces of cutting metadata #1 to #3.

The latest time in the section in which the cutting metadata #1 which is not present at the earliest time, among the three pieces of cutting metadata #1 to #3 constituting the event #1, is present is the latest point.

Furthermore, the earliest time in the section in which the cutting metadata #3 is present from the latest time, among the three pieces of cutting metadata #1 to #3 constituting the event #1, is the earliest point.

In FIG. 54, the IN point metadata is present at the position after the sample IN point metadata and before the latest point of the event #1. Moreover, the OUT point metadata is present at the position before the sample OUT point metadata and after the earliest point of the event #1.

Accordingly, the event #1 is determined to be the non-target event.

In a case where the event #1 which is the non-target event is detected as the section event and is adopted in the cutting rule, in the cutting of the cut scene, the erroneous cutting of cutting the section, which is shorter than the sample scene in which the event #1 is present and is from the position of the IN point metadata present at the position before the latest point of the event #1 after the sample IN point metadata to the position of the OUT point metadata present at the position after the earliest point of the event #1 before the sample OUT point metadata, is performed.

Figure 55:
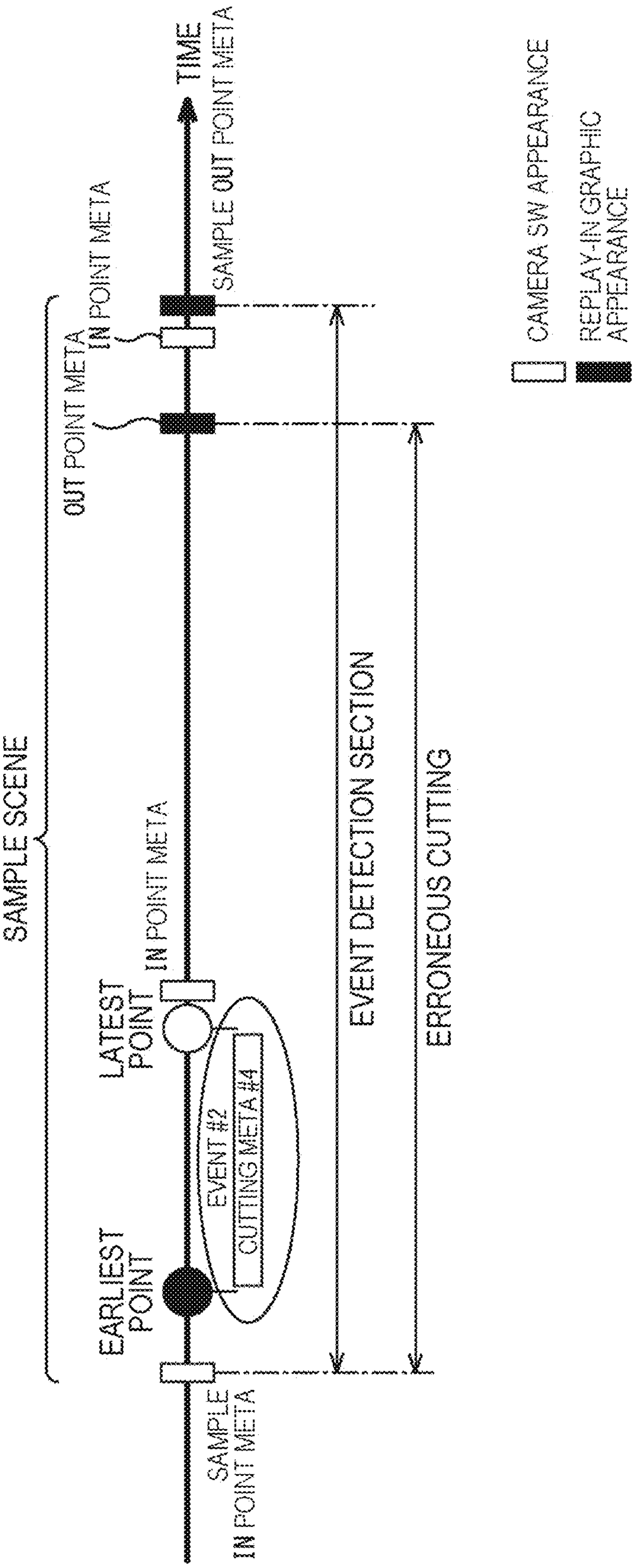
FIG. 55 is a diagram illustrating a second example of a case where the event is the non-target event.

FIG. 55 is a diagram illustrating a second example in a case where the event is the non-target event.

In FIG. 55, the cutting metadata, an event #2, and the latest point and the earliest point of the event #2 are illustrated on the timeline.

In FIG. 55, similarly to FIG. 54, the IN point metadata is the cutting metadata indicating the appearance of the camera SW, and the OUT point metadata is the cutting metadata indicating the appearance of the replay-in graphic.

In FIG. 55, the event #2 is present in the event detection section from the position of the sample IN point metadata to the position of the sample OUT point metadata, which is equal to the sample scene.

The event #2 includes one piece of cutting metadata #4.

The latest time in the section in which one piece of cutting metadata #4 constituting the event #2 is present is the latest point.

Furthermore, the earliest time in the section in which one piece of cutting metadata #4 constituting the event #2 is present is the earliest point.

In FIG. 55, the IN point metadata is present at the position after the sample IN point metadata and after the latest point of the event #2, but the IN point metadata is not present at the position before the latest point of the event #1.

However, the OUT point metadata is present at the position before the sample OUT point metadata and after the earliest point of the event #2.

Accordingly, since the OUT point metadata is present at the position before the sample OUT point metadata and after the earliest point of the event #2, the event #2 is determined to be the non-target event.

In a case where the event #2 which is the non-target event is detected as the section event and is adopted in the cutting rule, in the cutting of the cut scene, the erroneous cutting of cutting the section, which is shorter than the sample scene in which the event #2 is present and is from the position of the sample IN point metadata to the position of the OUT point metadata present at the position before the sample OUT point metadata and after the earliest point of the event #1, is performed.

Figure 56:
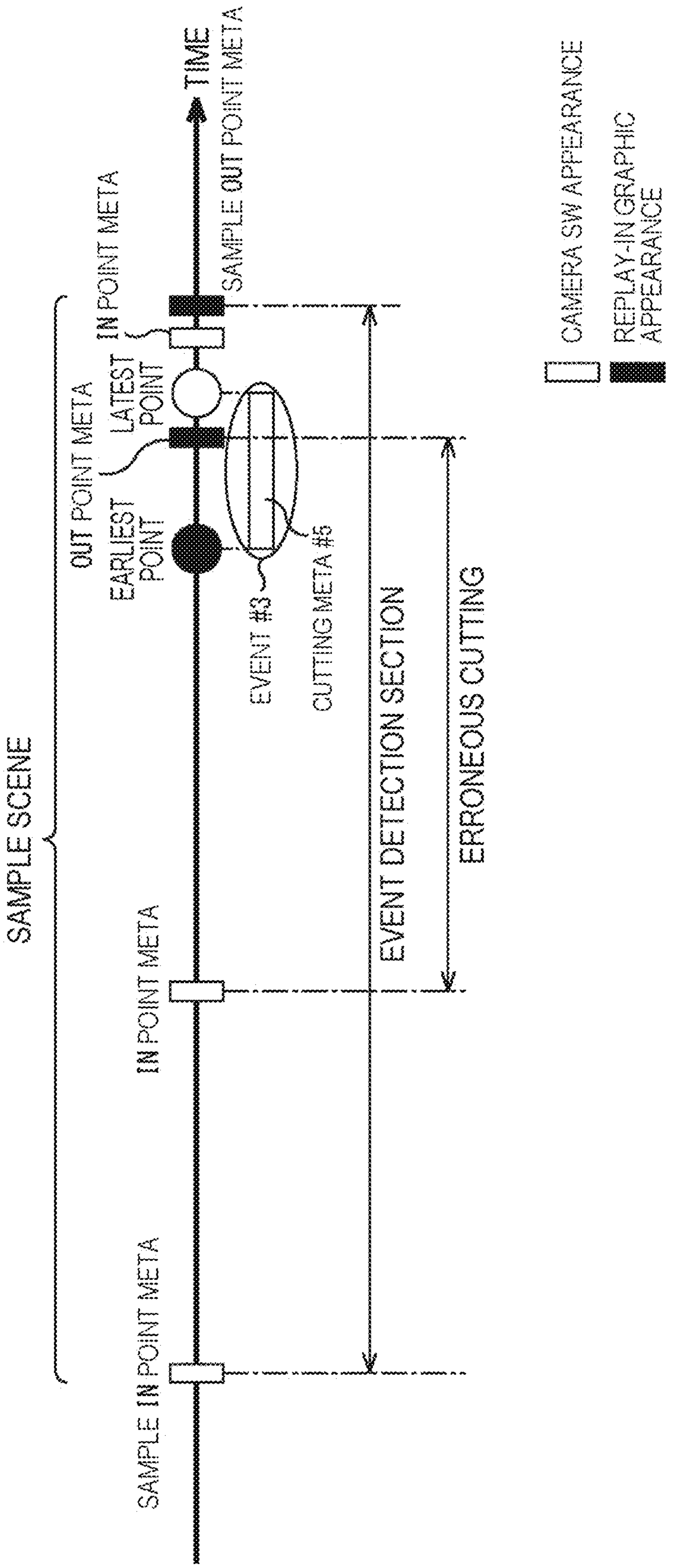
FIG. 56 is a diagram illustrating a third example in a case where the event is the non-target event.

FIG. 56 is a diagram illustrating a third example in a case where the event is the non-target event.

In FIG. 56, the cutting metadata, an event #3, and the latest point and the earliest point of the event #3 are illustrated on the timeline.

In FIG. 56, similarly to FIG. 54, the IN point metadata is the cutting metadata indicating the appearance of the camera SW, and the OUT point metadata is the cutting metadata indicating the appearance of the replay-in graphic.

In FIG. 56, the event #3 is present in the event detection section from the position of the sample IN point metadata to the position of the sample OUT point metadata, which is equal to the sample scene.

The event #3 includes one piece of cutting metadata #5.

The latest time in the section in which one piece of cutting metadata #5 constituting the event #3 is present is the latest point.

Furthermore, the earliest time in the section in which one piece of cutting metadata #5 constituting the event #3 is present is the earliest point.

In FIG. 56, the IN point metadata is present at the position after the sample IN point metadata and before the latest point of the event #3.

Moreover, the OUT point metadata is present at the position before the sample OUT point metadata and after the earliest point of the event #3.

Accordingly, the event #3 is determined to be the non-target event.

In a case where the event #3 which is the non-target event is detected as the section event and is adopted in the cutting rule, in the cutting of the cut scene, the erroneous cutting of cutting the section, which is shorter than the sample scene in which the event #3 is present and is from the position of the IN point metadata present at the position after the sample IN point metadata and before the latest point of the event #3 to the position of the OUT point metadata before the sample OUT point metadata and after the earliest point of the event #3 is performed.

Figure 57:
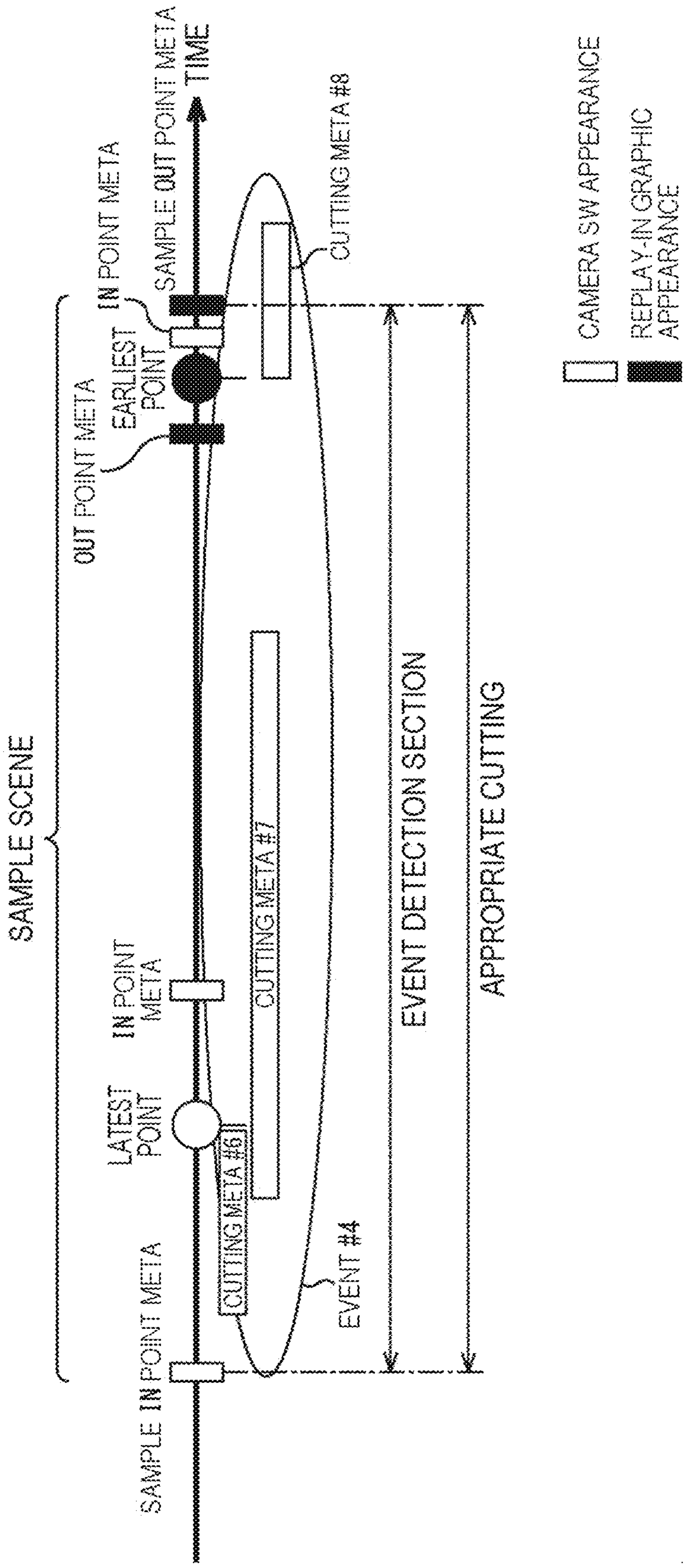
FIG. 57 is a diagram illustrating an example of a case where the event is not the non-target event.

FIG. 57 is a diagram illustrating an example of a case where the event is not the non-target event.

In FIG. 57, the cutting metadata, an event #4, and the latest point and the earliest point of the event #4 are illustrated on the timeline.

In FIG. 57, similarly to FIG. 54, the IN point metadata is the cutting metadata indicating the appearance of the camera SW, and the OUT point metadata is the cutting metadata indicating the appearance of the replay-in graphic.

In FIG. 57, the event #4 is present in the event detection section from the position of the sample IN point metadata to the position of the sample OUT point metadata, which is equal to the sample scene.

The event #4 includes three pieces of cutting metadata #6 to #8.

The latest time in the section in which the cutting metadata #6 which is not present at the earliest time, among the three pieces of cutting metadata #6 to #8 constituting the event #4, is present is the latest point.

Furthermore, the earliest point is the earliest time in the section in which the cutting metadata #8 present from the latest time is present, among the three pieces of cutting metadata #6 to #8 constituting the event #4.

In FIG. 57, the IN point metadata is present at the position after the sample IN point metadata and after the latest point of the event #4, but the IN point metadata is not present at the position before the latest point.

Moreover, the OUT point metadata is present at the position before the sample OUT point metadata and before the earliest point of the event #4, but the OUT point metadata is not present at the position after the earliest point.

As described above, in the event detection section, since the IN point metadata is not present at the position before the latest point and the OUT point metadata is not present at the position after the earliest point, the event #4 is determined not to be the non-target event.

The event #4 which is not the non-target event is detected as the section event and is adopted in the cutting rule, and thus, in the cutting of the cut scene, the section from the position of the sample IN point metadata to the position of the sample OUT point metadata, that is, the appropriate cutting in which the sample scene is cut is performed.

<Cutting of Cut Scene According to Cutting Rule>

Figure 58:
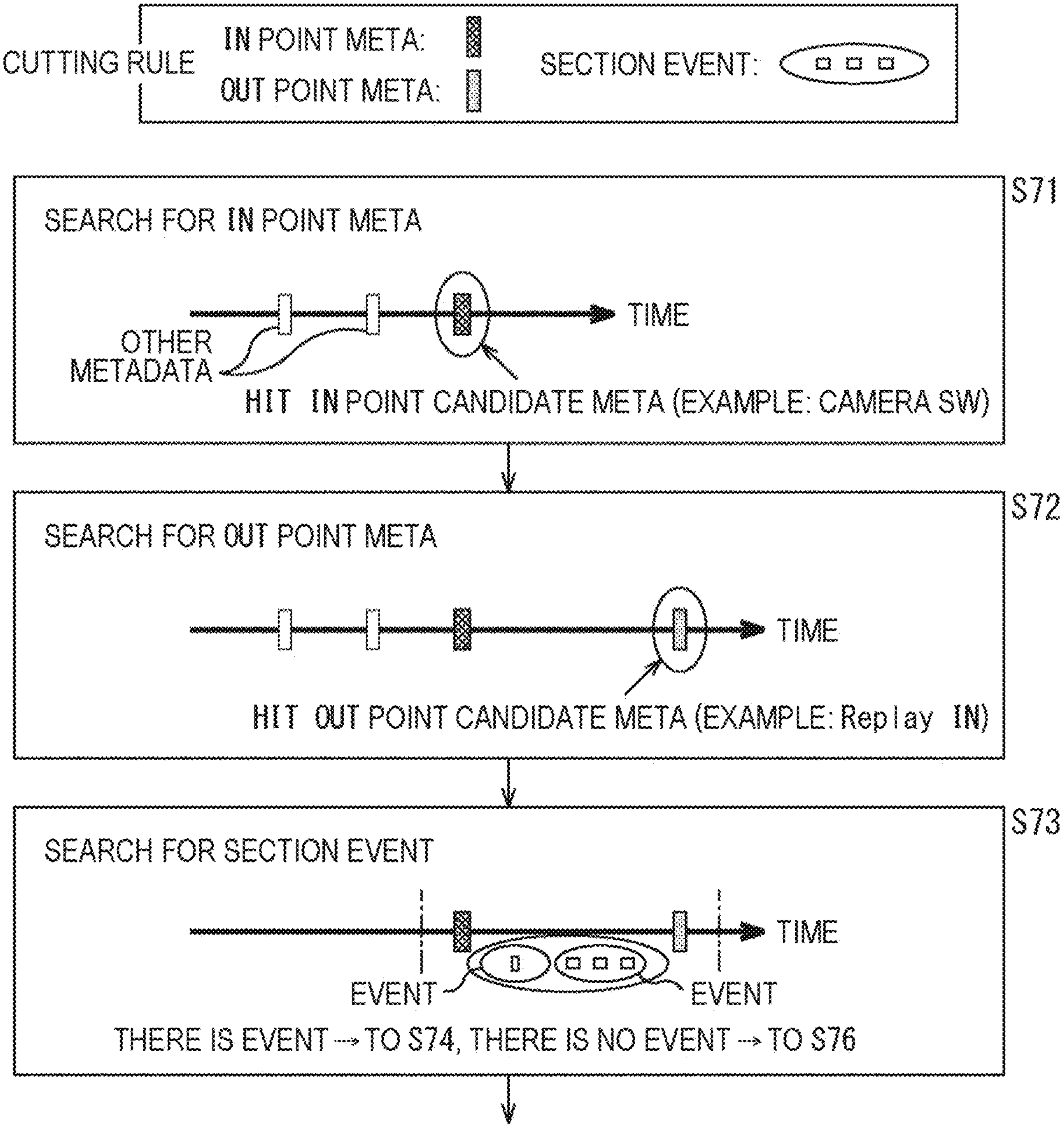
FIG. 58 is a flowchart for describing a first example of processing of cutting the cut scene according to the cutting rule performed by a rule engine 130.
Figure 59:
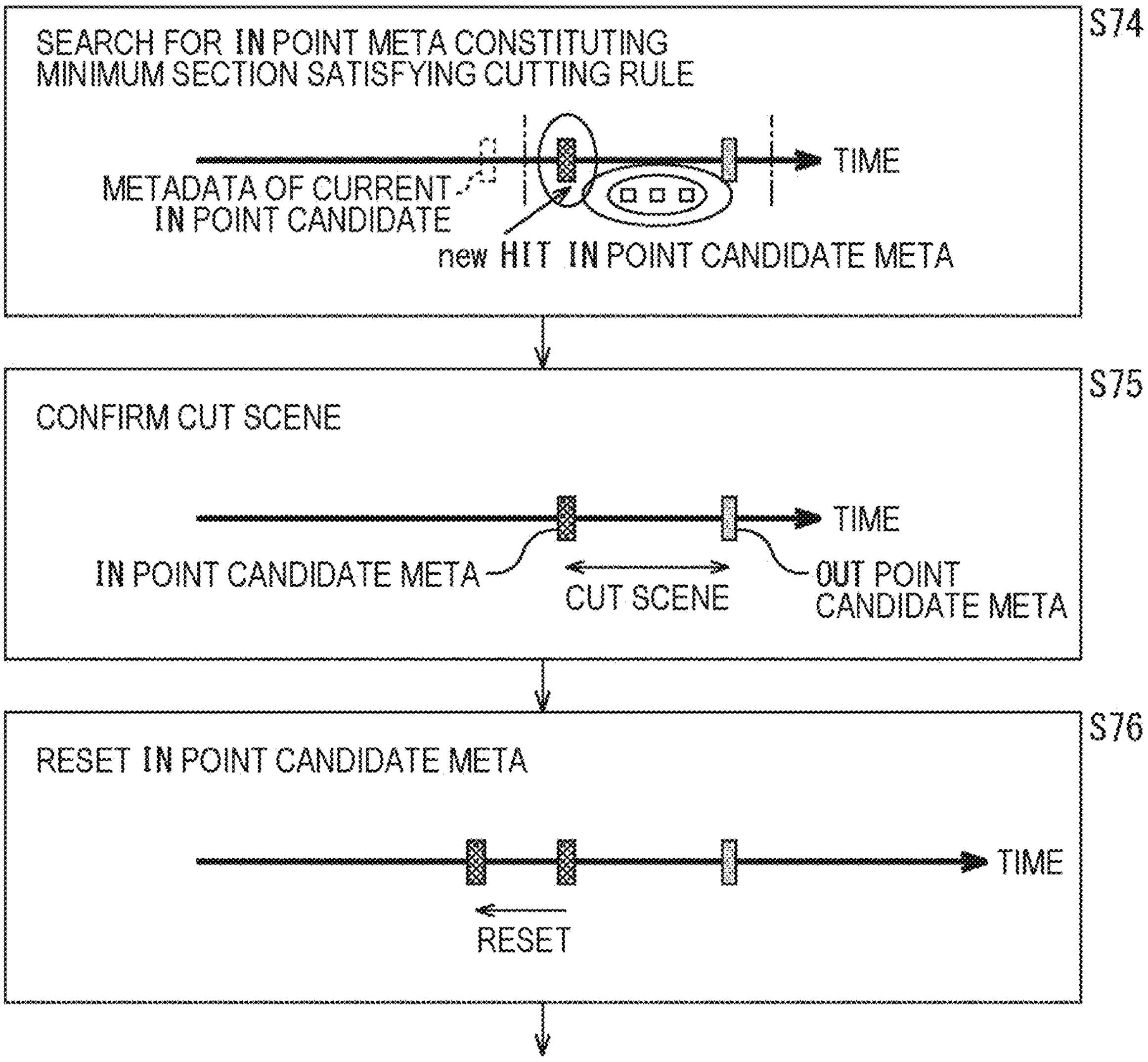
FIG. 59 is a flowchart for describing a first example of the processing of cutting the cut scene according to the cutting rule performed by the rule engine 130.

FIG. 58 is a flowchart for describing a first example of processing of cutting the cut scene according to a cutting rule performed by the rule engine 130. FIG. 59 is a flowchart subsequent to FIG. 58.

In step S71, the rule engine 130 searches for (the cutting metadata coinciding with) the IN point metadata of the cutting rule from the cutting metadata present in the target content from the head to the last of the target content.

The cutting metadata to become a searching target for the IN point metadata of the cutting rule is only the Appear type and the Change type.

When the first cutting metadata (the Appear type or the Change type) coinciding with the IN point metadata of the cutting rule is detected from the cutting metadata present in the target content, the rule engine 130 sets the cutting metadata as the metadata of the IN point candidate, and the processing proceeds from step S71 to step S72.

In FIG. 58, for example, the Appear type indicating the appearance of the camera SW is detected as the metadata of the IN point candidate.

In step S72, the rule engine 130 searches for (the cutting metadata coinciding with) the OUT point metadata of the cutting rule from the cutting metadata present in the target content from the position of the metadata of the IN point candidate of the target content toward the last.

The cutting metadata to become the searching target for the OUT point metadata of the cutting rule is only the Appear type and the Change type.

When the first cutting metadata (the Appear type or the Change type) coinciding with the OUT point metadata of the cutting rule is detected from the cutting metadata present in the target content, the rule engine 130 sets the cutting metadata as the metadata of the OUT point candidate, and the processing proceeds from step S72 to step S73.

In FIG. 58, for example, the Appear type indicating the appearance of the replay-in graphic is detected as the metadata of the OUT point candidate.

In step S73, the rule engine 130 searches for (the event coinciding with) the section event of the cutting rule from the section from the position of the metadata of the IN point candidate to the position of the metadata of the OUT point candidate of the target content.

In a case where the event coinciding with the section event is not detected in step S73, the processing proceeds to step S76 of FIG. 59.

Furthermore, in step S73, in a case where the event coinciding with the section event is detected, the processing proceeds to step S74 of FIG. 59.

In step S74 of FIG. 59, the rule engine 130 searches for a minimum section satisfying the cutting rule and setting a position of metadata of a current OUT point candidate as an end point by searching for (cutting metadata coinciding with) IN point metadata from a position of metadata of a current IN point candidate of the target content toward the last.

That is, the rule engine 130 searches for (the cutting metadata coinciding with) the IN point metadata of the cutting rule different from the IN point metadata of the cutting rule detected in step S71 from the cutting metadata present in the target content from the position of the metadata of the current IN point candidate of the target content toward the last.

When the first cutting metadata coinciding with the IN point metadata of the cutting rule is detected from the cutting metadata present in the target content, the rule engine 130 newly sets (updates) the cutting metadata as the metadata of the current IN point candidate. Then, the rule engine 130 searches for (the event coinciding with) the section event of the cutting rule from a section from a position of the updated metadata of the current IN point candidate to the position of the metadata of the OUT point candidate of the target content.

The rule engine 130 repeatedly searches for the IN point metadata of the cutting rule and searches for the section event until the position of the metadata of the OUT point candidate is reached in searching for the IN point metadata of the cutting rule or the event coinciding with the section event is not detected in searching for the section event of the cutting rule.

In a case where the position of the metadata of the OUT point candidate is reached in searching for the IN point metadata of the cutting rule in step S74, the rule engine 130 sets the section from the position of the metadata of the current IN point candidate to the position of the metadata of the current OUT point candidate, as the minimum section satisfying the cutting rule, and the processing proceeds from step S74 to step S75.

Furthermore, in a case where the event coinciding with the section event is not detected in searching for the section event of the cutting rule in step S74, the rule engine 130 newly sets (updates) metadata of a previous IN point candidate of the metadata of the current IN point candidate as the metadata of the current IN point candidate. Then, the rule engine 130 sets a section from a position of the updated metadata of the current IN point candidate to the position of the metadata of the current OUT point candidate as the minimum section satisfying the cutting rule, and the processing proceeds from step S74 to step S75.

In step S75, the rule engine 130 confirms the minimum section satisfying the cutting rule as the cut scene, and the processing proceeds to step S76.

That is, in step S75, the rule engine 130 confirms, as the IN point and the OUT point of the cut scene, the position of the metadata of the current IN point candidate and the position of the metadata of the current OUT point candidate.

In step S76, the rule engine 130 resets the metadata of the IN point candidate to the cutting metadata detected in previous step S71, and the processing returns to step S72.

In step S72 performed immediately after the metadata of the IN point candidate is reset, the OUT point metadata of the cutting rule is searched for not from the position of the metadata of the IN point candidate but from the position of the metadata of the current OUT point candidate toward the last of the target content.

Then, when the first cutting metadata coinciding with the OUT point metadata of the cutting rule is detected, the cutting metadata is newly set (updated) as the metadata of the current OUT point candidate, and similar processing is repeated.

In a case where the last of the target content is reached in searching for the OUT point metadata of the cutting rule in step S72 performed immediately after the metadata of the IN point candidate is reset, the processing returns from step S72 to step S71.

Furthermore, in a case where the section from the position of the metadata of the IN point candidate after the reset to the position of the metadata of the OUT point candidate detected in searching for the OUT point metadata of the cutting rule in step S72 performed immediately after the reset is, for example, more than or equal to a predetermined length assumed to be too long as the desired scene, the processing returns from step S72 to step S71.

In step S71 performed after returning from step S72, the IN point metadata of the cutting rule is searched for not from the head of the target content but from the position of the metadata of the current IN point candidate toward the last of the target content.

Then, when the first cutting metadata coinciding with the IN point metadata of the cutting rule is detected, the cutting metadata is newly set (updated) as the metadata of the current IN point candidate, and the processing of step S72 and subsequent steps is repeated.

In a case where the last of the target content is reached in searching for the IN point metadata of the cutting rule in step S71, the processing of cutting the cut scene from the target content is ended.

Figure 60:
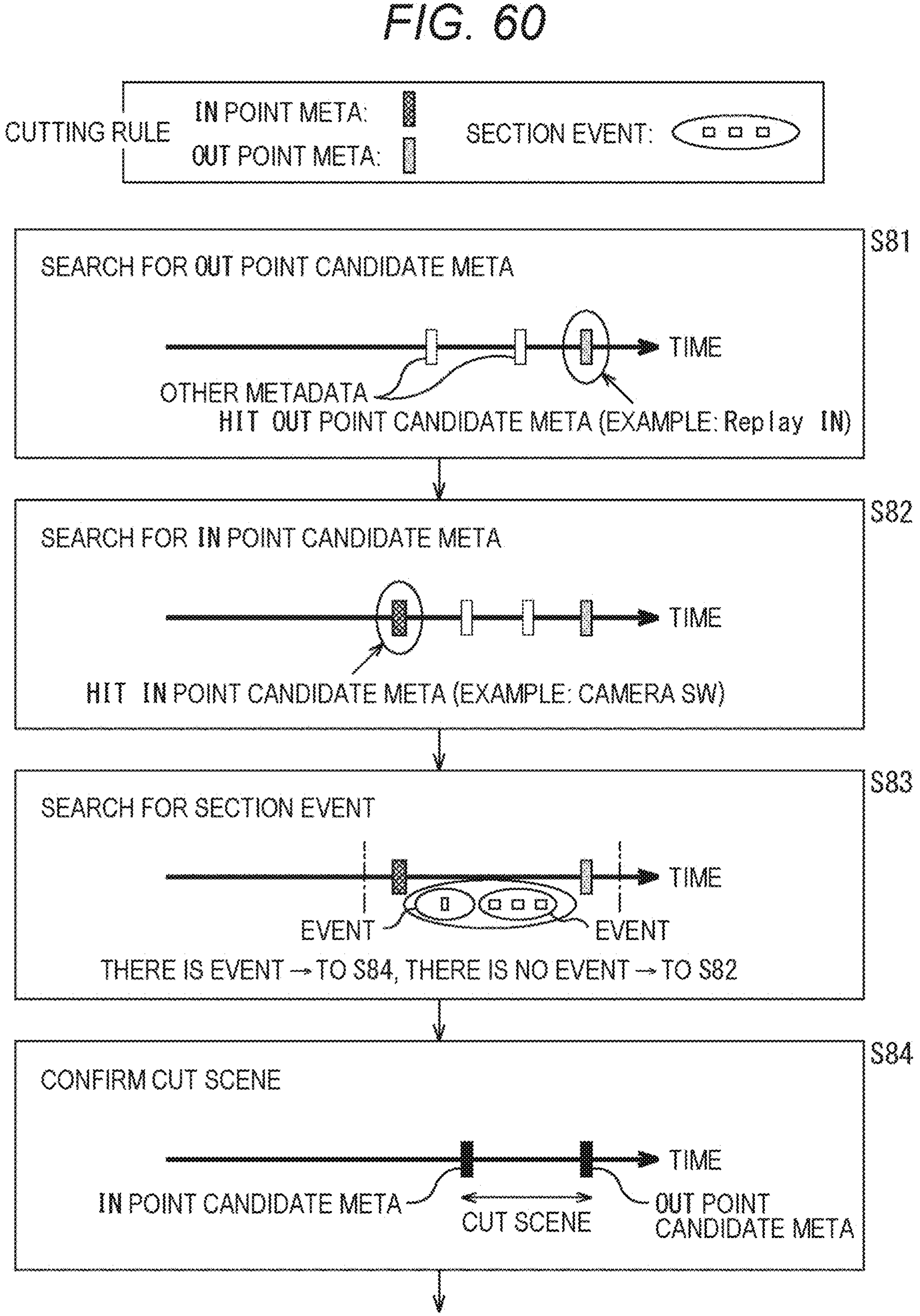
FIG. 60 is a flowchart for describing a second example of the processing of cutting the cut scene according to the cutting rule performed by the rule engine 130.

FIG. 60 is a flowchart for describing a second example of the processing of cutting the cut scene according to the cutting rule performed by the rule engine 130.

In step S81, the rule engine 130 searches for (the cutting metadata coinciding with) the OUT point metadata of the cutting rule from the cutting metadata present in the target content from the head to the last of the target content.

When the first cutting metadata (the Appear type or the Change type) coinciding with the OUT point metadata of the cutting rule is detected from the cutting metadata present in the target content, the rule engine 130 sets the cutting metadata as the metadata of the OUT point candidate, and the processing proceeds from step S81 to step S82.

In FIG. 60, for example, the Appear type indicating the appearance of the replay-in graphic is detected as the metadata of the OUT point candidate.

In step S82, the rule engine 130 searches for (the cutting metadata coinciding with) the IN point metadata of the cutting rule from the cutting metadata present in the target content (backward) from the position of the metadata of the OUT point candidate of the target content toward the head.

When the first cutting metadata (the Appear type or the Change type) coinciding with the IN point metadata of the cutting rule is detected from the cutting metadata present in the target content, the rule engine 130 sets the cutting metadata as the metadata of the IN point candidate, and the processing proceeds from step S82 to step S83.

In FIG. 60, for example, the Appear type indicating the appearance of the camera SW is detected as the metadata of the IN point candidate.

In step S83, the rule engine 130 searches for (the event coinciding with) the section event of the cutting rule from the section from the position of the metadata of the IN point candidate to the position of the metadata of the OUT point candidate of the target content.

In a case where the event coinciding with the section event is detected in step S83, the processing proceeds to step S84.

In step S84, the rule engine 130 confirms, as the cut scene, the section from the position of the metadata of the current IN point candidate to the position of the metadata of the current OUT point candidate, and the processing returns to step S81.

That is, in step S84, the position of the metadata of the current IN point candidate and the position of the metadata of the current OUT point candidate are confirmed as the IN point and the OUT point of the cut scene, respectively.

On the other hand, in a case where the event coinciding with the section event is not detected in step S83, the processing returns to step S82.

In step S82 returned from step S83, the rule engine 130 searches for the IN point metadata of the cutting rule from the cutting metadata present in the target content from the position of the metadata of the current IN point candidate to the head instead of the position of the metadata of the OUT point candidate of the target content.

Then, when the first cutting metadata (the cutting metadata at a closest point in time to the metadata of the current IN point candidate among the pieces of cutting metadata in time order before the metadata of the current IN point candidate) coinciding with the IN point metadata of the cutting rule is detected from the cutting metadata present in the target content, the cutting metadata is newly set (updated) as the metadata of the current IN point candidate, and the processing of steps S83 to S84 is similarly repeated.

On the other hand, in a case where the head of the target content or the OUT point of the previously confirmed cut scene is reached in searching for the IN point metadata of the cutting rule in step S82, the processing returns to step S81.

In step S81 returned from step S82 or step S84, the rule engine 130 searches for the OUT point metadata of the cutting rule from the cutting metadata present in the target content from the position of the metadata of the current OUT point candidate to the last instead of the head of the target content.

Then, when the first cutting metadata coinciding with the OUT point metadata of the cutting rule is detected from the cutting metadata present in the target content, the cutting metadata is newly set (updated) as the metadata of the current OUT point candidate, and the processing of step S82 and subsequent steps is similarly repeated.

On the other hand, in a case where the last of the target content is reached in searching for the OUT point metadata of the cutting rule in step S81, the processing of cutting the cut scene from the target content is ended.

<Selection of Recognition Engine Based on State of Operation of User>

Figure 61:
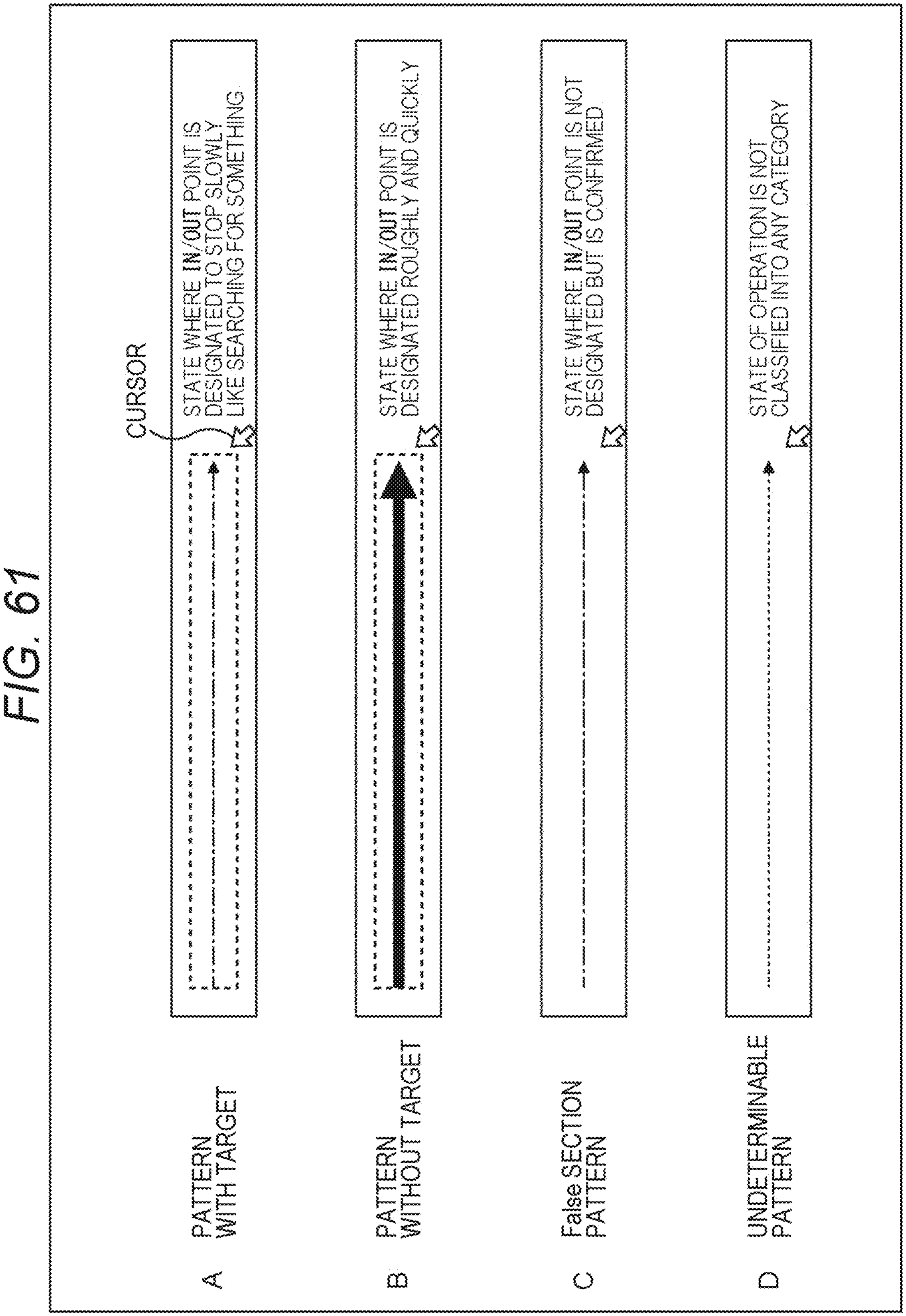
FIG. 61 is a diagram illustrating an example of a pattern of a state of an operation of a terminal 10 by a user.

FIG. 61 is a diagram illustrating an example of a pattern of the state of the operation of the terminal 10 by the user.

As described with reference to FIG. 11, the operation history analysis unit 142 generates operation state information indicating the state of the operation of the user on the terminal 10 when the IN point and the OUT point of the sample scene are designated on the basis of the operation history which is a time series of the operation information from the operation information acquisition unit 141.

Then, the recognition engine selection unit 143 selects the selection engine as a recognition engine to be used for the recognition processing on the target content as the processing target from among the plurality of recognition engines (recognition units) as the non-general-purpose recognition engine 122 on the basis of the operation state information.

In the recognition engine selection unit 143, a recognition engine that performs recognition processing appropriate for the cutting of the cut scene based on the sample scene is selected as the selection engine, with the state of the operation of the user on the terminal 10 when the IN point and the OUT point of the sample scene indicated by the operation state information are designated as a hint.

The operation history analysis unit 142 generates, for example, the operation state information indicating the state of the operation of any pattern of four patterns on the basis of the operation history when the IN point and the OUT point of the sample scene are designated.

FIG. 61 illustrates an example of four patterns of the state of the operation indicated by the operation state information.

Examples of the four patterns of the state of the operation include a pattern with a target (first pattern), a pattern without a target (second pattern), a False section pattern, and an undeterminable pattern.

A of FIG. 61 illustrates the pattern with a target.

A state of an operation of the pattern with a target is a state where the IN point or the OUT point of the sample scene is designated to stop slowly.

For example, in a case where an operation such as dragging and dropping when the IN point or the OUT point of the sample scene is designated is performed to stop slowly like searching for something, an intention of the user to designate, as the IN point or the OUT point of the sample scene, a position (hereinafter, also referred to as a clear point) where a change in the scene is clear, such as a position (frame) where the camera SW is performed or a position where the replay-in graphic appears is estimated.

Accordingly, in a case where the operation state information indicates the state of the pattern with a target, the recognition engine selection unit 143 can select, as the selection engine in preference to other recognition engines, one or both of the camera SW recognition engine suitable for the recognition of the camera SW and the graphic recognition engine suitable for the recognition of the replay-in graphic.

B of FIG. 61 illustrates the pattern without a pattern.

A state of an operation of the pattern without a target is a state where the IN point or the OUT point of the sample scene is quickly designated.

For example, in a case where an operation such as dragging and dropping when the IN point or the OUT point of the sample scene is designated is roughly and quickly performed, an intention of the user to designate, for example, an exciting scene or the like as the sample scene is estimated depending on the overall atmosphere of the scene instead of the clear point.

Accordingly, in a case where the operation state information indicates the state of the pattern without a target, the recognition engine selection unit 143 can select, as the selection engine in preference to other recognition engines, the excitement recognition engine suitable for the recognition of the excitement.

C of FIG. 61 illustrates the False section pattern.

A state of an operation of the False section pattern is a state where the IN point and the OUT point of the sample scene are not designated, and the point position on the timeline is roughly moved.

In a case where the IN point and the OUT point of the sample scene are not designated and the point position on the timeline is roughly moved, the scene is roughly confirmed, but the intention of the user that the scene is not the desired scene is estimated.

In a case where the operation state information indicates the state of the False section pattern, since (the IN point and the OUT point of) the sample scene are not designated, the operation state information indicating the state of the False section pattern is not used to select the selection engine in the present embodiment.

Furthermore, in a case where the operation of the state of the False section pattern is performed, it is estimated that the desired scene of the user is not present in the section (hereinafter, also referred to as a False section) of the target content in which such an operation of the state is performed.

Accordingly, the operation state information indicating the state of the False section pattern can be used, for example, in processing of reducing a priority of cutting a scene of the False section or a scene similar to the False section as the cut scene in the cutting of the cut scene.

D of FIG. 61 illustrates the undeterminable pattern.

In a state of an operation of the undeterminable pattern, the IN point and the OUT point of the sample scene are designated, but the state of the operation when the IN point and the OUT point are designated does not correspond to both the state of the pattern with a target or the state of the pattern without a target.

In a case where the operation state information indicates the state of the undeterminable pattern, the recognition engine selection unit 143 can select the selection engine on the basis of the operation (operation information) of the user designating the selection engine or according to the selection rule determined in advance as described with reference to FIG. 11.

In a case where the selection engine is selected on the basis of the operation of the user designating the selection engine, a GUI of a list of recognition engines selectable as the selection engine is displayed on the terminal 10, and the recognition engine to be set as the selection engine can be designated by the user from the GUI.

Figure 62:
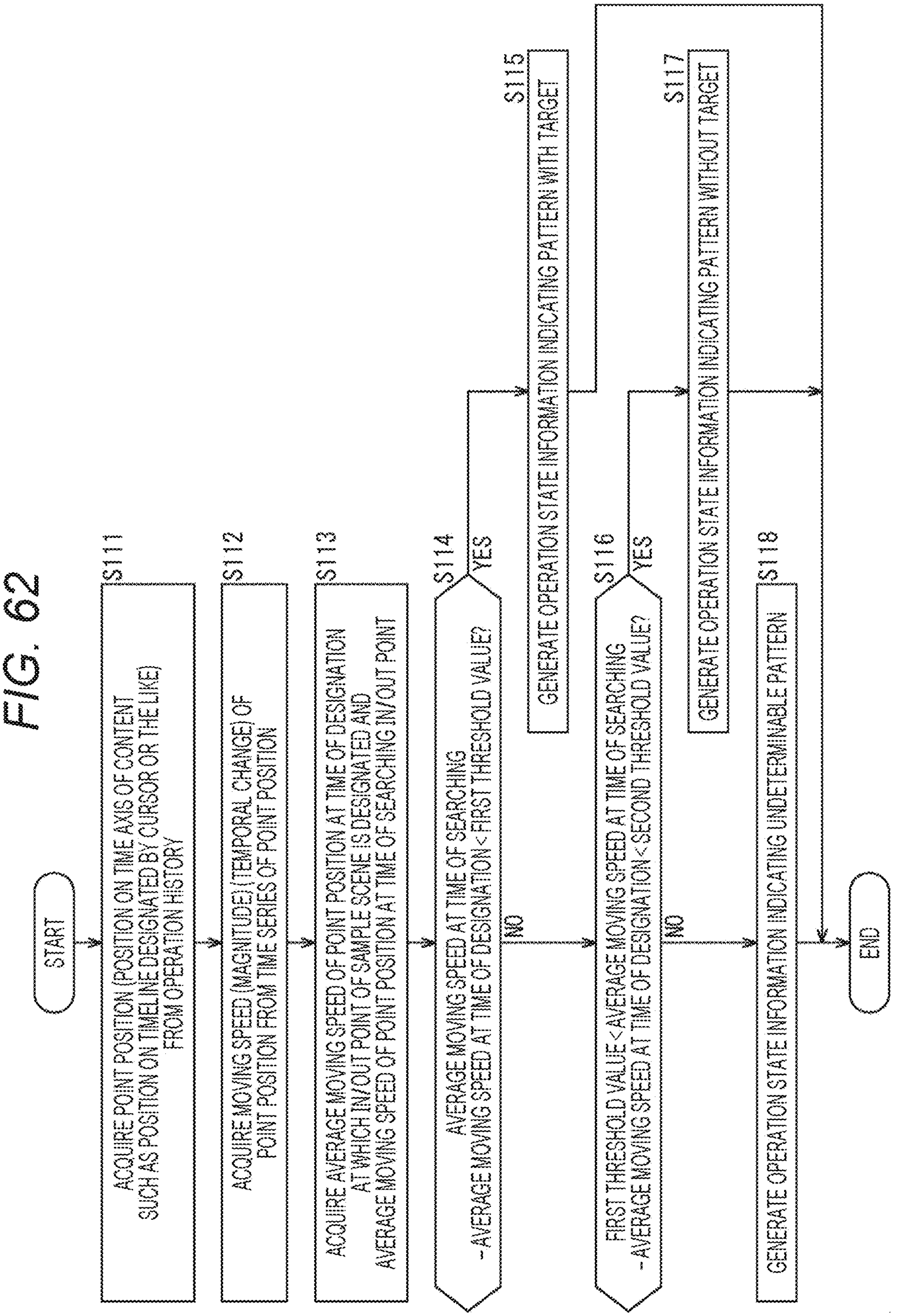
FIG. 62 is a flowchart for describing a first example of processing of generating operation state information by an operation history analysis unit 142.

FIG. 62 is a flowchart for describing a first example of processing of generating the operation state information by the operation history analysis unit 142.

In FIG. 62, the operation history is analyzed on a predetermined rule basis determined in advance, and the operation state information is generated.

For example, in FIG. 62, the operation history analysis unit 142 generates the operation state information on the basis of (magnitude of) a moving speed of the point position by a cursor, a slider, or the like on the timeline displayed on the terminal 10 operated by the user.

In step S111, the operation history analysis unit 142 acquires the point position from the operation history, and the processing proceeds to step S112.

In step S112, the operation history analysis unit 142 acquires the moving speed (temporal change) of the point position from the time series of the point position, and the processing proceeds to step S113.

In step S113 and subsequent steps, the operation history analysis unit 142 generates the operation state information on the basis of a magnitude relationship between the magnitude of the moving speed of the point position at the time of searching at which the IN point or the OUT point of the sample scene is searched for and the magnitude of the moving speed of the point position at the time of designation at which the IN point or the OUT point of the sample scene is designated.

That is, in step S113, the operation history analysis unit 142 acquires, on the basis of the moving speed of the point position, an average moving speed of the point position at the time of designation at which the IN point and the OUT point of the sample scene are designated and an average moving speed of the point position at the time of searching for the IN point and the OUT point, and the processing proceeds to step S114.

Here, in the generation of the operation state information, the time of designation at which the IN point of the sample scene is designated means a period of time from a predetermined period of time before a timing when the operation to designate the IN point is performed to a timing when the operation to designate the IN point is performed. The same applies the time of designation at which the OUT point of the sample scene is designated.

Furthermore, the time of searching for the IN point of the sample scene means a period of time from a timing when the point position starts to move from a stop state where the point position is stopped for a certain period of time or more to a timing when the operation to designate the IN point is performed.

The time of searching for the OUT point of the sample scene means a period of time from a timing when the operation to designate the previous IN point is performed to a timing when the operation to designate the OUT point is performed.

In a case where the IN point is designated after the OUT point is designated for the sample scene, a period of time from a timing when the point position starts to move from the stop state where the point position is stopped for a certain period of time or more to a timing when the operation to designate the OUT point is performed is the time of searching for the OUT point of the sample scene. Then, a period of time from a timing when the operation to designate the previous OUT point is performed to a timing when the operation to designate the IN point is performed is the time of searching for the IN point of the sample scene.

Note that, here, in order to simplify the description, the times of designation of the IN point and the OUT point of the sample scene are collectively handled as the time of designation of the IN point and the OUT point, and the times of searching for the IN point and the OUT point of the sample scene are collectively handled as the time of searching for the IN point and the OUT point, and one piece of operation state information is generated for the IN point and the OUT point of the sample scene.

However, it is also possible to generate one piece of operation state information for each of the IN point and the OUT point of the sample scene by separately handling the times of designation of the IN point and the OUT point of the sample scene and separately handling the times of searching for the IN point and the OUT point of the sample scene.

The same applies to other examples of the processing of generating the operation state information as described later.

In step S114, the operation history analysis unit 142 determines whether or not a difference (A−B) between magnitude (A) of the average moving speed of the point position at the time of searching and magnitude (B) of the average moving speed of the point position at the time of designation is less than (less than or equal to) a first threshold value of the moving speed.

In a case where it is determined in step S114 that a difference between the magnitude of the average moving speed of the point position at the time of searching and the magnitude of the average moving speed of the point position at the time of designation is less than the first threshold value, the processing proceeds to step S115.

In step S115, the operation history analysis unit 142 generates the operation state information indicating the pattern with a target (first pattern), and the processing is ended.

For example, in a case where the user searches for the clear point in order to designate the clear point as the IN point or the OUT point of the sample scene, the state of the searching slowly stops like the state of the pattern with a target. Accordingly, it is estimated that the moving speed at the time of searching for the IN point or the OUT point of the sample scene is delayed to such an extent that the moving speed is not much different from the moving speed when the IN point or the OUT point is designated.

Therefore, in a case where the difference between the magnitude of the average moving speed of the point position at the time of searching and the magnitude of the average moving speed of the point position at the time of designation is less than the first threshold value, the operation state information indicating the pattern with a target is generated.

On the other hand, in a case where it is determined in step S114 that the difference between the magnitude of the average moving speed of the point position at the time of searching and the magnitude of the average moving speed of the point position at the time of designation is not less than the first threshold value, the processing proceeds to step S116.

In step S116, the operation history analysis unit 142 determines whether the difference (A−B) between the magnitude (A) of the average moving speed of the point position at the time of searching and the magnitude (B) of the average moving speed of the point position at the time of designation is more than or equal to the first threshold value of the moving speed (more than the first threshold value) and is less than (less than or equal to) a second threshold value of the moving speed.

In a case where it is determined in step S116 that the difference between the magnitude of the average moving speed of the point position at the time of searching and the magnitude of the average moving speed of the point position at the time of designation is more than or equal to the first threshold value and is less than the second threshold value, the processing proceeds to step S117.

In step S117, the operation history analysis unit 142 generates the operation state information indicating the pattern without a target (second pattern), and the processing is ended.

In a case where the user searches for, for example, the exciting scene or the like while observing only the atmosphere of the scene instead of the clear point, the state of the searching is quickly and roughly like the state of the pattern without a target. Accordingly, it is estimated that the moving speed when the IN point or the OUT point of the sample scene is searched for is faster to some extent than the moving speed when the IN point or the OUT point is designated.

Therefore, in a case where the difference between the magnitude of the average moving speed of the point position at the time of searching and the magnitude of the average moving speed of the point position at the time of designation is more than or equal to the first threshold value and is less than the second threshold value, the operation state information indicating the pattern with a target is generated.

On the other hand, in a case where it is determined in step S116 that the difference between the magnitude of the average moving speed of the point position at the time of searching and the magnitude of the average moving speed of the point position at the time of designation is not more than or equal to the first threshold value and less than the second threshold value, the processing proceeds to step S118.

That is, in a case where the difference between the magnitude of the average moving speed of the point position at the time of searching and the magnitude of the average moving speed of the point position at the time of designation is more than or equal to the second threshold value (is more than the second threshold value), the processing proceeds from step S116 to step S118.

In step S118, the operation history analysis unit 142 generates the operation state information indicating the undeterminable pattern, and the processing is ended.

That is, in a case where the moving speed at the time of searching for the IN point or the OUT point of the sample scene is considerably faster than the moving speed at the time of designating the IN point or the OUT point, it is determined that an erroneous operation is performed or the state of the operation is unknown, and the operation state information indicating the undeterminable pattern is generated.

Figure 63:
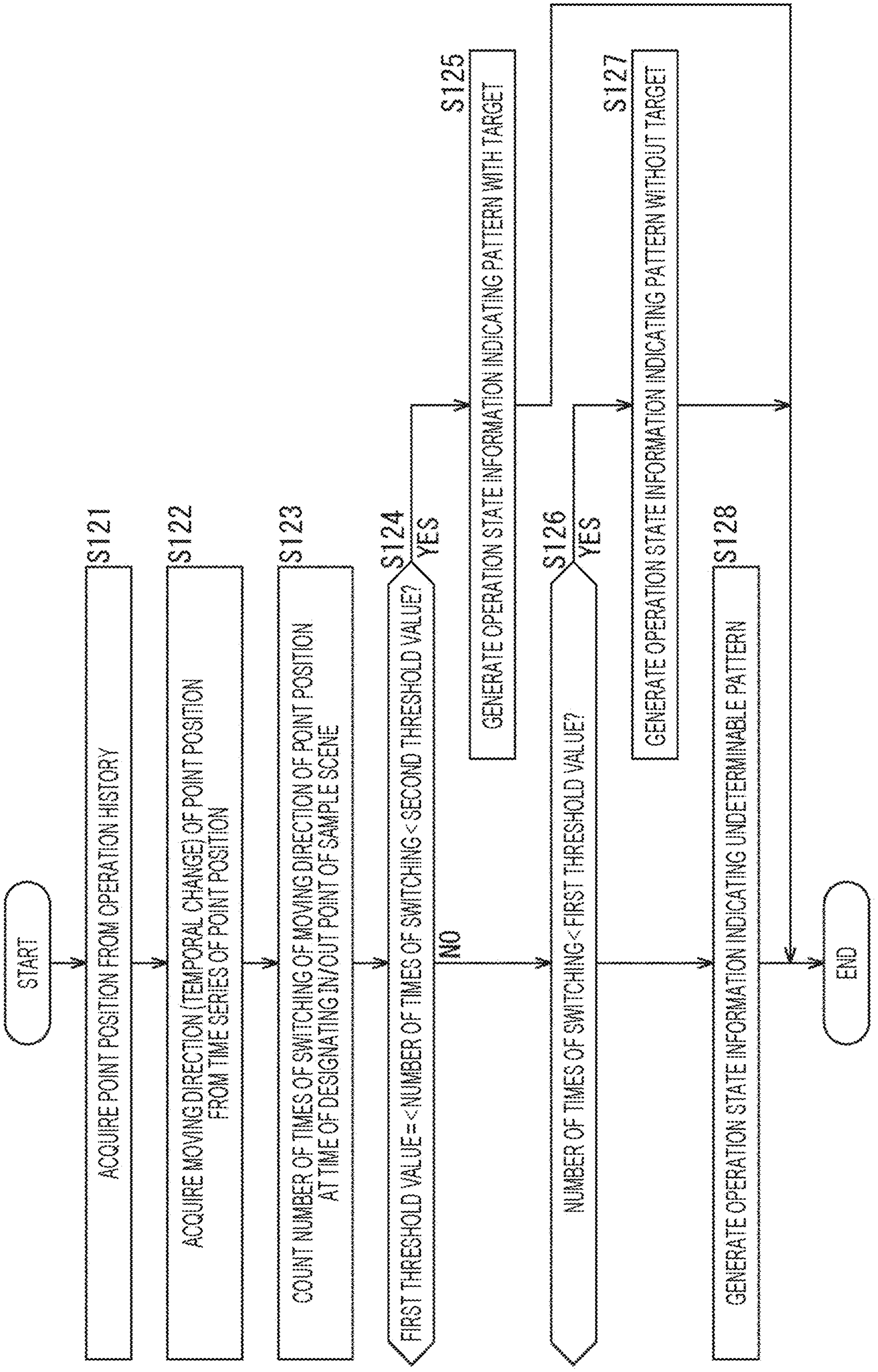
FIG. 63 is a flowchart for describing a second example of the processing of generating the operation state information by the operation history analysis unit 142.

FIG. 63 is a flowchart for describing a second example of the processing of generating the operation state information by the operation history analysis unit 142.

In FIG. 63, the operation history is analyzed and the operation state information is generated on the rule basis determined in advance and different from the case of FIG. 62.

For example, in FIG. 63, the operation state information is generated on the basis of the number of times of switching of a moving direction of the point position.

In step S121, the operation history analysis unit 142 acquires the point position from the operation history, and the processing proceeds to step S122.

In step S122, the operation history analysis unit 142 acquires the moving direction (temporal change) of the point position from the time series of the point position, and the processing proceeds to step S123.

In step S123 and subsequent steps, the operation history analysis unit 142 generates the operation state information on the basis of the number of times of switching of the moving direction of the point position at the time of designation at which the IN point or the OUT point of the sample scene is designated.

That is, in step S123, the operation history analysis unit 142 counts the number of times of switching of the moving direction of the point position at the time of designation at which the IN point and the OUT point of the sample scene are designated on the basis of the moving direction of the point position, and the processing proceeds to step S124.

In step S124, the operation history analysis unit 142 determines whether or not the number of times of switching (of the moving direction of the point position) at the time of designation is more than or equal to a first threshold value of the number of times of switching (is more than the first threshold value) and is less than (less than or equal to) a second threshold value.

In a case where it is determined in step S124 that the number of times of switching at the time of designation is more than or equal to the first threshold value and is less than the second threshold value, the processing proceeds to step S125.

In step S125, the operation history analysis unit 142 generates the operation state information indicating the pattern with a target (first pattern), and the processing is ended.

For example, in a case where the user designates the clear point as the IN point or the OUT point of the sample scene, the state of the designation is a state of moving back and forth a certain number of times such that the point position accurately coincides with the clear point. Accordingly, it is estimated that the number of times of switching when the IN point or the OUT point of the sample scene is designated is a certain number of times.

Therefore, in a case where the number of times of switching at the time of designation is more than or equal to the first threshold value and is less than the second threshold value, the operation state information indicating the pattern with a target in which the intention to designate the clear point is estimated is generated.

On the other hand, in a case where it is determined in step S124 that the number of times of switching at the time of designation is not more than or equal to the first threshold value and less than the second threshold value, the processing proceeds to step S126.

In step S126, the operation history analysis unit 142 determines whether or not the number of times of switching at the time of designation is less than (less than or equal to) the first threshold value.

In a case where it is determined in step S126 that the number of times of switching at the time of designation is less than the first threshold value, the processing proceeds to step S127.

In step S127, the operation history analysis unit 142 generates the operation state information indicating the pattern without a target (second pattern), and the processing is ended.

For example, in a case where the user searches for the exciting scene or the like while observing only the atmosphere of the scene instead of the clear point and designates the IN point and the OUT point of the sample scene by using the scene as the sample scene, it is not necessary to accurately cause the point position to coincide with a specific position such as the clear point (the user does not have such intention).

Accordingly, since the state of the designation of the IN point or the OUT point of the sample scene is a state of not moving the point position back and forth so much, it is estimated that the number of times of switching when the IN point or the OUT point of the sample scene is designated is 0 or a small number to some extent.

Therefore, in a case where the number of times of switching at the time of designation is less than the first threshold value, the operation state information indicating the pattern without a target in which the intention to designate the sample scene is estimated depending on the overall atmosphere of the scene is generated.

On the other hand, in a case where it is determined in step S126 that the number of times of switching at the time of designation is not less than the first threshold value, the processing proceeds to step S128.

That is, in a case where the number of times of switching at the time of designation is more than or equal to the second threshold value (more than the second threshold value), the processing proceeds from step S126 to step S128.

In step S128, the operation history analysis unit 142 generates the operation state information indicating the undeterminable pattern, and the processing is ended.

That is, in a case where the number of times of switching at the time of designation is considerably large, it is determined that the erroneous operation is performed or the state of the operation is unknown, and the operation state information indicating the undeterminable pattern is generated.

Figure 64:
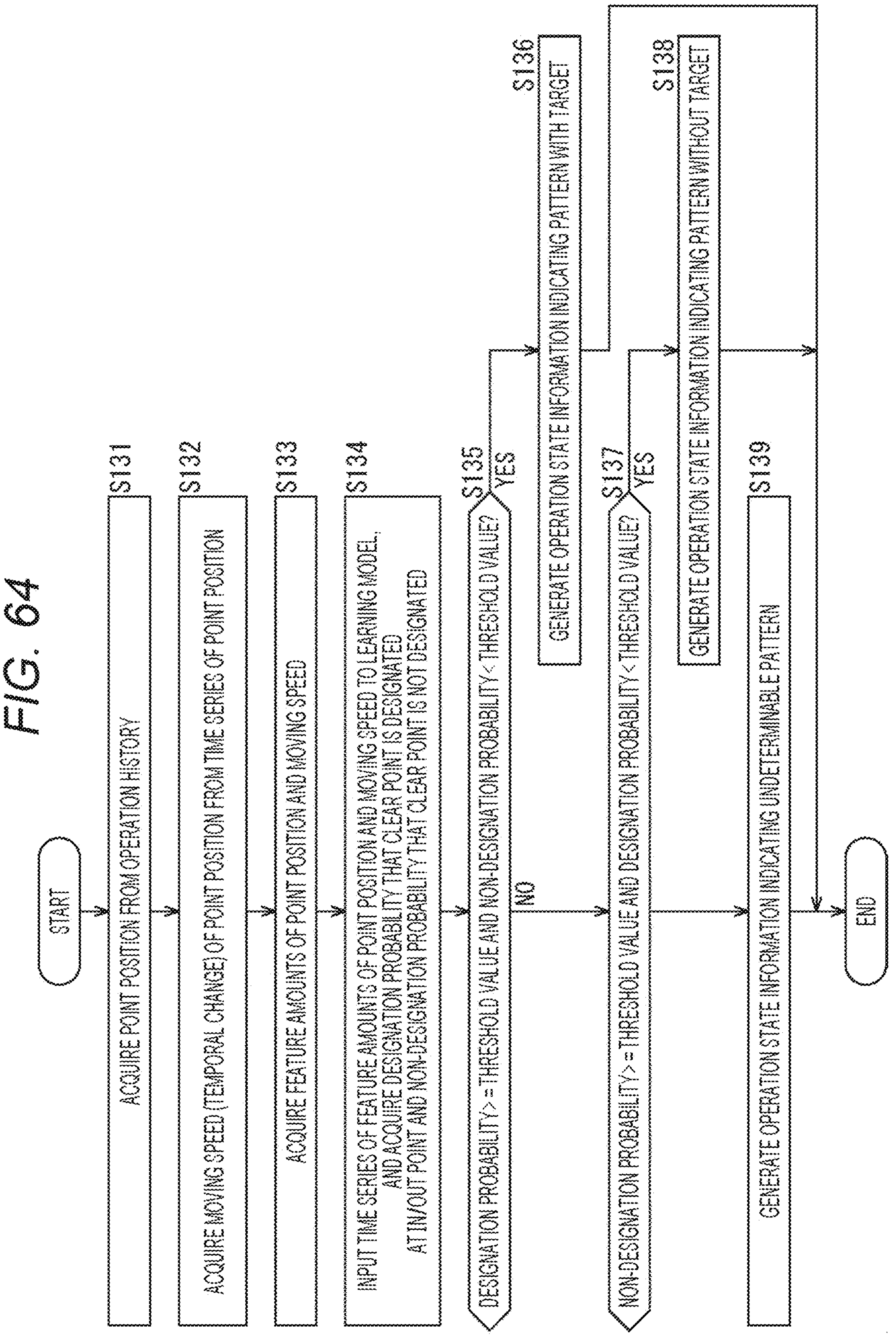
FIG. 64 is a flowchart for describing a third example of the processing of generating the operation state information by the operation history analysis unit 142.

FIG. 64 is a flowchart for describing a third example of the processing of generating the operation state information by the operation history analysis unit 142.

In FIG. 64, the operation history is analyzed by using the learning model, and the operation state information is generated.

In step S131, the operation history analysis unit 142 acquires the point position from the operation history, and the processing proceeds to step S132.

In step S132, the operation history analysis unit 142 acquires the moving speed (temporal change) of the point position from the time series of the point position, and the processing proceeds to step S133.

In step S133, the operation history analysis unit 142 acquires feature amounts of the point position and the moving speed, and the processing proceeds to step S134.

For example, the point position itself can be adopted as the feature amount of the point position. For example, the moving speed itself or an acceleration can be adopted as the feature amount of the moving speed. Note that, the moving speed and the acceleration can also be regarded as feature amount of the point position.

In step S134, the operation history analysis unit 142 acquires, as an output of the learning model, a designation probability that the clear point is designated as the IN point and the OUT point and a non-designation probability that the clear point is not designated as the IN point and the OUT point by inputting the time series of the feature amounts of the point position and the moving speed to the learning model for analyzing the operation history, and the processing proceeds to step S135.

The learning model for analyzing the operation history includes, for example, a model capable of performing machine learning such as a neural network or a logistic regression model. The learning model for analyzing the operation history is a learning model in which learning is performed in advance by using, as learning data for learning, the time series of the feature amounts of the point position and the moving speed in a case where the clear point is designated as the IN point or the OUT point of the sample scene and the time series of the feature amounts of the point position and the moving speed in a case where a point other than the clear point is designated as the IN point or the OUT point of the sample scene, for example, in a case where the IN point or the OUT point of the excitement scene is roughly designated.

The learning model for analyzing the operation history outputs the designation probability that the clear point is designated at the IN point or the OUT point and the non-designation probability that the clear point is not designated, with respect to the input of the time-series of each of the feature amounts of the point position and the moving speed.

In step S135, the operation history analysis unit 142 determines whether or not the designation probability is more than or equal to a threshold value (more than the threshold value) and the non-designation probability is less than (less than or equal to) the threshold value.

In a case where it is determined in step S135 that the designation probability is more than or equal to the threshold value and the non-designation probability is less than the threshold value, the processing proceeds to step S136.

In step S136, the operation history analysis unit 142 generates the operation state information indicating the pattern with a target (first pattern), and the processing is ended.

On the other hand, in a case where it is determined in step S135 that the designation probability is not more than or equal to the threshold value or the non-designation probability is not less than the threshold value, the processing proceeds to step S137.

In step S137, the operation history analysis unit 142 determines whether or not the non-designation probability is more than or equal to the threshold value (more than the threshold value) and the designation probability is less than (less than or equal to) the threshold value.

In a case where it is determined in step S137 that the non-designation probability is more than or equal to the threshold value and the designation probability is less than the threshold value, the processing proceeds to step S138.

In step S138, the operation history analysis unit 142 generates the operation state information indicating the pattern without a target (second pattern), and the processing is ended.

On the other hand, in a case where it is determined in step S137 that the non-designation probability is not more than or equal to the threshold value or the designation probability is not less than the threshold value, the processing proceeds to step S139.

In step S139, the operation history analysis unit 142 generates the operation state information indicating the undeterminable pattern, and the processing is ended.

<Generation of BBOX>

Figure 65:
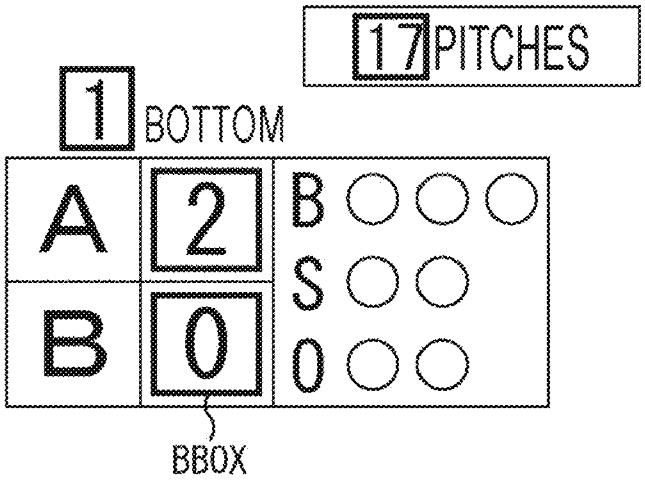
FIG. 65 is a diagram illustrating an example of input by the user of a BBOX as setting information to be set in the text recognition engine.

FIG. 65 is a diagram illustrating an example of the input by the user of the BBOX as the setting information to be set in the text recognition engine.

As described with reference to FIG. 31, the user can add the BBOX to be set as the setting information of the text recognition engine by operating the terminal 10.

For example, in the generation of the setting information of the text recognition engine, the recognition engine setting unit 144 can present the frame of interest (FIG. 26) selected on the basis of the IN point and the OUT point of the sample scene to the user, and can cause the user to input the BBOX to be set as the setting information to the frame of interest.

FIG. 65 illustrates a display example of the scoreboard of the baseball game appearing in the frame of interest presented to the user.

In the scoreboard of FIG. 65, a score 0 of an A team, a score 1 of a B team, the number of times of offense 1 (bottom), the number of pitches 17 of a pitcher of a defense team, and the like appear.

In a case where the user desires to cause the text recognition engine to recognize the score of the A team, the score of the B team, the number of times of offense, and the number of pitches, the user can input BBOXs surrounding the score 0 of the A team, the score 1 of the B team, the number of times of offense 1, and the number of pitches 17, which appear on the scoreboard of FIG. 65.

In a case where the user inputs the BBOXs, the recognition engine setting unit 144 can generate the BBOXs to be set as the setting information of the text recognition engine on the basis of the input of the BBOXs by the user.

Figure 66:
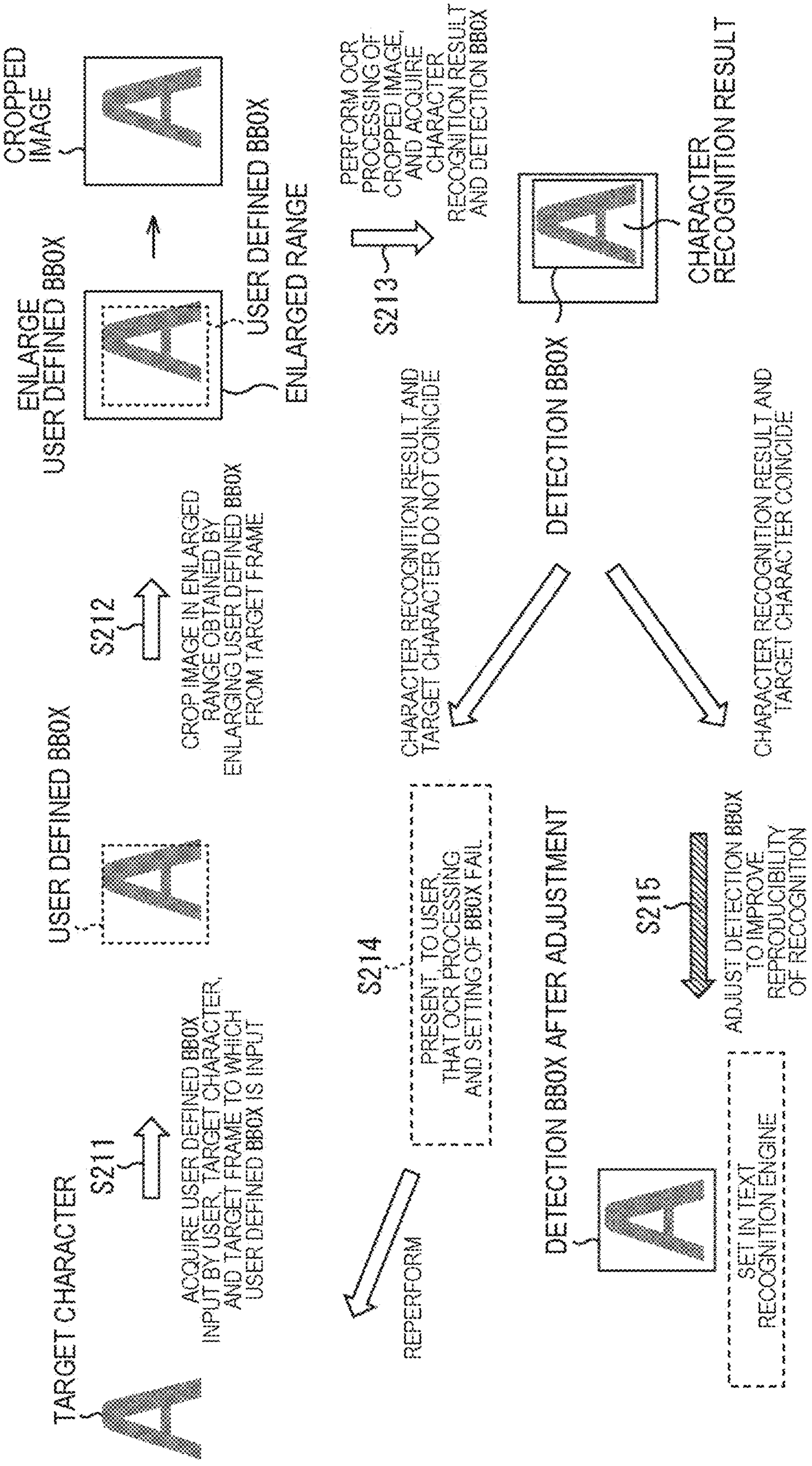
FIG. 66 illustrates an example of processing of generating the BBOX to be set as the setting information of the text recognition engine based on the input of the BBOX by the user.

FIG. 66 illustrates an example of processing of generating the BBOX to be set as the setting information of the text recognition engine based on the input of the BBOX by the user.

The user inputs a character (hereinafter, also referred to as a target character) surrounded by the BBOX together with the BBOX.

In step S211, the recognition engine setting unit 144 acquires the BBOX (hereinafter, also referred to as a user defined BBOX), the target character input by the user, and the frame of interest (hereinafter, also referred to as a target frame) to which the user defined BBOX is input.

In step S212, the recognition engine setting unit 144 crops an image of an enlarged range obtained by enlarging the user defined BBOX from the target frame, and acquires a cropped image obtained by the cropping.

In step S213, the recognition engine setting unit 144 causes a recognition engine capable of performing optical character recognition (OCR) processing among the plurality of recognition engines included in the recognition engine 120 to perform OCR processing on the crop image as the processing target.

The OCR processing is the character detection and the character recognition. In the character detection in the OCR processing, the character detection is performed on the cropped image, and the detection BBOX which is the BBOX surrounding the detected target character is detected. In the character recognition of the OCR processing, the character in the detection BBOX is recognized by using the detection BBOX detected in the character detection.

The recognition engine setting unit 144 acquires the detection BBOX and the character recognition result obtained by the OCR processing.

Thereafter, the recognition engine setting unit 144 determines whether or not the character recognition result coincides with the target character.

In a case where the character recognition result does not coincide with the target character, in step S214, the recognition engine setting unit 144 presents, to the user, that the OCR processing and the setting of the BBOX in the text recognition engine fail, and urges the user to re-input the BBOX and the target character.

Then, when the user inputs the BBOX and the target character again, the processing from step S211 is repeated.

On the other hand, in a case where the character recognition result coincides with the target character, in step S215, the recognition engine setting unit 144 adjusts the detection BBOX to improve reproducibility of the character recognition using the detection BBOX.

The recognition engine setting unit 144 sets the detection BBOX after the adjustment in the text recognition engine as the setting information of the text recognition engine.

Figure 67:
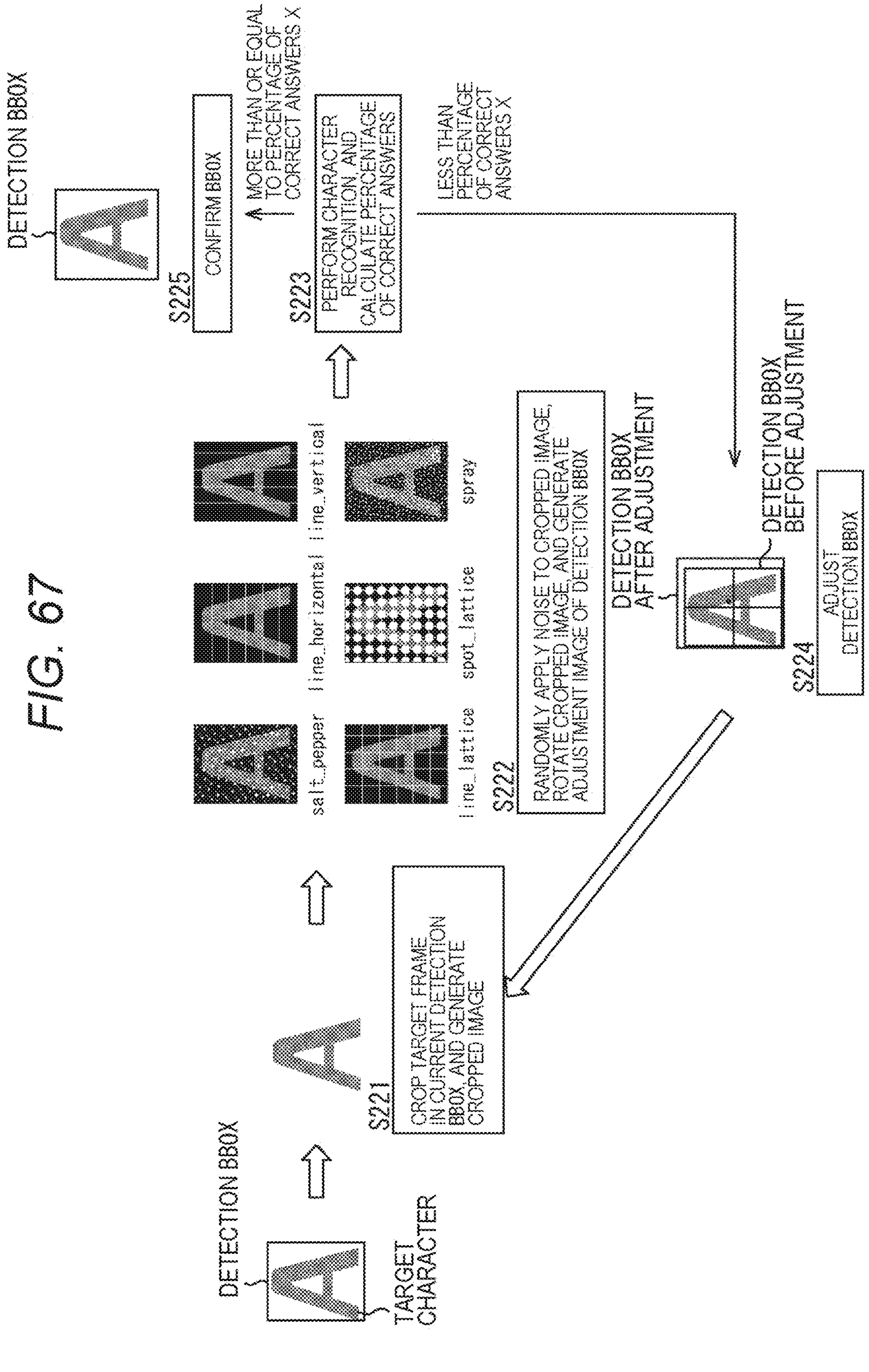
FIG. 67 is a diagram for describing an example of processing of adjusting a detection BBOX in step S215.

FIG. 67 is a diagram for describing an example of processing of adjusting the detection BBOX in step S215.

In the adjustment of the detection BBOX, a plurality of adjustment images obtained by adding at least noise to the cropped image obtained by cropping the image by using the detection BBOX are generated, the character recognition is performed on the plurality of adjustment images as the processing target by the recognition engine capable of performing the character recognition, and in a case where a percentage of correct answers of the character recognition of the plurality of adjustment images is not more than or equal to a threshold value, at least one of a size or the a position of the detection BBOX is repeatedly adjusted until the percentage of correct answers is more than or equal to the threshold value.

Then, the detection BBOX in which the percentage of correct answers is more than or equal to the threshold value is set as the text recognition engine that performs the recognition processing by using the BBOX.

In the adjustment of the detection BBOX, in step S221, the recognition engine setting unit 144 generates the cropped image by cropping the target frame in the current detection BBOX.

In step S222, for example, the recognition engine setting unit 144 generates a plurality of images such as five images as the adjustment image of the detection BBOX by randomly adding noise to the cropped image and further rotating the cropped image by a random angle as necessary.

For example, one or more combinations of noise called salt_pepper, line_horizontal, line_vertical, line_lattice, spot_lattice, and spray can be adopted as the noise to be used to generate the adjustment image.

In step S223, the recognition engine setting unit 144 causes the recognition engine capable of performing the character recognition to perform the character recognition on the plurality of adjustment images as the processing target, and calculates the percentage of correct answers of the character recognition (result).

In a case where the percentage of correct answers is less than (less than or equal to) the threshold value, in step S224, the recognition engine setting unit 144 adjusts the current detection BBOX.

The adjustment of the detection BBOX can be performed by enlarging the current detection BBOX by a predetermined percentage such as 1%, randomly shifting a center position (center position of gravity) by several pixels, or the like.

Thereafter, the processing from step S221 is repeated by using the detection BBOX after the adjustment.

Then, in a case where the percentage of correct answers is more than or equal to the threshold value (more than the threshold value), in step S225, the recognition engine setting unit 144 confirms the detection BBOX from which the percentage of correct answers more than or equal to the threshold value is obtained as the BBOX to be set as the setting information of the text recognition engine. The confirmed BBOX is set as the text recognition engine.

As described above, a robust BBOX can be obtained by adjusting the detection BBOX to obtain the percentage of correct answers more than or equal to the threshold value. Then, such a BBOX is set in the text recognition engine, and thus, the text recognition engine can perform robust recognition processing to recognize the text (character) with high accuracy.

Here, in the present description, the processing to be performed by the computer in accordance with the program is not necessarily performed in time series according to orders described in the flowcharts. That is, the processing to be performed by the computer in accordance with the program includes processing to be executed in parallel or independently of one another (parallel processing or object-based processing, for example).

Furthermore, the program may be processed by one computer (one processor) or processed in a distributed manner by a plurality of computers. Moreover, the program may be transferred to a distant computer to be executed.

Moreover, in the present description, a system means a set of a plurality of components (devices, modules (parts), and the like), and it does not matter whether or not all the components are in the same housing. Accordingly, a plurality of devices housed in separate housings and connected to each other via a network and one device in which a plurality of modules is housed in one housing are both systems.

Note that, the embodiments of the present technology are not limited to the above-described embodiments, and various changes can be made without departing from the gist of the present technology.

For example, the present technology may be embodied in cloud computing in which one function is shared and executed by a plurality of devices via a network.

Furthermore, each step described in the flowchart described above can be performed by one device or can be shared and performed by a plurality of devices.

Moreover, in a case where a plurality of pieces of processing is included in one step, the plurality of pieces of processing included in the one step can be executed by one device or executed by a plurality of devices in a shared manner.

Furthermore, the effects described in the present description are merely examples and are not limited, and other effects may be provided.

The present technology can have the following configurations.

<1>

An information processing apparatus including a setting unit that performs setting of a recognition unit that detects detection metadata which is metadata regarding a predetermined recognition target by performing recognition processing on the recognition target on a basis of a sample scene which is a scene of a content designated by a user, and a generation unit that generates a cutting rule for cutting scenes from the content on a basis of the detection metadata detected by performing the recognition processing on the content as a processing target by the recognition unit in which the setting is performed and the sample scene.

<2>

The information processing apparatus according to <1>, in which the sample scene is obtained by designating IN points and OUT points of some scenes of the content, or is designated by being selected from scenes to become one or more candidates of the content.

<3>

The information processing apparatus according to <1> or <2>, in which the setting unit generates setting information to be set in the recognition unit on a basis of the detection metadata that characterizes the sample scene or the IN point and the OUT point of the sample scene.

<4>

The information processing apparatus according to <1> or <2>, in which the setting unit generates setting information to be set in the recognition unit in accordance with an operation of a user for the detection metadata that characterizes the sample scene or an IN point and an OUT point of the sample scene.

<5>

The information processing apparatus according to any one of <1> to <4>, further including a selection unit that selects a recognition unit to be used for the recognition processing on the content from a plurality of the recognition units on a basis of a history of an operation for designating an IN point and an OUT point of the sample scene.

<6>

The information processing apparatus according to <4>, in which the recognition unit is an excitement recognition unit using excitement as the recognition target, the excitement recognition unit detects, as the detection metadata, an excitement score indicating a degree of excitement, and the setting unit generates a threshold value to be compared with the excitement score, as the setting information of the excitement recognition unit such that a section from the IN point to the OUT point of the sample scene is determined to be an excitement section based on the excitement score in determining the excitement section.

<7>

The information processing apparatus according to <4>, in which the recognition unit is a graphic recognition unit using a graphic as the recognition target, the graphic recognition unit recognizes a graphic in a predetermined region in a frame of the content, and the setting unit generates a region which is a target of graphic recognition as the setting information of the graphic recognition unit in accordance with an operation of a user for a region surrounding a graphic detected in a frame in a vicinity of each of the IN point and the OUT point of the sample scene.

<8>

The information processing apparatus according to <4>, in which the recognition unit is a text recognition unit using a text as the recognition target, the text recognition unit performs character recognition in a predetermined region in a frame of the content, and the setting unit selects, as a region as setting information to be set in the text recognition unit, the region of a specific character attribute among character attributes indicating meanings of characters in the region, which are obtained by meaning estimation of the characters recognized by the character recognition of the characters in the region, from regions surrounding characters detected in character detection of one frame of the sample scene.

<9>

The information processing apparatus according to any one of <1> to <8>, in which the generation unit generates the cutting rule on a basis of a plurality of the sample scenes.

<10>

The information processing apparatus according to <9>, in which the generation unit generates the cutting rule on a basis of cutting metadata to be used for cutting of the scene from the content, which is generated on a basis of the detection metadata.

<11>

The information processing apparatus according to <10>, in which the cutting metadata includes at least one of metadata of an Appear type indicating appearance or disappearance of any target, metadata of an Exist type indicating that any target is preset or is not present, or metadata of a Change type indicating a change in a value.

<12>

The information processing apparatus according to <10> or <11>, in which the generation unit generates, as the cutting rule, similar pieces of cutting metadata among the plurality of sample scenes.

<13>

The information processing apparatus according to <12>, in which the generation unit generates, as the cutting rule, IN point metadata which is the cutting metadata to be used for detection of an IN point of a cut scene cut from the content, OUT point metadata which is the cutting metadata to be used for detection of an OUT point of the cut scene, and a section event which is the event to be used for detection of an event which is a combination of one or more pieces of cutting metadata present in the cut scene.

<14>

The information processing apparatus according to <13>, in which the generation unit detects the IN point metadata on a basis of similarity between the plurality of sample scenes, of the cutting metadata present in a vicinity of an IN point of the sample scene, detects the OUT point metadata on a basis of similarity between the plurality of sample scenes, of the cutting metadata present in a vicinity of an OUT point of the sample scene, and detects the section event on a basis of similarity between the plurality of sample scenes, of the event present in a section from a position of the IN point metadata in the vicinity of the IN point of the sample scene to a position of the OUT point metadata in the vicinity of the OUT point.

<15>

The information processing apparatus according to <13> or <14>, in which the generation unit excludes a non-target event which is a predetermined event on which cutting of a scene shorter than the sample scene is performed from a detection target of the section event.

<16>

The information processing apparatus according to <15>, in which the generation unit determines the non-target event on a basis of a latest point which is a latest time at which an IN point of the cut scene is taken in order to establish the event, and an earliest point which is an earliest time at which an OUT point of the cut scene is taken in order to establish the event.

<17>

The information processing apparatus according to <16>, in which the generation unit determines, as the non-target event, the event in which the IN point metadata is present at a time before the latest point or the OUT point metadata is present after the earliest point in a section from a position of sample IN point metadata which is the IN point metadata present in a vicinity of an IN point of the sample scene to a position of sample OUT point metadata which is the OUT point metadata present in a vicinity of an OUT point of the sample scene.

<18>

The information processing apparatus according to any one of <1> to <17>, in which the setting unit generates a plurality of adjustment images obtained by adding at least noise to a cropped image obtained by cropping an image by using a bounding box (BBOX), adjusts at least one of a size or a position of the BBOX in a case where a percentage of correct answers of character recognition on the plurality of adjustment images as a processing target is not more than or equal to a threshold value, repeats the generation and the adjustment until the percentage of correct answers is more than or equal to the threshold value, and sets the BBOX in which the percentage of correct answers is more than or equal to the threshold value in the recognition unit that performs recognition processing by using the BBOX.

<19>

An information processing method including performing setting of a recognition unit that detects detection metadata which is metadata regarding a predetermined recognition target by performing recognition processing on the recognition target on a basis of a sample scene which is a scene of a content designated by a user, and generating a cutting rule for cutting scenes from the content on a basis of the detection metadata detected by performing the recognition processing on the content as a processing target by the recognition unit in which the setting is performed and the sample scene.

<20>

A program for causing a computer to function as a setting unit that performs setting of a recognition unit that detects detection metadata which is metadata regarding a predetermined recognition target by performing recognition processing on the recognition target on a basis of a sample scene which is a scene of a content designated by a user, and a generation unit that generates a cutting rule for cutting scenes from the content on a basis of the detection metadata detected by performing the recognition processing on the content as a processing target by the recognition unit in which the setting is performed and the sample scene.

REFERENCE SIGNS LIST

1 Information processing system
10 Terminal
20 Content management device
30 Content analysis device
41 Recognition engine
42 Rule engine
51 to 54 BBOX
81 Bus
82 CPU
83 ROM
84 RAM
85 Hard disk
86 Output unit
87 Input unit
88 Communication unit
89 Drive
90 Input and output interface
91 Removable recording medium
110 Control device
120 Recognition engine
121 General-purpose recognition engine
122 Non-general-purpose recognition engine
130 Rule engine
141 Operation information acquisition unit
142 Operation history analysis unit
143 Recognition engine selection unit
144 Recognition engine setting unit

145 Sample scene acquisition unit
146 Content acquisition unit
147 Cutting rule generation unit
148 Cut scene presentation unit
149 Information output unit
161, 162, 171 to 173 Region
181 Thumbnail
182 Playback head
183 Pull-down menu

The invention claimed is:

1. An information processing apparatus comprising:
circuitry configured to
perform setting of recognition processing related to detecting detection metadata which is metadata regarding a predetermined recognition target by performing the recognition processing on the recognition target based on a sample scene which is a scene of a content designated by a user, and
generate a cutting rule for cutting scenes from the content based on the detection metadata detected by performing the recognition processing on the content as a processing target by the recognition processing in which the setting is performed and the sample scene,
wherein the recognition processing is performed on the recognition target by detecting the detection metadata based on similarity between a plurality of sample scenes.

2. The information processing apparatus according to claim 1,
wherein the sample scene is obtained by designating IN points and OUT points of selected scenes of the content, or the sample scene is designated by being selected from scenes to become one or more candidates of the content.

3. The information processing apparatus according to claim 1,
wherein the circuitry is further configured to generate setting information to be set in the recognition processing based on the detection metadata that characterizes the sample scene or the IN point and the OUT point of the sample scene.

4. The information processing apparatus according to claim 1,
wherein the circuitry is further configured to generate setting information to be set in the recognition processing in accordance with an operation of the user for the detection metadata that characterizes the sample scene or an IN point and an OUT point of the sample scene.

5. The information processing apparatus according to claim 1,
wherein the circuitry is further configured to select a recognition unit to be used for the recognition processing on the content from a plurality of recognition units based on a history of an operation for designating an IN point and an OUT point of the sample scene.

6. The information processing apparatus according to claim 4,
wherein the recognition processing uses excitement as the recognition target,
wherein the circuitry is further configured to
detect, as the detection metadata, an excitement score indicating a degree of excitement, and
generate a threshold value to be compared with the excitement score, as the setting information of the recognition processing such that a section from the IN point to the OUT point of the sample scene is determined to be an excitement section based on the excitement score in determining the excitement section.

7. The information processing apparatus according to claim 4,
wherein the recognition processing uses unit is a graphic recognition unit using a graphic as the recognition target, and
wherein the circuitry is further configured to
recognize a graphic in a predetermined region in a frame of the content, and
generate a region which is a target of graphic recognition as the setting information of the recognition processing in accordance with an operation of the user for a region surrounding a graphic detected in a frame in a vicinity of each of the IN point and the OUT point of the sample scene.

8. The information processing apparatus according to claim 4,
wherein the recognition processing uses a text as the recognition target, and
wherein the circuitry is further configured to
perform character recognition in a predetermined region in a frame of the content, and
select, as a region as setting information to be set, the region of a specific character attribute among character attributes indicating meanings of characters in the region, which are obtained by meaning estimation of the characters recognized by the character recognition of the characters in the region, from regions surrounding characters detected in character detection of one frame of the sample scene.

9. The information processing apparatus according to claim 1,
wherein the circuitry generates the cutting rule based on the plurality of sample scenes.

10. The information processing apparatus according to claim 9,
wherein the circuitry generates the cutting rule based on cutting metadata to be used for cutting of the scene from the content, which is generated based on the detection metadata.

11. The information processing apparatus according to claim 10,
wherein the cutting metadata includes at least one of
metadata of an Appear type indicating appearance or disappearance of any target,
metadata of an Exist type indicating that any target is preset or is not present, or
metadata of a Change type indicating a change in a value.

12. The information processing apparatus according to claim 10,
wherein the circuitry generates, as the cutting rule, similar pieces of cutting metadata among the plurality of sample scenes.

13. The information processing apparatus according to claim 12,
wherein the circuitry generates, as the cutting rule,
IN point metadata which is the cutting metadata to be used for detection of an IN point of a cut scene cut from the content,
OUT point metadata which is the cutting metadata to be used for detection of an OUT point of the cut scene, and a section event which is the event to be used for detection of an event which is a combination of one or more pieces of cutting metadata present in the cut scene.

14. The information processing apparatus according to claim 13, wherein the circuitry detects the IN point metadata based on the similarity between the plurality of sample scenes, of the cutting metadata present in a vicinity of an IN point of the sample scene, detects the OUT point metadata based on the similarity between the plurality of sample scenes, of the cutting metadata present in a vicinity of an OUT point of the sample scene, and detects the section event based on the similarity between the plurality of sample scenes, of the event present in a section from a position of the IN point metadata in the vicinity of the IN point of the sample scene to a position of the OUT point metadata in the vicinity of the OUT point.

15. The information processing apparatus according to claim 13, wherein the circuitry is further configured to exclude a non-target event which is a predetermined event on which cutting of a scene shorter than the sample scene is performed from a detection target of the section event.

16. The information processing apparatus according to claim 15, wherein the circuitry is further configured to determine the non-target event based on a latest point which is a latest time at which an IN point of the cut scene is taken in order to establish the event, and an earliest point which is an earliest time at which an OUT point of the cut scene is taken in order to establish the event.

17. The information processing apparatus according to claim 16, wherein the circuitry determines, as the non-target event, the event in which the IN point metadata is present at a time before the latest point or the OUT point metadata is present after the earliest point in a section from a position of sample IN point metadata which is the IN point metadata present in a vicinity of an IN point of the sample scene to a position of sample OUT point metadata which is the OUT point metadata present in a vicinity of an OUT point of the sample scene.

18. The information processing apparatus according to claim 1, wherein the circuitry is further configured to generate a plurality of adjustment images obtained by adding at least noise to a cropped image obtained by cropping an image by using a bounding box (BBOX), adjust at least one of a size or a position of the BBOX in a case where a percentage of correct answers of character recognition on the plurality of adjustment images as a processing target is not more than or equal to a threshold value, repeat the generation and the adjustment until the percentage of correct answers is more than or equal to the threshold value, and set the BBOX in which the percentage of correct answers is more than or equal to the threshold value in the recognition processing by using the BBOX.

19. An information processing method comprising:

performing setting of recognition processing related to detecting detection metadata which is metadata regarding a predetermined recognition target by performing recognition processing on the recognition target based on of a sample scene which is a scene of a content designated by a user; and generating a cutting rule for cutting scenes from the content based on the detection metadata detected by performing the recognition processing on the content as a processing target by the recognition processing in which the setting is performed and the sample scene, wherein the recognition processing is performed on the recognition target by detecting the detection metadata based on similarity between a plurality of sample scenes.

20. A non-transitory computer-readable storage medium having embodied thereon a program, which when executed by a computer causes the computer to function as execute a method, the method comprising:

performing setting of a recognition unit that detects detection metadata which is metadata regarding a predetermined recognition target by performing recognition processing on the recognition target based on a sample scene which is a scene of a content designated by a user; and generating a cutting rule for cutting scenes from the content based on the detection metadata detected by performing the recognition processing on the content as a processing target by the recognition unit in which the setting is performed and the sample scene, wherein the recognition processing is performed on the recognition target by detecting the detection metadata based on similarity between a plurality of sample scenes.

* * * * *